US008116905B2

(12) United States Patent
Pandit et al.

(10) Patent No.: US 8,116,905 B2
(45) Date of Patent: Feb. 14, 2012

(54) TARGETED PRODUCT DISTRIBUTION SYSTEM AND METHOD

(75) Inventors: Vinayak Pandit, Palatine, IL (US);
Brian Amend, Lake Zurich, IL (US);
Louie Chin, Chicago, IL (US); Jeffrey Elliott, Chicago, IL (US); Kathy Emery, Pleasant Prairie, WI (US);
Gaurav Hasija, Wheeling, IL (US);
Maureen Isidoro, Chicago, IL (US);
Lionel Ng, Morton Grove, IL (US);
Doug Peterson, Crystal Lake, IL (US);
Todd Steffen, Chicago, IL (US); Patrick Sullivan, Warrenville, IL (US)

(73) Assignee: Walgreen Co., Deerfield, IL (US)

( * ) Notice: Subject to any disclaimer, the term of this patent is extended or adjusted under 35 U.S.C. 154(b) by 580 days.

(21) Appl. No.: 12/358,212

(22) Filed: Jan. 22, 2009

(65) Prior Publication Data
US 2009/0234493 A1 Sep. 17, 2009

Related U.S. Application Data

(60) Provisional application No. 61/022,805, filed on Jan. 22, 2008.

(51) Int. Cl.
*G06F 7/00* (2006.01)
(52) U.S. Cl. ........................................ 700/216; 700/230
(58) Field of Classification Search .................. 700/213, 700/222, 230, 216
See application file for complete search history.

(56) References Cited

U.S. PATENT DOCUMENTS

| | | | |
|---|---|---|---|
| 4,692,876 A | 9/1987 | Tenma et al. | |
| 6,581,771 B2 | 6/2003 | McDade | |
| 6,600,418 B2 * | 7/2003 | Sainati et al. | 340/572.1 |
| 6,622,063 B1 | 9/2003 | Moritz | |
| 6,711,458 B1 * | 3/2004 | Kofoed | 700/213 |
| 6,817,828 B2 | 11/2004 | Worrel et al. | |
| 7,003,474 B2 | 2/2006 | Lidow | |
| 7,207,433 B2 | 4/2007 | Schaefer | |
| 7,234,598 B2 | 6/2007 | McDade | |
| 2006/0212164 A1 * | 9/2006 | Abraham et al. | 700/215 |
| 2007/0071585 A1 * | 3/2007 | Henkel | 414/471 |
| 2007/0106413 A1 | 5/2007 | Russell et al. | |
| 2007/0126578 A1 * | 6/2007 | Broussard | 340/572.1 |
| 2009/0216370 A1 | 8/2009 | Pandit et al. | |
| 2009/0216603 A1 | 8/2009 | Pandit et al. | |
| 2009/0234494 A1 | 9/2009 | Pandit et al. | |
| 2009/0234495 A1 | 9/2009 | Pandit et al. | |
| 2009/0276081 A1 | 11/2009 | Pandit et al. | |
| 2009/0276084 A1 | 11/2009 | Pandit et al. | |
| 2009/0276264 A1 | 11/2009 | Pandit et al. | |
| 2009/0276337 A1 | 11/2009 | Pandit et al. | |

OTHER PUBLICATIONS

Office Action mailed Jun. 24, 2011 for U.S. Appl. No. 12/358,154.

(Continued)

*Primary Examiner* — Ramya Burgess
(74) *Attorney, Agent, or Firm* — James P. Muraff; Neal, Gerber & Eisenberg LLP

(57) ABSTRACT

A targeted product distribution system is described herein with respect to an exemplary management of product flow through a distribution center. Specifically, the system and method described herein is directed to the management and display of direct and easily-understood instructions, such that average individuals, as well as those with mental disabilities, will be able to contribute equally to the overall process.

27 Claims, 60 Drawing Sheets

OTHER PUBLICATIONS

Response to Non-Final Office Action mailed Jun. 24, 2011 for U.S. Appl. No. 12/358,154 filed on Sep. 26, 2011.
Non-Final Office Action mailed Oct. 7, 2011 for U.S. Appl. No. 12/358,134.
Non-Final Office Action mailed Oct. 11, 2011 for U.S. Appl. No. 12/358,203.
Non-Final Office Action mailed Oct. 11, 2011 for U.S. Appl. No. 12/358,167.
Non-Final Office Action mailed Aug. 12, 2011 for U.S. Appl. No. 12/358,185.
Notice of Allowance mailed Aug. 16, 2011 for U.S. Appl. No. 12/358,207.
Notice of Allowance mailed Aug. 16, 2011 for U.S. Appl. No. 13/358,199.
Non-Final Office Action mailed Oct. 7, 2011 for U.S. Appl. No. 12/358,210.

* cited by examiner

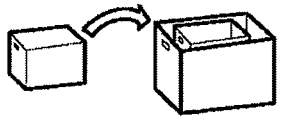

| Level | | What to put in tub | The method to put items in tub (Place or Pour) |
|---|---|---|---|
| Detrash Level 1 | Do not remove any packaging. <br> 120 <br> Picture 23: Unopened case with lid | Unopened case <br> 120 <br> Picture 24: Unopened case with lid | Place unopened case into tub <br> 190 <br> Picture 25: Place Case with lid into tub |

Note:
First demonstrate to student how to do Detrash Level 1. Use the Detrash Level 1 Flashcard and have the student practice Detrash Level 1 with actual cases into a tub.

FIG. 26

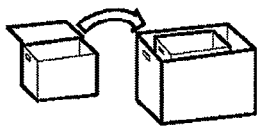

| Level | Packaging to remove from case | What to put in tub | The method to put items in tub (Place or Pour) |
|---|---|---|---|
| Detrash Level 2 | Remove lid from case <br> 121 <br> 120 <br> Picture 26: Remove lid from case | Case without lid <br> 120 <br> Picture 27: Case without lid in tub | Place case without lid into tub. <br> 190 <br> Picture 28: Place Case without lid into tub |

Note:
First demonstrate to student how to do Detrash Level 2. Use the Detrash Level 2 Flashcard and have the student practice Detrash Level 2 with actual cases into a tub.

FIG. 27

 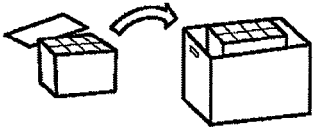

| Level | Packaging to remove from case | What to put in tub | The method to put items in tub (Place or Pour) |
|---|---|---|---|
| Detrash Level 3 | Remove lid from case<br>Picture 29: Remove lid from case | Inners<br>Picture 30: Inners in tub | Place inners into tub.<br>Picture 31: Place inners into tub |

Note:
First demonstrate to student how to do Detrash Level 3. Use the Detrash Level 3 Flashcard and have the student practice Detrash Level 3 with actual cases into a tub.

FIG. 28

 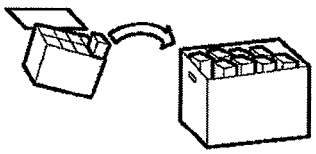

| Level | Packaging to remove from case | What to put in tub | The method to put items in tub (Place or Pour) |
|---|---|---|---|
| Detrash Level 4 | Remove lid from case<br>Picture 32: Remove lid from case | Case without lid<br>Picture 33: Inners in tub. | Place inners into tub.<br>Picture 34: Pour inners into tub |

Note:
First demonstrate to student how to do Detrash Level 4. Use the Detrash Level 4 Flashcard and have the student practice Detrash Level 4 with actual cases into a tub.

FIG. 29

| Level | Packaging to remove from case | What to put in tub | The method to put items in tub (Place or Pour) |
|---|---|---|---|
| Detrash Level 5 | Remove lid from case. Open Inners.<br><br>Picture 35: Remove lid, open Inners | Pieces<br><br>Picture 36: Pieces in tub | Pour pieces into tub.<br><br>Picture 37: Place Pieces into tub |

Note:
First demonstrate to student how to do Detrash Level 5. Use the Detrash Level 5 Flashcard and have the student practice Detrash Level 5 with actual cases into a tub.

FIG. 30

| Level | Packaging to remove from case | What to put in tub | The method to put items in tub (Place or Pour) |
|---|---|---|---|
| Detrash Level 6 | Remove lid from case. Open Inners<br><br>Picture 38: Remove lid, open Inners | Pieces<br><br>Picture 39: Pieces in Tub | Pour pieces into tub.<br><br>Picture 40: Pour Pieces into tub |

Note:
First demonstrate to student how to do Detrash Level 6. Use the Detrash Level 6 Flashcard and have the student practice Detrash Level 6 with actual cases into a tub.

FIG. 31

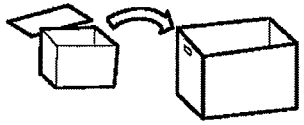

| Level | Packaging to remove from case | What to put in tub | The method to put items in tub (Place or Pour) |
|---|---|---|---|
| Detrash Level 7 | Remove lid from case.<br><br>Picture 41: Remove lid | Pieces<br><br>Picture 42: Pieces in tub | Place pieces into tub.<br><br>Picture 43: Place Pieces into tub |

Note:
First demonstrate to student how to do Detrash Level 7. Use the Detrash Level 7 Flashcard and have the student practice Detrash Level 7 with actual cases into a tub.

FIG. 32

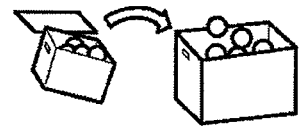

| Level | Packaging to remove from case | What to put in tub | The method to put items in tub (Place or Pour) |
|---|---|---|---|
| Detrash Level 8 | Remove lid from case.<br><br>Picture 44: Remove lid4 | Pieces<br><br>Picture 45: Pieces in Tub | Pour pieces into tub.<br><br>Picture 46: Pour Pieces into tub |

Note:
First demonstrate to student how to do Detrash Level 8. Use the Detrash Level 6 Flashcard and have the student practice Detrash Level 8 with actual cases into a tub.

FIG. 33

Error Description:
1). Unidentifiable Pallet.
2). No Transport Order
3). Duplicate License Plate
4). Weight Tolerance Exceeded
5). Weight Exceeded
6). Max Height Exceeded
7). Mismatch Item
8). Damaged Pallet
9). Contour Left
10). Contour Right
11). Contour Bottom
12). Contour Front
13). Contour Back
14). Missing Master Data Pallet Hospital Pallet License Plate
Source  18T6455657  Enter
Source  Overweight, Contour Left, Contour Back
Source  618537 - G/L SENSOR3 TRPL/BLD DSP RZR
Source  10

— 422

Cases  12
Cases Per Layer:  5
Layers:  3
Interlock:  Yes
Expiration Date:  01/2005

— 423

Damaged Cases:  0
Cases on Partial Layer
Stretch Wrap  Yes
Lot Number:  123450123

— 424

F2 Source Pallet Complete
F5 Send To NOK
F6 View Pallet Information
F7 Change License Plate
F8 Mismatch Item
F9 Enter Item Details

FIG. 64

TARGETED PRODUCT DISTRIBUTION SYSTEM AND METHOD

RELATED APPLICATIONS

This application claims priority to U.S. Provisional Patent Application 61/022,805, filed on Jan. 22, 2008, which is incorporated by reference herein in its entirety.

FIELD OF THE INVENTION

This invention relates to a targeted product distribution system.

SUMMARY OF THE INVENTION

A targeted product distribution system is described herein with respect to an exemplary management of product flow through a distribution center. Specifically, the system and method described herein is directed to the management and display of direct and easily-understood instructions, such that average individuals, as well as those with mental disabilities, will be able to contribute equally to the overall process.

A first embodiment of the present invention comprises a first method of receiving, conveying, storing and shipping products within a distribution center. The first method comprises the steps of receiving a product arrival signal at a central computer, which indicates that products to be received have arrived, and transmitting from the central computer a first conveying signal. The first conveying signal cause the products to be conveyed to a check-in workstation.

The first method further comprises the steps of receiving object identifier information. The identifier information may originate from an object identifier located on the products, and may be entered by a bed scanner, a handheld scanner, a keyboard or a touch-screen monitor.

The first method further comprises the steps of storing the object identifier information in a database associated with the central computer, and generating at the central computer a second conveying signal, which causes the products to be conveyed to at least one subsequent location within the distribution center. The subsequent location may be determined by parameters uploaded into the database, which may include, but are not limited to, characteristics of the products and guidelines stored in the database that are at least in part based on the characteristics of products. The subsequent location may be a case check-in station, a de-trash station, a tub hospital station, a case hospital station, a pallet hospital station, a RFID tagging station, a palletizing station or a shipping station.

The first method further comprises the steps of transmitting the second conveying signal, which causes the products to be conveyed to the at least one subsequent location, and receiving a second product arrival signal at the central computer, which indicates when the products have arrived at the at least one subsequent location.

The first method further comprises the steps of generating at the central computer a first set of instructions for use in instructing a user to perform at least one task related to the products, the first set of instructions determined by parameters inputted and stored in the database relating to the at least one task.

The first method further comprising the steps of transmitting the first set of instructions to the at least one subsequent location, for displaying the first set of instructions on a second touch-screen monitor in communication with the central computer, receiving a first completion signal at the central computer indicating that the user has completed the first set of instructions, and transmitting a third conveying signal, which causes the products to be conveyed from the at least one subsequent location.

The first method further comprises the steps of receiving at the central computer from a store, an order for products, storing the order in the database associated with the central computer, generating a list of requested products to compile to fulfill the order, transmitting the list of requested products to a remote device, receiving at the central computer a confirmation signal indicating that the requested products have been compiled to fulfill the order, generating at the central computer a second set of instructions to transmit to a portable scanning device, the second set of instructions comprising a proper method, order and orientation for manually loading the requested products in a truck, based on information stored in the database, and receiving at the central computer a order fulfilled signal indicating that the requested products have been loaded on the truck in compliance with the second set of instructions.

In the above embodiment, the sets of instructions may be text, icons or pictures, or any combination of the three. Additionally, the above embodiment may include a remote computer 22 located at the relevant workstation. Moreover, the above embodiment may further comprise the step of entering into a training mode at any location.

BRIEF DESCRIPTION OF THE DRAWINGS

For a better understanding of the invention, reference may be had to the following Figures, which further describe an embodiment of the present invention and which include drawings and exemplary screen shots therefor:

FIG. 26 depicts exemplary icons employed by the first embodiment of the present invention related to de-trash level 1.

FIG. 27 depicts exemplary icons employed by the first embodiment of the present invention related to de-trash level 2.

FIG. 28 depicts exemplary icons employed by the first embodiment of the present invention related to de-trash level 3.

FIG. 29 depicts exemplary icons employed by the first embodiment of the present invention related to de-trash level 4.

FIG. 30 depicts exemplary icons employed by the first embodiment of the present invention related to de-trash level 5.

FIG. 31 depicts exemplary icons employed by the first embodiment of the present invention related to de-trash level 6.

FIG. 32 depicts exemplary icons employed by the first embodiment of the present invention related to de-trash level 7.

FIG. 33 depicts exemplary icons employed by the first embodiment of the present invention related to de-trash level 8.

FIG. 64 is a further exemplary screen shot of the pallet hospital home screen as seen in FIG. 63.

DETAILED DESCRIPTION OF THE DRAWINGS

Figure 1:
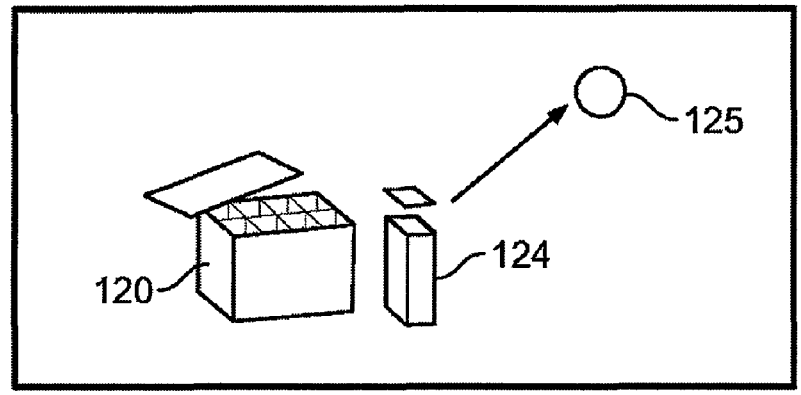
FIG. 1 is an exemplary view of icons representing a case 120, inners 124 and pieces 125 that may be employed by system 20.

The present invention is described herein with respect to an exemplary management of product flow through a distribution center. Specifically, the system and method described herein is directed to the management and display of direct and easily-understood instructions, such that average individuals, as well as those with mental disabilities, will be able to contribute equally to the overall process. In this way, companies employing the invention described herein will be able to hire and retain more people with disabilities. It will be understood that various other applications can be used in accordance with the present invention. By way of example, and in no way limiting, the elements taught herein may be employed in various settings, such as an automotive assembly plant.

It will likewise be understood by those in the art that each time an operator takes an action, system 20, through various interfaces described below, as well as software application 30, can instruct the user to perform certain tasks, as well as to require confirmation that the task has been completed.

Turning now to the Figures, wherein like reference numerals refer to like elements, there is illustrated a system and method for managing product flow through a certain type of plant. Although not required, the system and method will be described in the general context of a distribution center.

A distribution center, such as distribution center 10 described herein, typically receives several pieces of product from one vendor, then combines that product with product from several different vendors, and ships the various products to several franchises throughout the area. In an extremely simplistic example, and in no way limiting, a first vendor may send fifty boxes of cereal on a first pallet to distribution center 10, a second vendor may send fifty boxes of aspirin on a second pallet to distribution center 10, and a third vendor may send fifty boxes of paper napkins on a third pallet to distribution center 10. The staff at distribution center 10 will then remove each box from each pallet, and combine them, so that there are now fifty pallets, and each of the fifty pallets has one box of cereal, one box of aspirin and one box of paper napkins. The staff at distribution center 10 will then send one of the mixed pallets to each of its fifty franchisees or stores in the area or elsewhere.

It is well known in the industry that, typically, product is shipped to the distribution center in a case 120, which is typically a cardboard box that contains various items. As seen in FIG. 1, depending on the type of product, case 120 may comprise inners 124 and/or pieces 125. Timers 124 are the inside packaging or grouping of products in a case, while pieces 125 are individual items. Typically, but not always, pieces 125 are the packaging in which the product is eventually sold at the store or franchise.

In addition, multiple cases 120 may be shipped from a vendor to the distribution center 10 on a vendor pallet 99. The cases 120 on the vendor pallet 99 may each contain the same product. Alternatively, several of the cases 120 on the vendor pallet 99 may comprise one type of product, while other cases 120, or the remaining cases 120, on the vendor pallet 99 may contain a different product.

As is common in the industry, product shipped to distribution center 10 will follow various workflows, depending on the type of product, and the shipping requirements of that day. During that workflow, the product will be conveyed to several workstations. These workstations are described briefly here, but in detail below. Product from vendors is shipped on vendor pallet 99 to receiving. Because the various vendor pallets 99 do not have uniform dimensions, among other reasons, the product is then removed from vendor pallet 99, and placed on system pallet 100. If all of the product on a system pallet 100 is the same (commonly referred to as a unitized pallet), the pallet 100 is taken from receiving directly to storage area 601, described in detail below. However, the majority of times, there will be various types of products stored on pallet 100, and therefore, the pallet 100 is conveyed from receiving to a case check-in 110 station. From there, the product may be conveyed to a de-trash 250 station. As described in detail below, the product may be conveyed to de-trash 250 in a case 120. If case 120 is too small to be conveyed, or if case 120 is damaged or otherwise unconveyable, the product will be placed in a tub 190.

From de-trash 250, the product may be sent to one of several storage areas. When a shipping order is received, the product will be picked from the storage area and sent to shipping 600, and then sent to the store or franchisee.

It will be appreciated by those in the art that the above brief description applies only to normal or typical workflow. Several occurrences may happen that would change that workflow, though. If, for example, case 120 is somehow damaged, irregular or improper, it may be diverted to a case hospital 340 station. Similarly, if pallet 100 is damaged or improper, or if the products are or become irregularly stacked on pallet 100, pallet 100 may be diverted from the normal workflow and sent to a pallet hospital 400 station. If a tub 190 is damaged or otherwise unconveyable, it may be diverted from the normal workflow and sent to a tub hospital 500 station. If product is sent to any of the above "hospital" stations, and the error is corrected, the product may return or be conveyed to the normal workflow.

Additionally, as described below, certain product may be diverted to a source tagging 470 station before returning to or being conveyed to the normal workflow.

To aid in the conveyance, storing, picking and shipping of product throughout distribution center 10, system 20 may be employed. As stated above, system 20 not only aids in the conveyance of product throughout distribution center, but also instructs the employees with direct, easily understood instructions on how to handle, or what actions to take with respect to, the product at each of the various workstations.

Although not required, system 20 will be described in the general context of a network of computers, and computer executable instructions being executed by general purpose computing devices within the computer network. These instructions, in turn, may result in various mechanical or servo-mechanical devices being activated, deactivated or otherwise actuated. This may result in certain conveyors being activated, or various arms being activated to move or convey product from one conveyor to another, from one station to another etc. These instructions, in turn, will also result in the tracking of where (and when) product is located, as well as what actions have taken place with respect to such products, allowing the system to determine what remaining actions, if any, need to be performed in relation to such products and when those actions should take place. In this regard, the general purpose computing devices may comprise one or more remote computers 22 such as, for example, at each station briefly mentioned above and further described below, and one or more server computers 23, hosting one or more software applications 30. The software applications 30 may be stored in one or more memory elements 32 located on server computer 23 and/or remote computers 22. Moreover, each software application 30 in memory elements 32 may include one or more separate programs or program modules. The separate programs comprise ordered listings of executable instructions for implementing logical functions. In the depicted embodiment, the software in memory element 32 includes code for conveying product to necessary stations throughout distribution center 10, storing that product in a specific location, recalling the exact location of the product, either during conveyance or after storage, among other functions mentioned above and described below. Each function is actuated, for example, when the computers 22, 23 and memory 32 therein receive the various inputs, described in detail below.

When system 20 is in operation, the computers 22 and 23, which comprise memory elements 32, are configured to execute the software stored within memory elements 32, to communicate data to and from memory elements 32, and to generally control operations of system 20 pursuant to the software applications 30. At least the server computer 23 may also include one or more databases 24 for storing information related to each product. Such as, for example, all tracking information on where (and when) product was and is within the system 20, and what (and when) actions have been performed on such product. By way of example, and in no way limiting, if a vendor ships aspirin to distribution center 10, database 24 may comprise such information as the weight of the bottle containing the aspirin, the number of bottles per case 120, the total weight of case 120 containing the aspirin, the width, length and depth of case 120, the expiration date of the aspirin, the lot number of the aspirin (as described below), etc. This information may be preprogrammed into database 24 before the aspirin arrives at distribution center 10 (for example, the number of bottles each case 120 contains), or may be loaded by one or more employees after the aspirin arrives (for example, the lot number). It will be appreciated by those in the art that database 24 may comprise the same type of information, or more or less information, for each product sent to distribution center 10, depending on the nature of the product.

Figure 2:
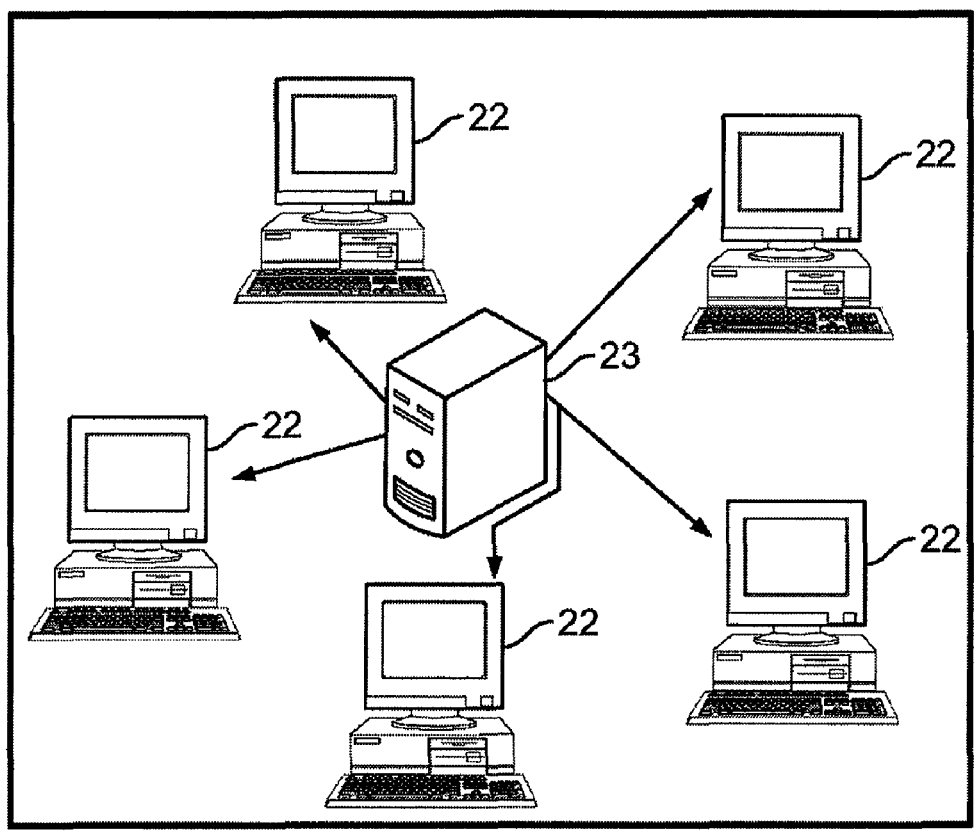
FIG. 2 is an exemplary diagram showing a first embodiment of the location of server 23, remote computers 22, memory locations 32, and software application 30 with respect to one another.
Figure 3:
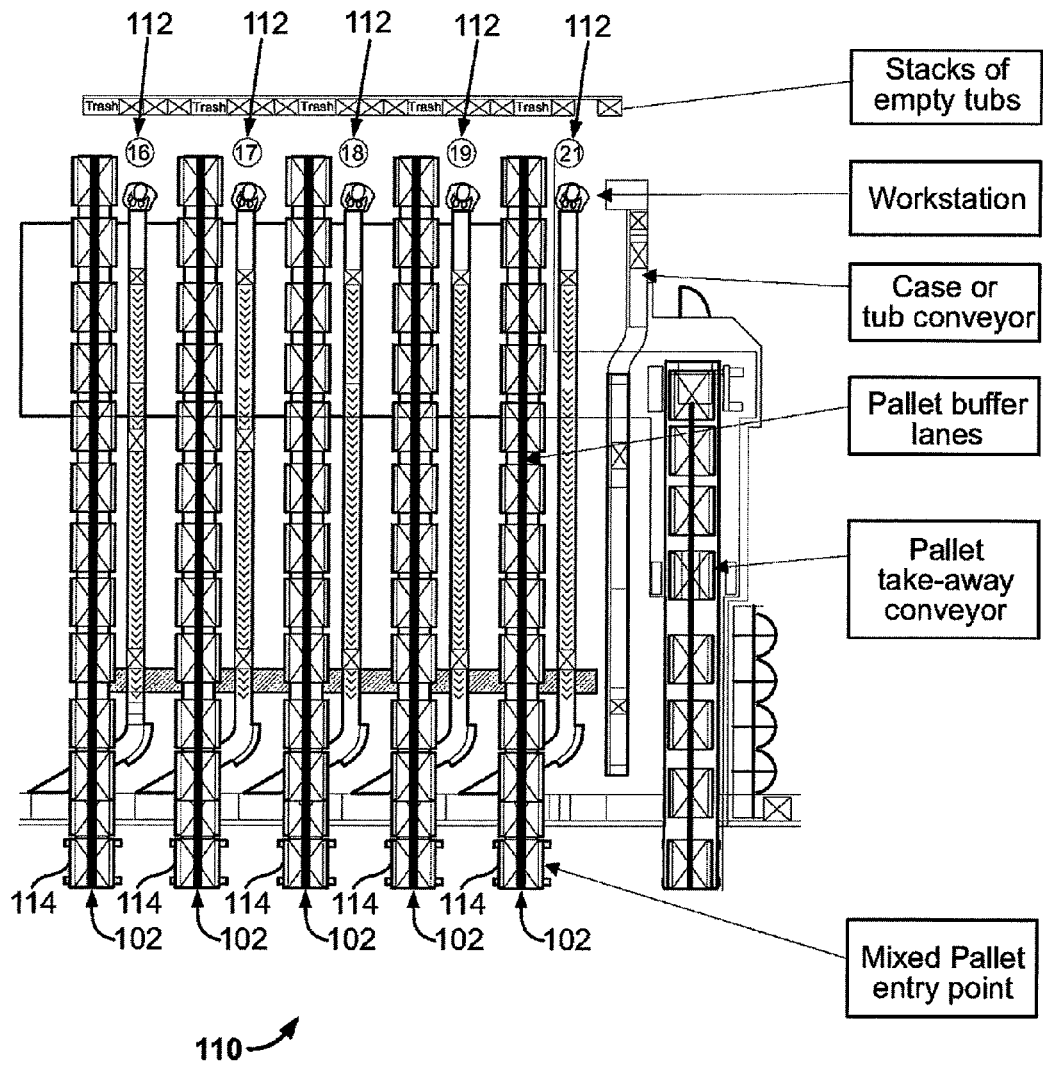
FIG. 3 is an overhead view of a first embodiment of the case check-in layout.

Remote computers 22 may be provided at any or each workstation, as well as various strategic places throughout distribution center 10. In one embodiment, the remote computers 22 access and utilize the software application 30 on that is installed and executing on the server computer 23 other embodiments, such as a distributed software arranged, are also contemplated. As depicted in FIG. 2, for example, each remote computer 22 may communicate with server computer 23 and thus may access the software application within system 20. Each remote computer 22 may also communicate with other remote computers 22. Other embodiments, such as a distributed software arrangement, are also contemplated. The individual remote computers 22 can be configured to communicate with each other, in addition to server computer 23.

For editing, populating and maintaining the databases 24, various keyboards, scanners, touch-screen monitors and other hardware accessories are placed throughout distribution center 10. Most often, these hardware accessories are connected to one of remote computers 22, but these accessories may also be directly engaged to server 23. As seen in the various screenshots or interface screens below, touch-screen monitors and respective computer hardware and software will generate and display these various user interface screens and other interface options, each of which may comprise further various menu bars, drop-down menus, buttons, display windows and other interface options. A detailed description of the user interface screens, including the menu bars, drop-down menus, exemplary buttons and display windows, along with a brief description of the functionality associated with such interface options, is described below and shown in the accompanying Figures.

As will be appreciated by those of skill in the art, the computers 22 and 23 need not be limited to personal computers, but may include hand-held devices, such as a wrist scanner 610, multiprocessor systems, microprocessor-based or programmable consumer electronic devices, minicomputers, mainframe computers, personal digital assistants, cellular telephones or the like, depending upon their intended end use within the system. For performing the functions described hereinafter, the computer executable instructions may be written as routines, programs, objects, components, and/or data structures that perform particular tasks. Within the computer network, the computer executable instructions may reside on a single computer 22, or server computer 23, or the tasks performed by the computer executable instructions may be distributed among a plurality of computers, such as the system computers 22, 23. Therefore, while described in the context of a computer network, it should also be understood that the present invention may be embodied in a stand-alone, general purpose computing device that need not be connected to a network.

To efficiently provide users with access to the system software application 30, the server computers 23 and the underlying framework for the computer network 20 may be provided by the service company itself or by outsourcing the hosting of the software application 30 to an application service provider ("ASP"). ASP's are companies that provide server computers 23 that store and run a software application 30 for a third party entity, which is accessible to the third party entity's users via the Internet or similar means. Therefore, the server computer 23, for operating the software application 30, may be hosted on a computer that is owned and maintained by another party and users may then access and use software applications via the host computer without storing the software application on the remote computers. It should be understood, however, that ASP models are well-known in the industry and should not be viewed as a limitation with respect to the type of system architectures that are capable of providing a computer network 20 that can properly operate the software application discussed herein.

It will also be appreciated by those in the art that, because each remote computer 22 may communicate with server 23, any new software, or any upgrades to existing software, may be loaded on to server 23. In this manner, each remote computer 22 may communicate with, and download from, server 23 to receive the new or upgraded software. As such, the new or upgraded software may only need to be uploaded once, rather than uploaded to each computer individually.

To perform the particular tasks in accordance with the computer executable instructions, the computers 22 and 23 may include, as needed, a video adapter, a processing unit, a system memory, and a system bus that couples the system memory to the processing unit. The video adapter allows the computers 22 and 23 to support a display. In the present embodiment, most such displays are touch screen monitors, but the displays may also include a cathode ray tube ("CRT"), a liquid crystal display ("LCD"), a flat screen monitor or similar means for displaying textual and graphical data to a user, and an i/o module that allows the computer 22 or 23 to connect to various drives, such as scanners, lights, pacer lights (described below), etc. The display allows a user to view information, such as code, file directories, error logs, execution logs and graphical user interface tools. As seen, the depicted display also allows the user to input various information into system 20.

The computers 22 and 23 may further include read only memory (ROM), a hard disk drive for reading from and writing to a hard disk, a magnetic disk drive for reading from and writing to a magnetic disk, and/or an optical disk drive for reading from and writing to a removable optical disk or any other suitable data storage device. The hard disk drive, magnetic disk drive, and optical disk drive may be connected to the system bus by a hard disk drive interface, a magnetic disk drive interface, or an optical disk drive interface, respectively, or other suitable data interface. The drives and their associated computer-readable media provide a means of non-volatile storage for the computer executable instructions and any other data structures, program modules, databases, arrays, etc. utilized during the operation of the computers 22 and 23.

To connect the computers 22 and 23 within the computer network, the computers 22 and 23 may include a network interface or adapter. When used in a wide area network, the computers 22 and 23 typically include a network interface, such as a router/modem or similar device. The modem, which may be internal or external, may be connected to the system bus for the computer via a serial port interface or other communication port. It will be appreciated that the described network connections are exemplary and that other means of establishing a communications link between the computers 22 and 23 may be used. For example, the system may also include a wireless router/modem that receives and transmits information via a wireless communications medium, such as a cellular communications network, a satellite communications network, or another similar type of wireless network. It should also be appreciated that the network interface will be capable of employing TCP/IP, FTP, SFTP, Telnet SSH, HTTP, SHTTP, RSH, REXEC, etc. and other network connectivity protocols. In the depicted embodiment, the server is an AS400, running the OS400 operating system. In certain circumstances, and AIX server may also be employed. However, it will be appreciated by those in the art that this is exemplary and in no way limiting. The scope of the present invention includes various types of servers and operating systems.

As mentioned above, in one embodiment, system 20 and databases 24 reside on the server computer 23 and are managed by the provider of a software application or by a third-party. Those with skill in the art will understand, however, that the software application and databases 24 may reside on the remote computer 22 and may be managed and maintained by a user. The software application 30 and databases 24 may also reside on different computers.

To edit, populate and maintain the databases 24, the user interface may allow the user to perform standard text editing functions, including, mouse placement of the cursor, click-and-drag text selection and standard key combinations for cutting, copying and pasting data. In addition, the user interface may allow users to access, copy, save, export or send data or files by using standard file transfer functions. It should be understood that these editing and file transfer functions may also be accomplished within various operating system environments, such as LINUX®, MAC OS®, Mozilla®, Windows®, etc.

Below is a detailed description of the work completed, and the various screenshots shown by system 20, at each of the workstations. For convenience, both the physical element, and the graphical representation of that element, may be referred to with the same reference numeral, as both the physical element and the graphical representation are usually related. By way of example, the system pallet that is physically conveyed throughout distribution center 10 will be referred to as pallet 100. Similarly, the icon representation of a system pallet displayed by system 20 on a touch-screen monitor will also be referred to as pallet 100.

I. Case Check-in

As discussed above, a vendor will ship its products to distribution center 10 on a vendor pallet 99. Because the various vendors' pallets may have varying dimensions, conveyance by system 20 of the different-sized pallets throughout distribution center 10 would be difficult. Therefore, once the product arrives, it may be moved to a system pallet 100. Each system pallet 100 should have identical dimensions, and as such, will be able to be conveyed throughout distribution center 10 using the same-dimensioned physical conveyors.

Figure 4:
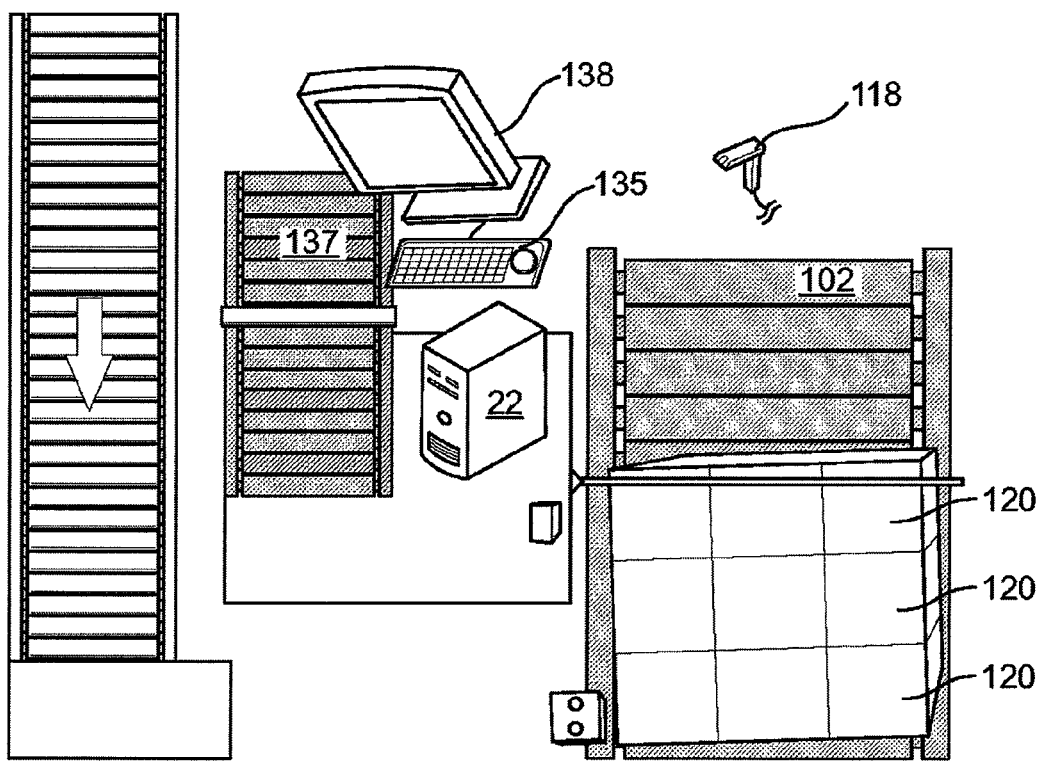
FIG. 4 is an overhead view of a first embodiment of the case check-in workstation.

As depicted in FIG. 4, check in workstation 112 may comprise touch-screen monitor 138, keyboard 135, hand scanner 118 and outgoing conveyor 137.

If all of the product on system pallet 100 is identical, central computer 23 and application 30 therein is configured to convey that uniform pallet 100 via conveyors to pallet storage 601, described in detail below. If the system pallet 100 is unconveyable, for example, if the cases 120 are stacked too high on pallet 100, computer 23 and software application 30 therein are configured to divert pallet 100 to pallet hospital 400, described in detail below.

If, as occurs much more often, there are various types of product shipped by vendor on vendor pallet 99, a different workflow may take place. Again, the products are received while still on vendor pallet 99, and then immediately moved to a system pallet 100. From there, the receiving supervisor will place the system pallet 100 on one of numerous receiving conveyors (not shown). Each of these receiving conveyors is directly engaged and in communication with a case check-in station 112, as described below. In this manner, the receiving supervisor can determine which case check-in station 112 has the least amount of product, and can load that receiving conveyor accordingly.

Once pallet 100 enters case check-in workstation 112, operator 116 physically unloads one of cases 120, scans vendor bar code 122 with scanner 118, and slides case 120 to labeler 130, described below. Scanning vendor bar code 122 enters the particular good into the computer 23 of the system 20, populating database 24 and informing system 20 that that particular product has been received by distribution center 10. Thus, particular product information is received by the central computer 23 when the vendor bar code 22 is scanned.

Because the numerous vendors may place the vendor bar code 122 in any number of locations on case 120, operator 116 may place a uniform label in a uniform location on case 120, such that automatic scanners (not shown) in communication with the computers 22, 23 placed throughout distribution center 10 may automatically scan case 120. Based on the information stored in computer 23, labeler 130 prints a case-specific label 132, which operator 116 then affixes to a specific and predetermined spot on case 120.

It will be appreciated by those in the art that the scope of the present invention includes the embodiment in which labeler 130 is stocked with pre-printed case-specific labels 132. In this embodiment, the central computer 23 and/or local computer 22 will store and track which pre-printed case-specific label 132 is next available, and will associate that label 132 with the next case 120 that is scanned by operator 116.

In either embodiment, once case specific label 132 is affixed, each case 120 can be automatically identified by the central computer 23, and software application 30 therein, at any point throughout center 10. Various methods can be used to achieve this functionality. For example, scanners, such as bar code and/or RFID tag scanners, can be positioned throughout the distribution center within the system 20 and can be connected to the central computer 23, and the central computer 22 and software application therein can receive scanned information form the case specific labels. As central computer 23 and software application 30 has stored the location of each scanner, the information received and the location of the scanner, accurately can identify what case is scanned, where the case is located, and when the scan occurred, which is stored and can be recalled by a user and the system. Operator 116 next moves case 120 to case conveyor 134, which then transports the case 120 to the next station. Operator 116 continues this exercise until pallet 100 is emptied of cases 120. Actions by the operators at the various stations may also allow the computers 22, 23 and software application 30 to determine where each product is located, as this same information is stored and tracked when operator actions are taken in relation to a product through the various input devices, including handheld scanner used by the operators.

Because of the variety of cases 120 that may be received, operator 116 may be faced with multiple discrepancies throughout the workflow. FIGS. 5 through 23 depict exemplary interface screens displayed by system 20 to assist operator 116 in handling some of these various discrepancies.

Figure 5:
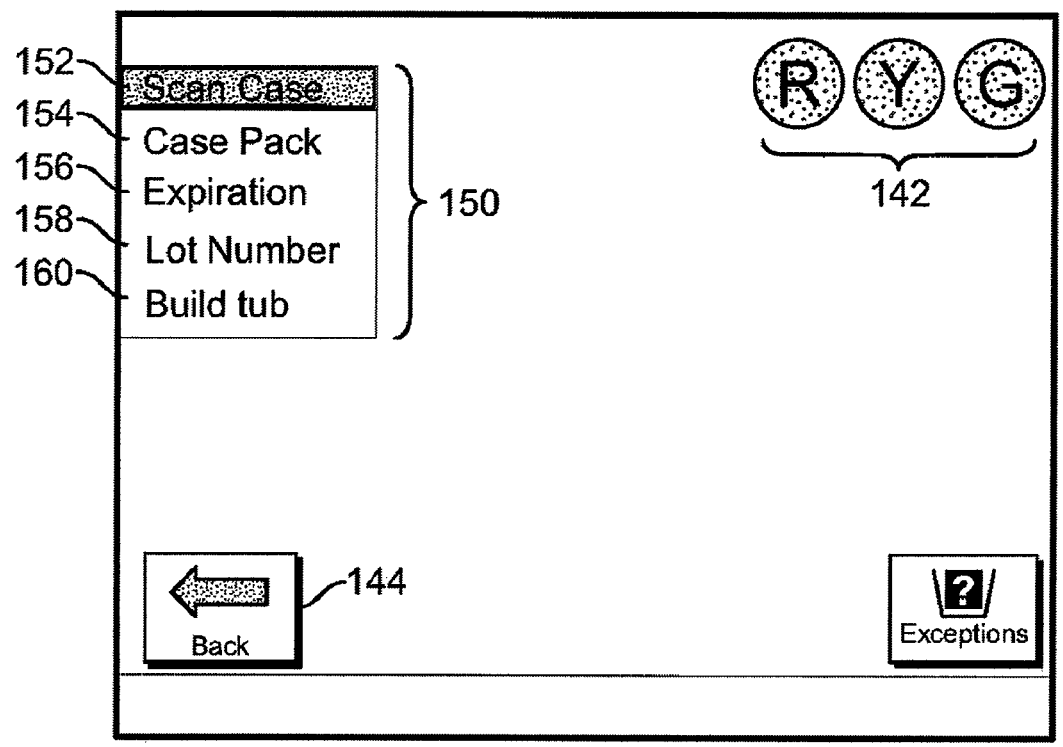
FIG. 5 is an exemplary screen shot of a case check-in home screen for use with the first embodiment of the present invention.

FIG. 5 depicts an exemplary home interface screen 140 displayed by computer 22, comprising red, yellow and green indicators 142. In the depicted embodiment, indicators 142 may be referred to as pacer lights. Each operator 116 may be tasked with accomplishing a set goal within a defined period of time. By way of example, operator 116 may be tasked with checking in a set number of cases 120 by the end of his shift. Alternatively, operator 116 may be tasked with checking in all of the cases 120 on a specific pallet 100 within a set amount of time. Any such goal-oriented task may be determined by system 20 or entered into system 20 by a staff member. Under any of the tasks, indicators 142 will indicate to operator 116 whether he is on pace to meet his goals. If operator 116 is setting too slow of a pace, system 20 will illuminate red indicator 142. If operator 116 is setting a pace in which he should precisely meet his goals, system 20 will illuminate yellow indicator 142. If operator 116 is setting a pace in which he will clearly meet his goals, system 20 will illuminate green indicator 142. Thus, the computers 22, 23 and software application 30 therein receive all actions taken by the operator though the interface screen and hardware devises and stores this information, including actions taken using the other hardware devices, such as bar code scanners. The computers 22, 23 and software application 30 therein then compare this tracked and stored operational action data to predetermined pacing information and displays operational actions results on the display, as indicated.

In addition, workstation 112 may further comprise physical red, yellow and green pacer lights (not shown). These pacer lights may correspond to indicators 142, such that when red indicator 142 is illuminated, the red pacer light will also be illuminated. In this manner, a supervisor (not shown) assigned to case check-in 110 will be able to request a report displaying these operational action data and operational actions results, and determine which, if any, operators 116 are falling behind in their task load, and will be able to lend aid accordingly.

Exemplary home screen 140 may further comprise workflow readout 150, back button 144 and exceptions button 146. Workflow readout 150 comprises scan case indicator 152, case pack indicator 154, expiration indicator 156, lot number indicator 158 and build tub indicator 160, each of which will be described in detail below.

Figure 6:
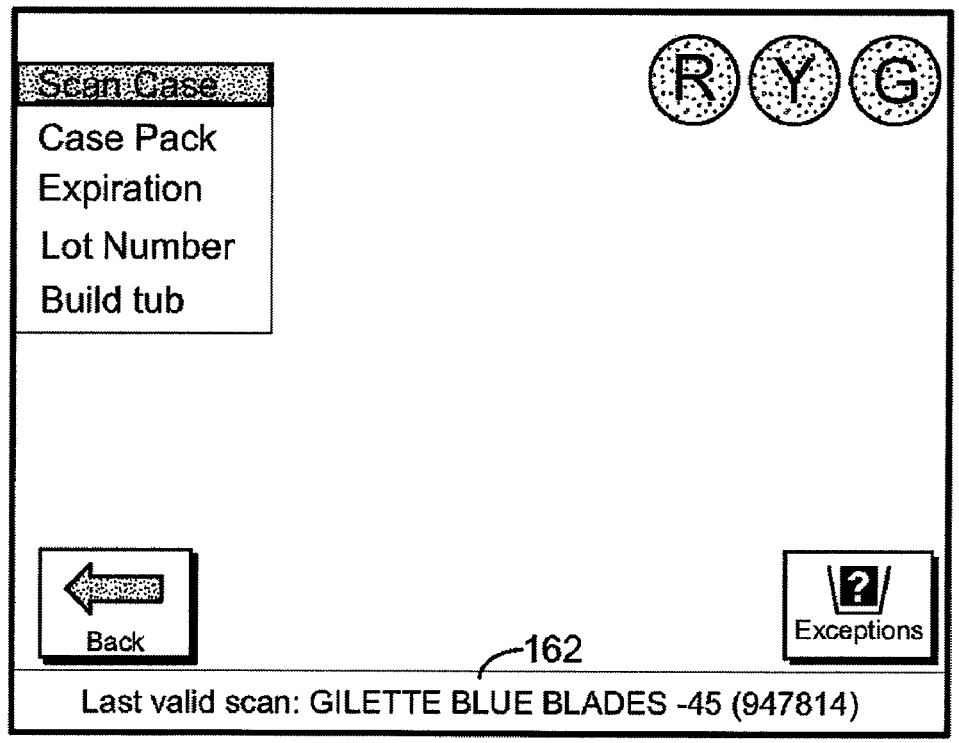
FIG. 6 is a further exemplary screen shot of the case check-in home screen of FIG. 5.
Figure 7:
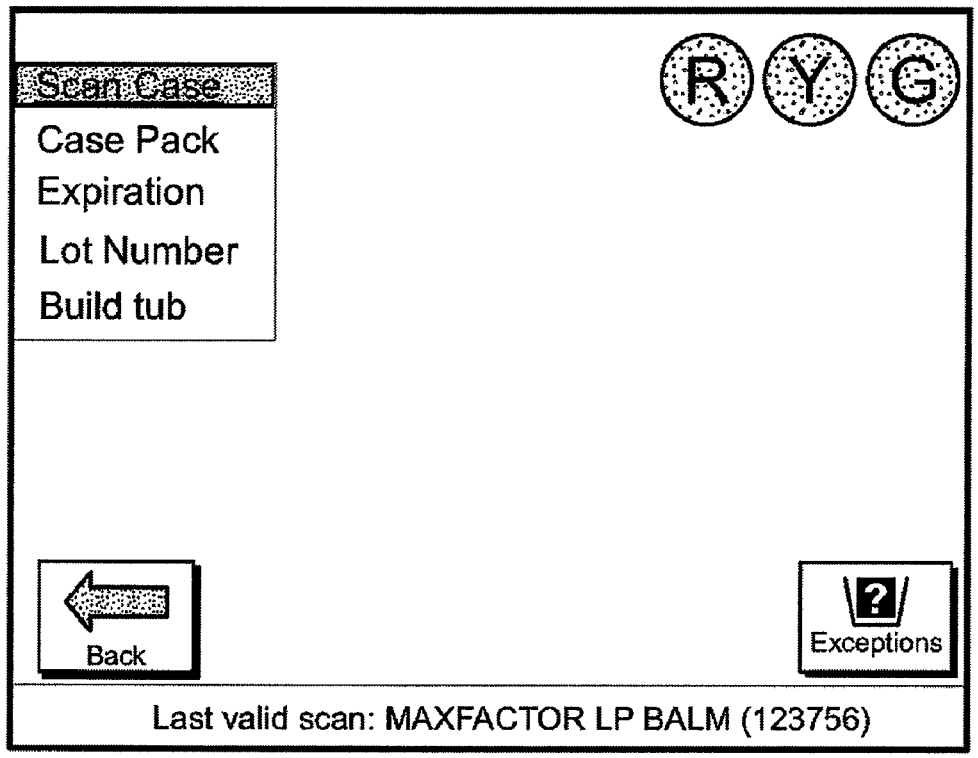
FIG. 7 is an exemplary screen shot of an expiration date screen for use with the first embodiment of the present invention.

By way of example, and in no way limiting, FIGS. 5-7 depict interface screens shown on monitor 140 when there is regular workflow with no discrepancies. Under this first scenario, operator 116 receives a pallet 100, at which point scan case indicator 152 is bolded and underlined, while the remaining indicators of workflow readout 150 are grayed out. At this point, operator 116 scans a first case 120, causing information window 162 to appear at the bottom of home screen 140, as shown in FIG. 6. As seen, information window 162 indicates the last action taken by operator 116—in this example, a valid scan of a case 120 comprising Gilette Blue Blades.

Figure 8:
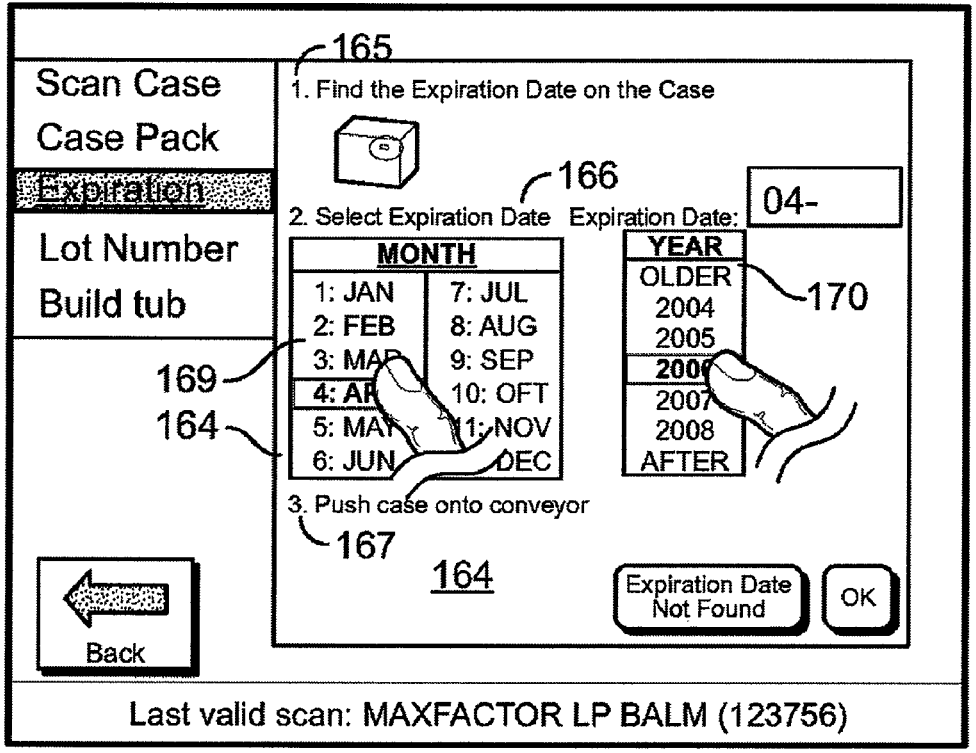
FIG. 8 is an exemplary screen shot of an expiration window for use with the first embodiment of the present invention.
Figure 9:
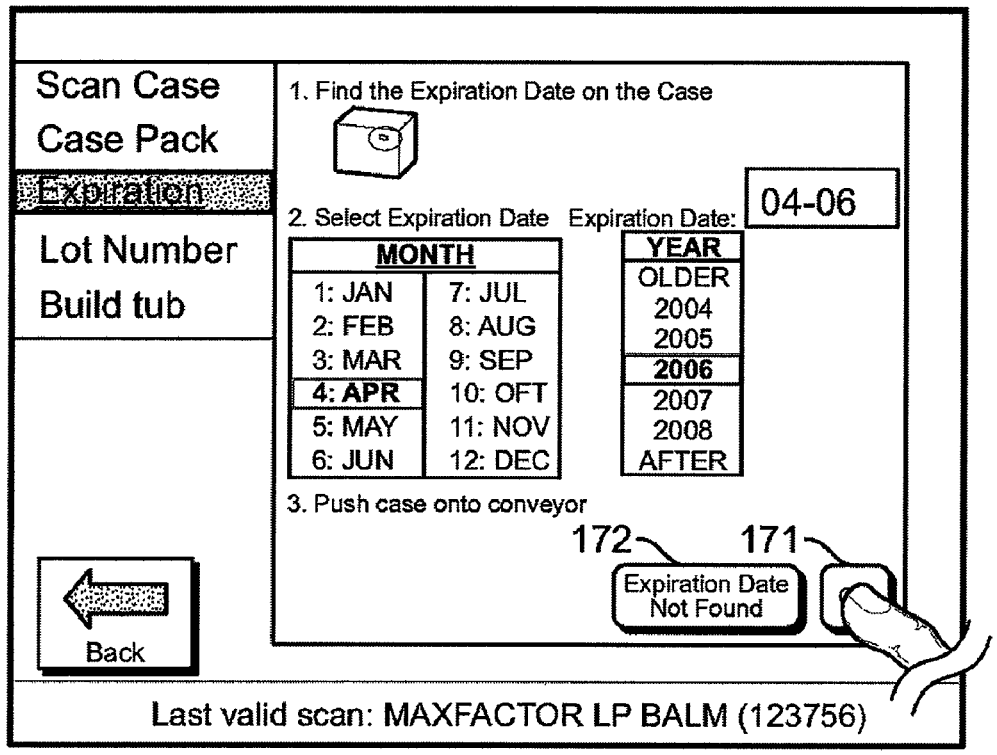
FIG. 9 is a further exemplary screen shot of the expiration window seen in FIG. 8.

FIGS. 8-9 depict screen shots shown on monitor 140 when the goods in case 120 have an expiration date that must be entered into system 20. As operator 116 receives pallet 100, scan case indicator 152 is bolded and underlined, while the remaining indicators of workflow readout 150 are grayed out. At this point, operator 116 scans a first case 120, causing information window 162 to appear at the bottom of home screen 140, as shown in FIG. 7. Because the last good scanned, in this example, Max Factor LP Balm, has an expiration date, expiration window 164 appears on home screen 140, as shown in FIG. 8. As seen, expiration window 164 comprises instructions 165, 166 and 167. Instruction 165 requests operator 116 to find the expiration date of the good contained in case 120. Additionally, instruction 165 may compare computer image 168 that will resemble the product that was scanned. In order to aid operator 116 in rapidly finding the expiration date, computer image 168 will indicate where the expiration date of the good is generally located. It will be understood by those in the art that image 168 may be a picture, icon, or graphic.

Instruction 166 requests operator 116 to enter the expiration date of the good into system 20. As seen, instruction 166 may comprise expiration date table 169, which comprises the numbers and names of the months of the year, and expiration year table 170, which comprises potential year numbers. Because monitor 138 has a touch-screen surface, operator 116 may enter the expiration date by pressing the correct date and year displayed on the expiration date table 169 and expiration year table 170, respectively.

As seen in FIG. 9, instruction 167 requests operator to push case 120 onto case conveyor 134. Once this task is complete, operator 116 may depress ok button 171, and move case 120 to labeler 130, and then to case conveyor 134 as described above. Instruction 167 also comprises not found button 172, which the operator may depress if he cannot find the expiration date on the good.

Figure 10:
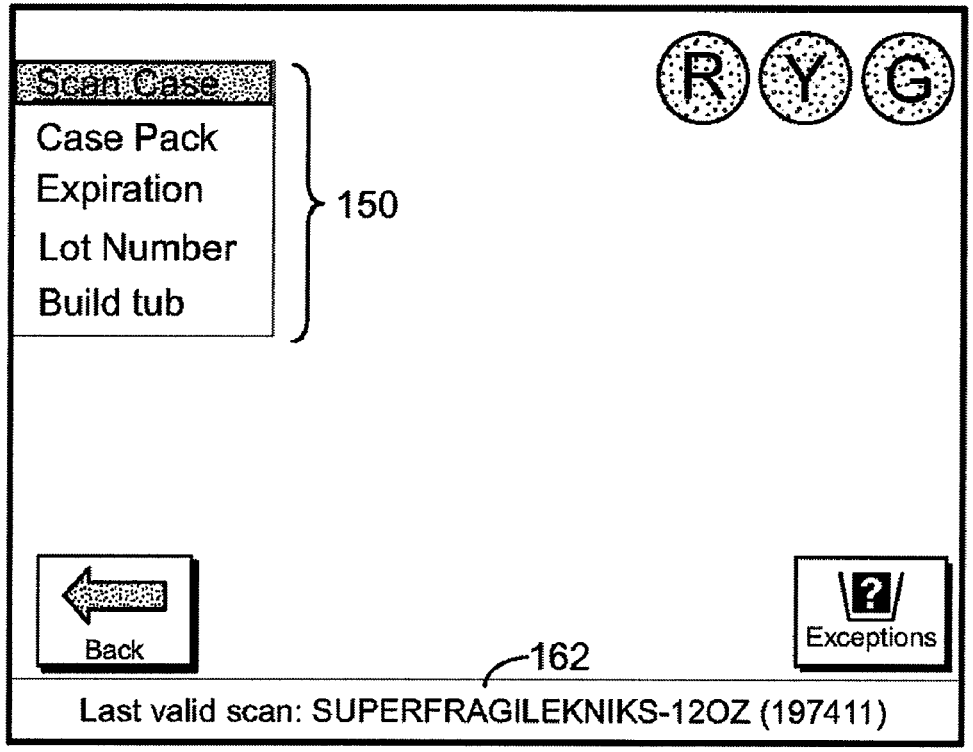
FIG. 10 is an exemplary screen shot of a lot number screen for use with the first embodiment of the present invention.
Figure 11:
FIG. 11 is an exemplary screen shot of a lot number window for use with the first embodiment of the present invention.

FIGS. 10-11 depict screen shots shown on monitor 140 when the goods in case 120 comprise a lot number that must be entered into system 20. As is known in the industry, every pharmaceutical product will have a lot number associated with it. This number indicates in which of the vendor's lots the product was manufactured. This is important because often with pharmaceutical products, a product error may be limited to a specific manufacturing plant, rather than the product as a whole. For example, a vendor may recall only aspirin that was manufactured with a certain lot number, rather than all of the aspirin the vendor shipped. As operator 116 receives pallet 100, scan case indicator 152 is bolded and underlined, while the remaining indicators of workflow readout 150 are grayed out. At this point, operator 116 scans the case 120, causing information window 162 to appear at the bottom of home screen 140, as shown in FIG. 10. Because the last good scanned, in this example, SUPERFRAGILE KNIKS, requires a lot number to be inputted into system 20, lot number window 180 appears on home screen 140, as shown in FIG. 11. As seen, lot number window 180 comprises instructions 182 and 186. Instruction 182 requests that operator 116 find the lot number of the good contained in case 120. Additionally, instruction 182 will have will have computer image 183 that will resemble the good that was scanned. In order to aid operator 116 in rapidly finding the lot number, computer image 183 will indicate where the lot number of the good is generally located.

Instruction 186 requests that operator 116 enter the lot number 184 of the good into system 20. As is known in the art, many lot numbers are alpha-numeric by nature. To aid operator 116 in inputting lot number 184 into system 20, instruction 186 may comprise alpha-numeric area 185, which comprises numbers, letters and some punctuation. Again, because monitor 138 has a touch-screen surface, operator 116 may enter lot number 184 by pressing the correct numbers, letters and/or punctuation displayed on alpha-numeric area 185. Once this task is complete, operator 116 may depress ok button 187, and move case 120 to labeler 130, and then to case conveyor 134 as described above. As seen, instruction 186 may also comprise not found button 188, which the operator may depress if he cannot find the lot number on the good.

As described above and as depicted, for example, in FIG. 13, when a pallet 100 is received, it may contain a variety of types of cases 120. In some instances, the size or shape of these cases 120 may make it impractical to move the cases within the distribution center, such as the instance with case 120' shown in FIG. 13. As such, system 20, and computer 22, 23 and software application 30 therein, may require, through instructions displayed on the interface screen, operator 116 to build tub 190 to better transport such abnormally sized cases 120'. FIGS. 12-16 depict interface screens shown on monitor 140 when system 20 instructs operator 116 to build such a tub 190.

Figure 12:
FIG. 12 is an exemplary screen shot of a build tub screen for use with the first embodiment of the present invention.
Figure 13:
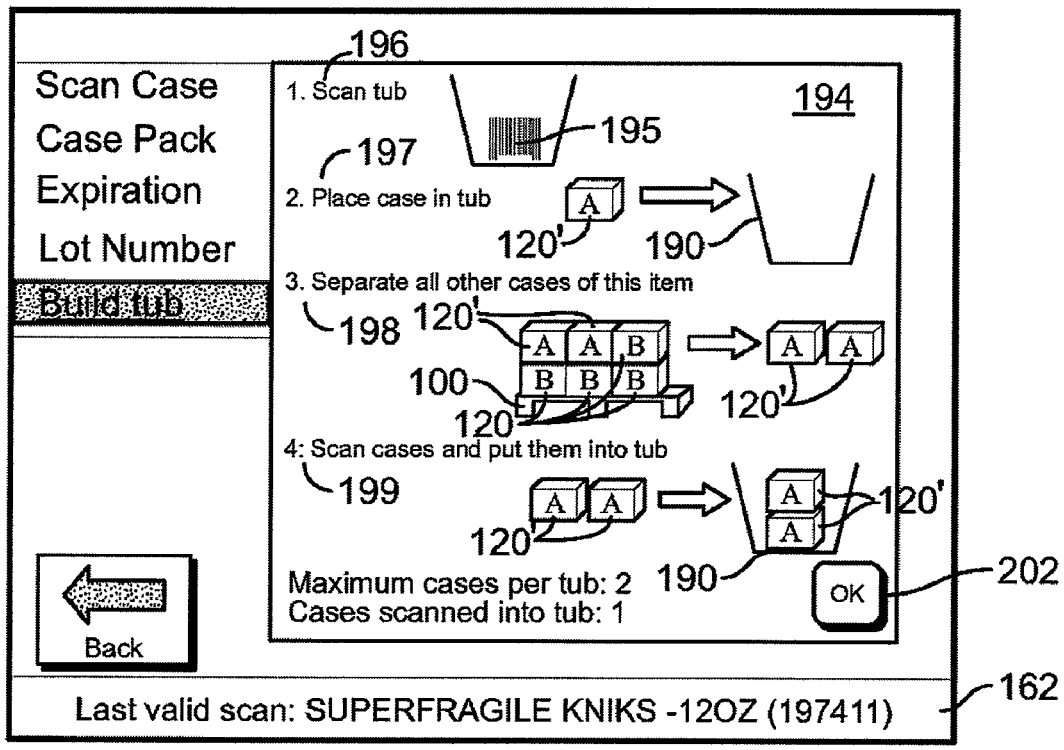
FIG. 13 is an exemplary screen shot of a tub creation window for use with the first embodiment of the present invention.
Figure 14:
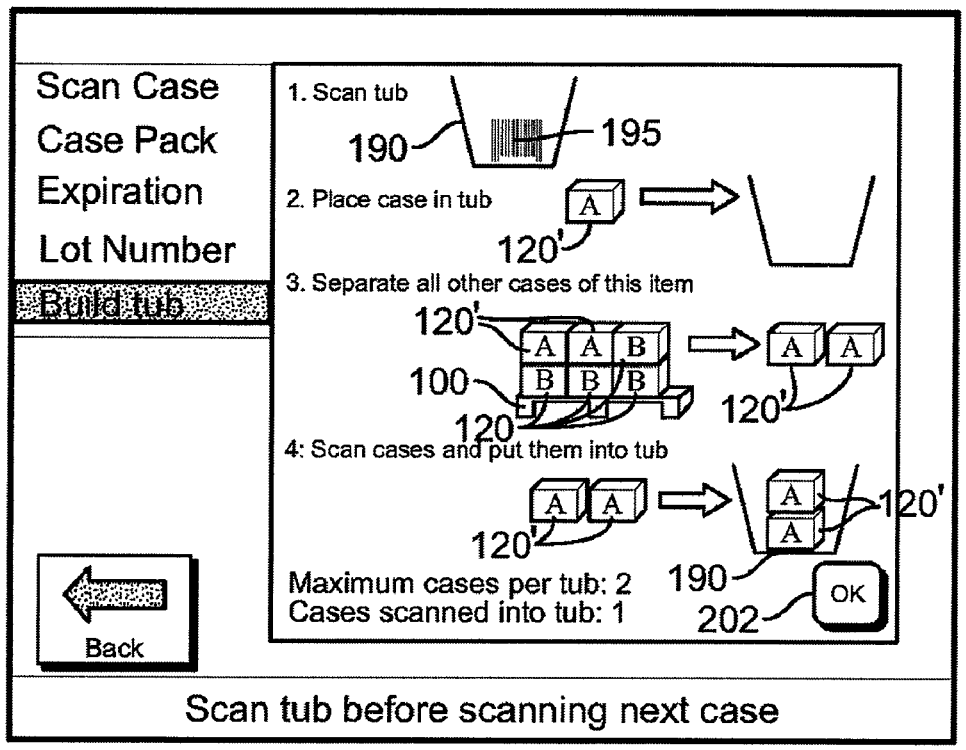
FIG. 14 is a further exemplary screen shot of the lot number window seen in FIG. 13.
Figure 15:
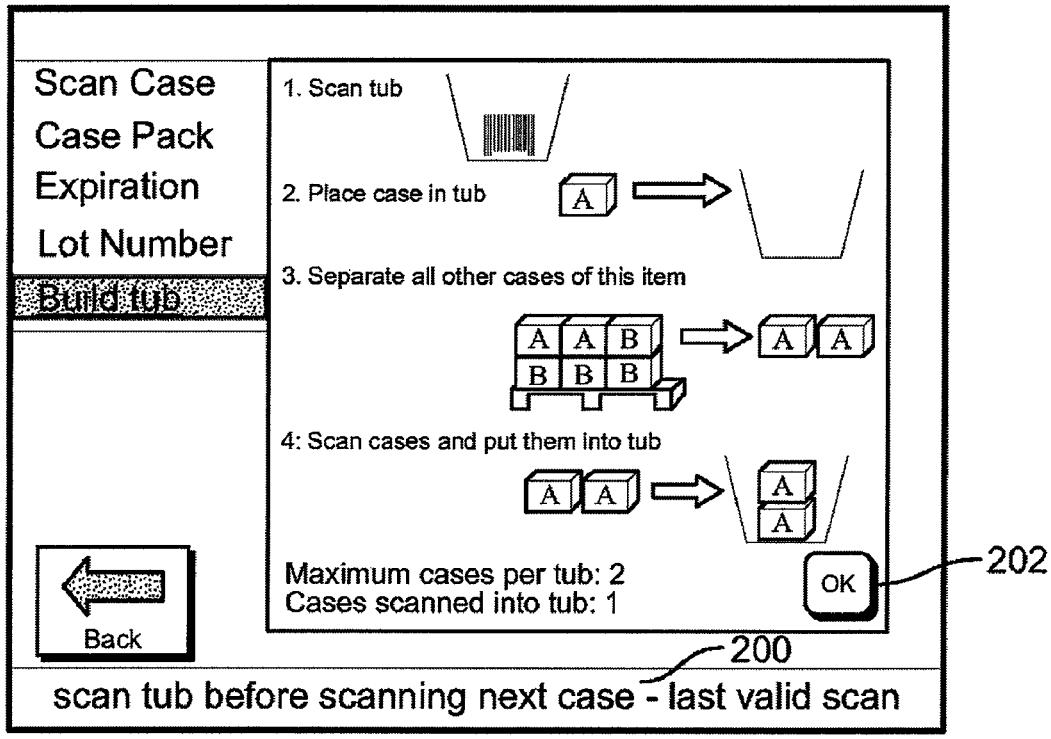
FIG. 15 is a further exemplary screen shot of the lot number window seen in FIG. 13.
Figure 16:
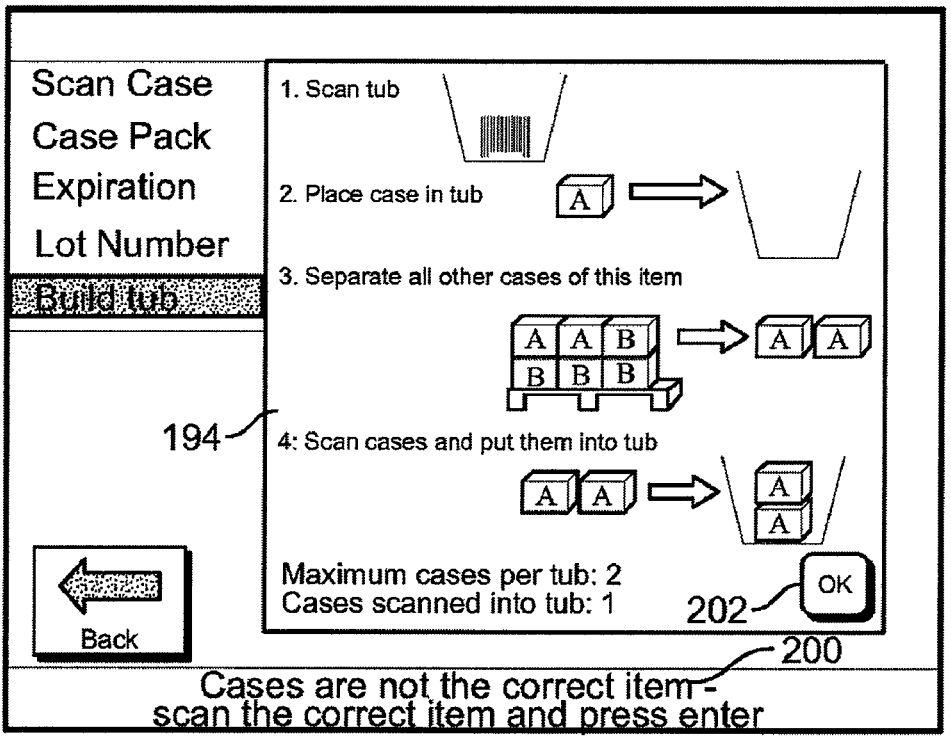
FIG. 16 is a further exemplary screen shot of the lot number window seen in FIG. 13.

As seen in the example depicted in FIG. 12, as operator 116 receives pallet 100, scan case indicator 152 is bolded and underlined, while the remaining indicators of workflow readout 150 are grayed out. At this point, operator 116 scans the case 120' using the scanner in communication with computers 22, 23 and software application 30, causing information window 162 to appear at the bottom of home screen 192, as shown in FIG. 13. Because the last good scanned, in this example, SUPERFRAGILE KNIKS, requires tub 190 to be created, tub creation window 194 appears on home screen 192. As seen, tub creation window 194 comprises instructions 196, 197, 198, 199, which are generated by the computers 22, 23 and software application 30, for display within the respective interface screens.

Instruction 196 requests that operator 116 scan the tub identifier or bar code 195 that is located on tub 190. This allows system 20 to track the location of tub 190, and also allows system 20, including computers 22, 23 and software application 30 and databases therein, to track which cases 120' are located within tub 190.

Once the identifier 195 for the tub 190 has been scanned into system 20, instruction 197 requests that operator 116 place the previously scanned case 120' into tub 190. In this way, system 20 now associates the first case 120' with tub 190, stores this association, and can therefore use this association information to locate the first case 120' within the distribution center. Instruction 198 requests that operator 116 remove any remaining cases 120' from pallet 100. Instruction 199 then requests that operator 116 scan the remaining cases 120' into system 20, then place each case 120 in tub 190.

As can be seen, tub creation window 194 also includes information window 200. As can be seen, information window 200 indicates how many of cases 120' may be placed into tub 190. This information is determined by system 20. For example, the size and weight of each case 120' may be predetermined and entered into system 20, as well as how many cases 120' have been scanned into system 20. Once all cases 120' have been scanned into system 20 and placed into tub 190, operator 116 clicks ok button 202, and places tub 190 on case conveyor 134. By way of example, and in no way limiting, if pallet 100 comprises three cases 120', but only two cases 120' may be placed in tub 190, then operator 116 will scan the first two cases 120' as described above, then repeat the process with a new tub 190 for the remaining case 120'. Once the process is complete, the interface screen shown in FIG. 16 may appear, indicating in window 200 that the tub is filled, and should be pushed on to case conveyor 134.

System 20 may also provide for the situation in which operator 116 inadvertently scans case 120 rather than case 120'. In this situation, tub creation window 194 will appear the same as the above interface screens. However, information window 200 will now indicate that the operator has scanned the incorrect case 120, and must scan the correct case 120', or end the "build tub" step in order to continue.

Occasionally, a case 120 will arrive that has been damaged. As such, system 20 may provide for situations in which a operator receives a damaged case 220. As described in more detail below, each damaged case 220 is sent to case hospital 340. However, under certain circumstances, damaged case 220 is so damaged that it cannot be transported without the aid of a tub 190. FIGS. 17-20 depict screen shots shown on monitor 140 when system 20 instructs operator 116 to send damaged case 220 to case hospital 340 station.

Figure 17:
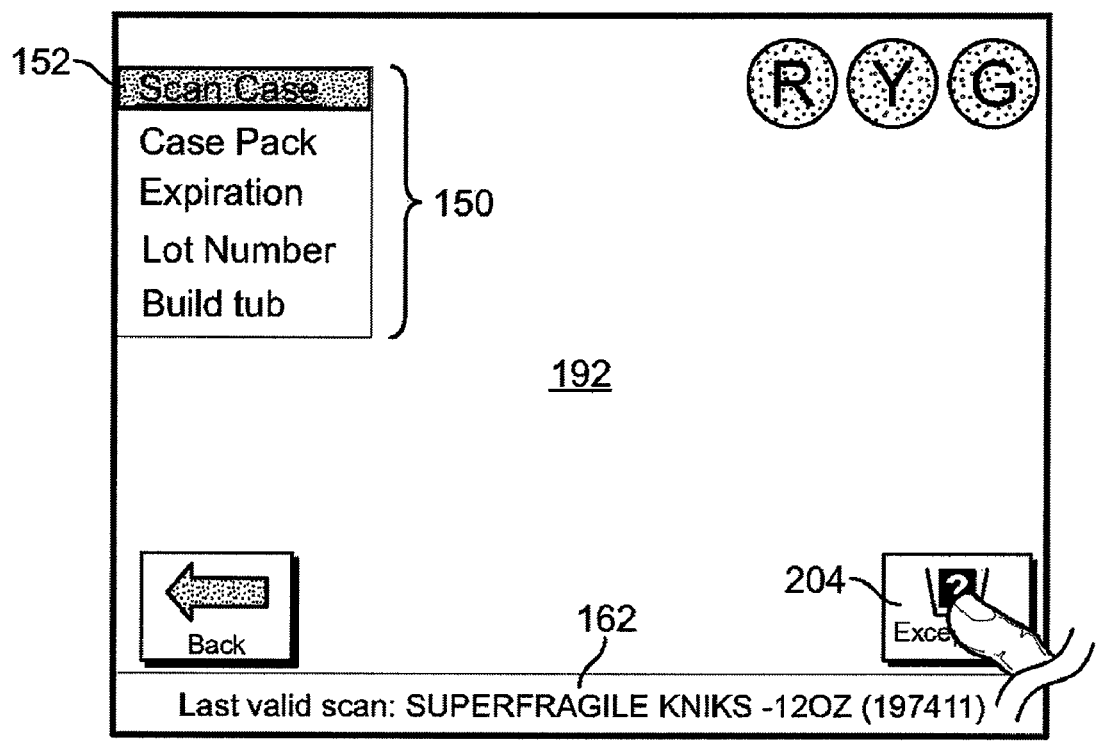
FIG. 17 is an exemplary screen shot of a damaged case screen for use with the first embodiment of the present invention.

As seen in FIG. 17, as operator 116 receives pallet 100, scan case indicator 152 is bolded and underlined, while the remaining indicators of workflow readout 150 are grayed out. At this point, operator 116 scans damaged case 220, causing information window 162 to appear at the bottom of home screen 192, indicating the identity of case 220. Once operator 116 realizes that case 220 is damaged, he presses exceptions button 204, as indicated in FIG. 17.

Figure 18:
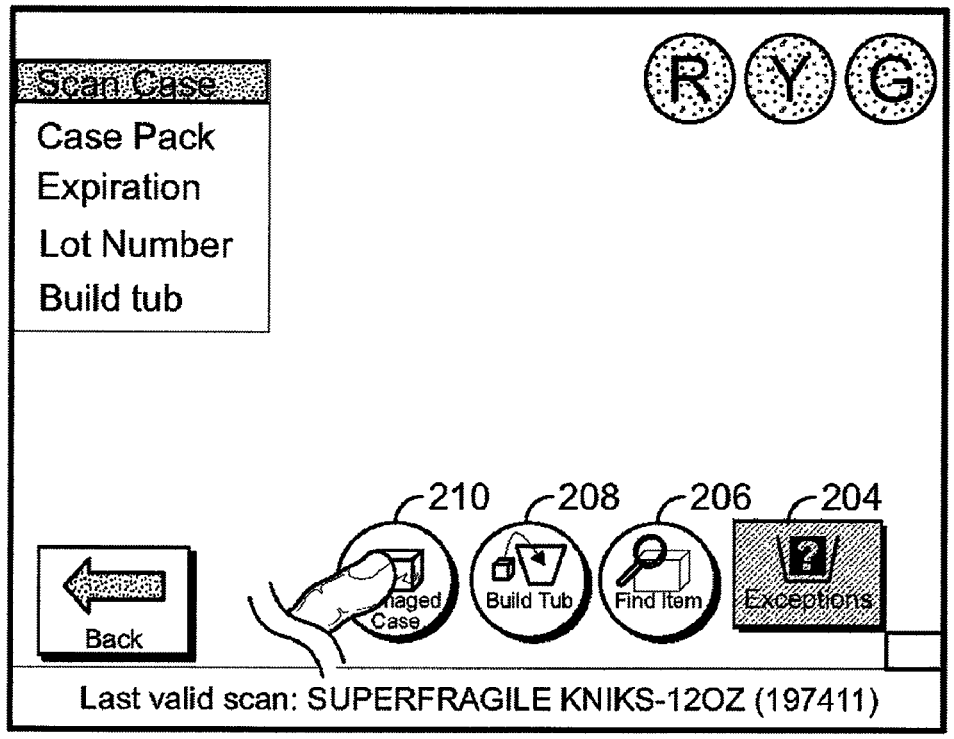
FIG. 18 is a further exemplary screen shot of the damaged case screen as seen in FIG. 17.
Figure 19:
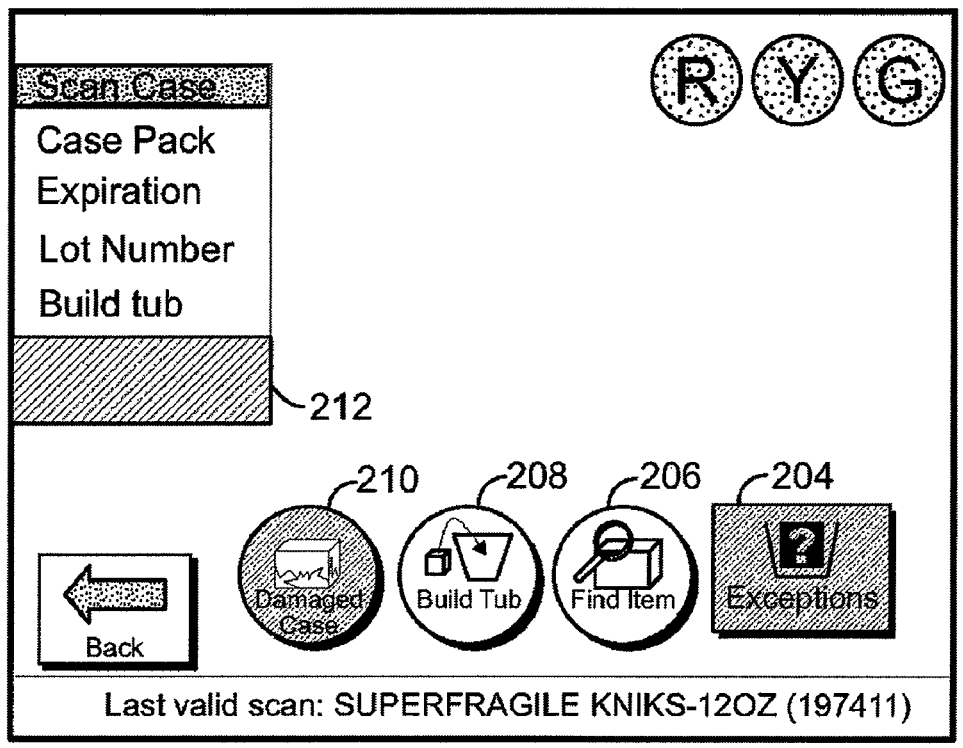
FIG. 19 is a further exemplary screen shot of the damaged case screen as seen in FIG. 18.

Pressing exceptions button 204 will cause three options, as depicted in FIG. 18, to appear—find item button 206, build tub button 208, and damaged case button 210. Selecting damaged case button 210 will highlight that button, and cause indicator 212 to appear on the interface screen.

Figure 20:
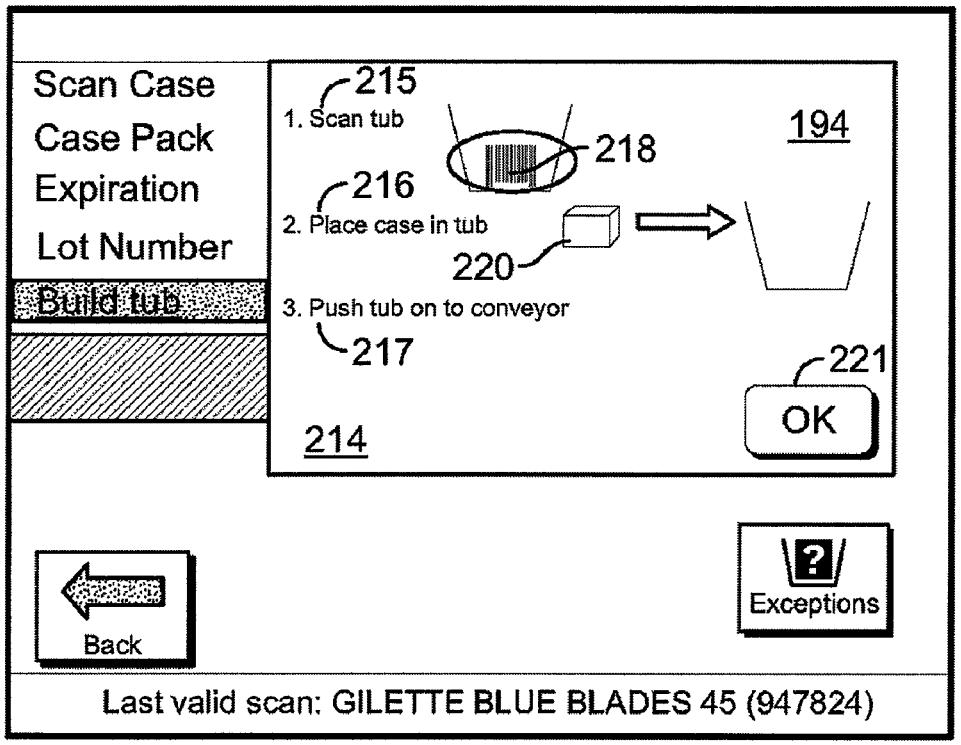
FIG. 20 is an exemplary screen shot of a damaged case tub window for use with the first embodiment of the present invention.

If damaged case 220 is so damaged that it cannot be conveyed, then operator 116 may select build tub button 208, which may cause damaged case tub creation window 214 to appear, as depicted in FIG. 20. In the alternative, if damaged case 220 comprises an item or product that would have required a tub to be conveyed, even if it weren't damaged, computers 22, 23 and software application 30 may be configured to automatically bring up damaged case tub creation window 214 when operator 116 selects damaged case button 210 on the interface screen.

As seen, damaged case tub creation window 214 is somewhat similar to tub creation window 194. Specifically, damaged case tub creation window 214 comprises instructions 215 through 217, as implemented through the respective interface screens.

Instruction 215 requests that operator 116 scan bar code 218 located on damaged case tub 219. This allows the computers 22, 23, software application 30 and respective database to track the location of damaged case tub 219, and to track which damaged case 220 is located within damaged case tub 219.

Once damaged case tub 218 has been scanned into system 20, instruction 216 requests that operator 116 place damaged case 220 into damaged case tub 219. Because of this, system 20 now associates damaged case 220 with damaged case tub 219, and can therefore locate case 220 at any point in the process. Finally, instruction 217 requests that operator 116 push damaged case tub 219 on to case conveyor 134, and press ok button 221 on the interface screen.

Figure 21:
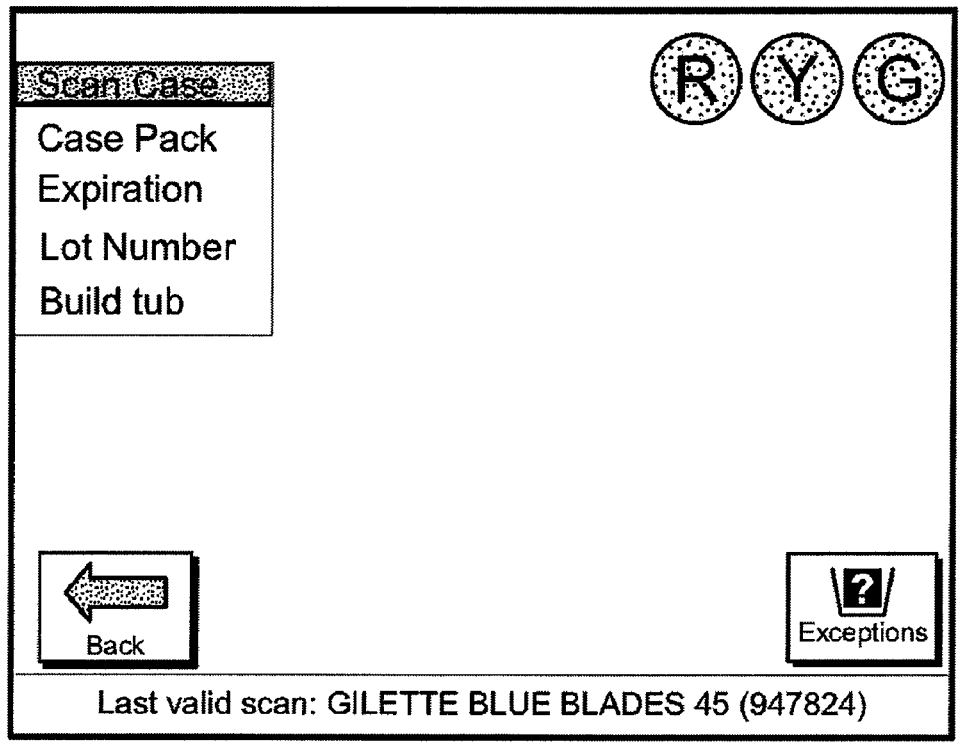
FIG. 21 is an exemplary screen shot of a case pack screen for use with the first embodiment of the present invention.
Figure 22:
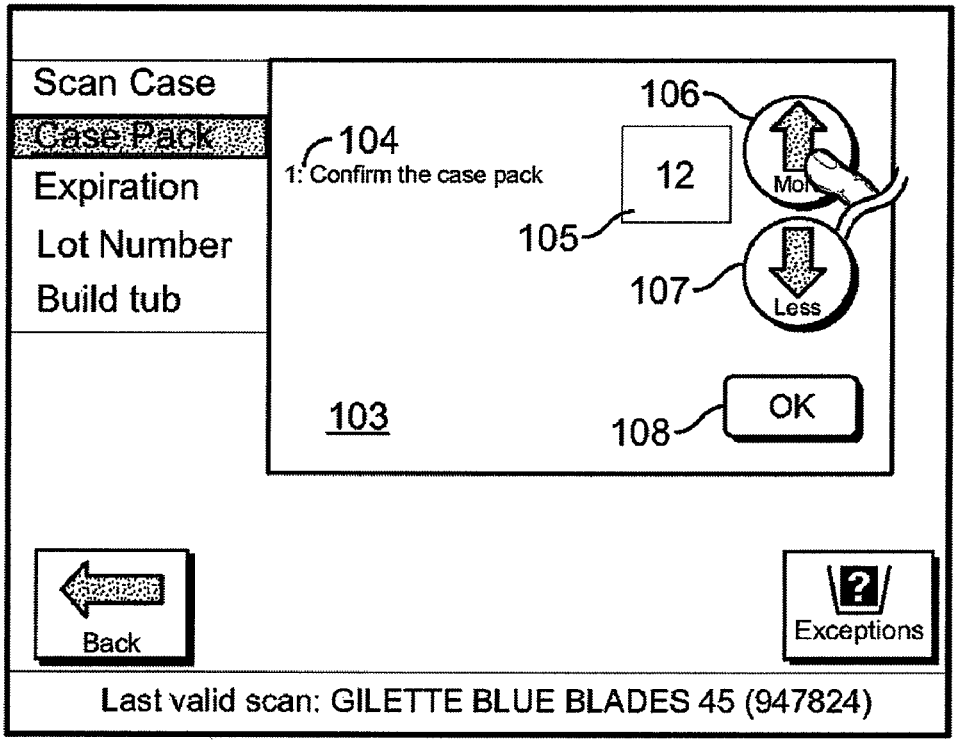
FIG. 22 is an exemplary screen shot of a case pack window for use with the first embodiment of the present invention.
Figure 23:
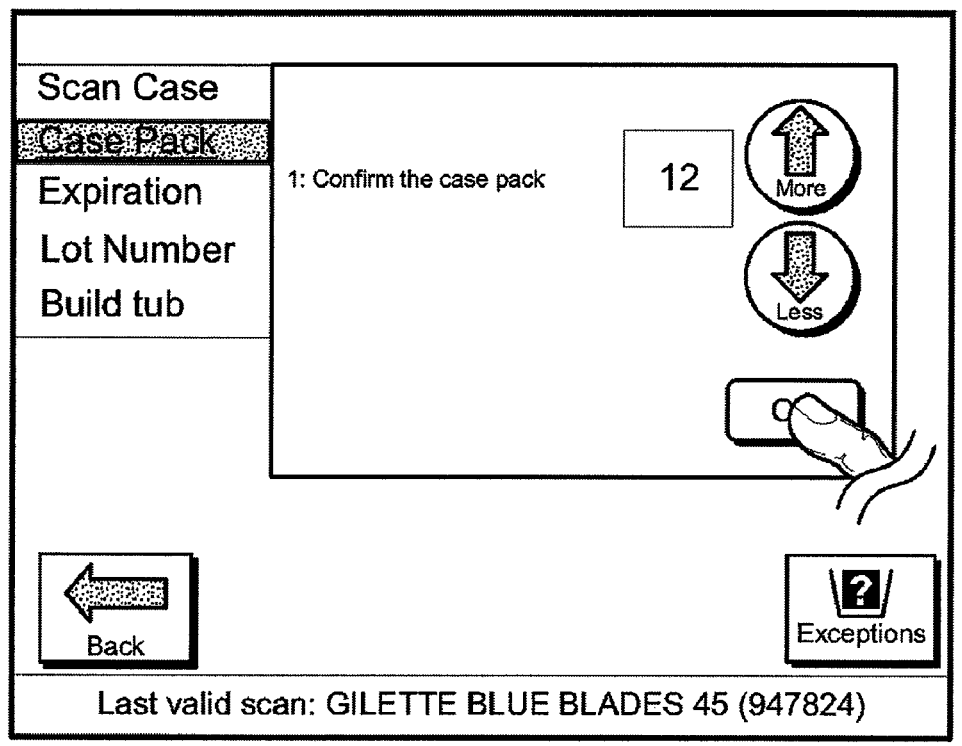
FIG. 23 is a further exemplary screen shot of the case pack window seen in FIG. 22.

Occasionally, operator 116 will inadvertently scan the bar code on a piece or an inner, rather than case bar code 122. As such, system 20 may allow operator 116 to correct this mistake. FIGS. 21-23 depict exemplary interface screens for display on screen monitor 138 when the computers 22, 23 and software application 30 instructs operator 116 to correctly scan the case bar code 122, through the interface screen.

As seen in FIG. 21, as operator 116 receives pallet 100, scan case indicator 152 is bolded and underlined, while the remaining indicators of workflow readout 150 are grayed out. At this point, operator 116 should scan case bar code 122, but inadvertently scans a bar code on a piece 125 or an inner 124. This will cause case pack window 103 to appear on touch screen monitor 138.

As depicted in FIG. 22, case pack window 103 may comprise instruction 104, which may comprise readout 105, more button 106 and less button 107. Operator 116 then will count the number of pieces 125 or inners 124 in case 120, and, using more button 106 or less button 107, will input or select the correct number of inners 124 or pieces 125 (commonly referred to as a "case pack") in readout 105. Once the proper number is displayed in readout 105, operator 116 presses or selects the ok button 108, and the computers 22, 23 and software application 30 automatically conveys the case 120 to the next station.

II. De-Trash Station

Figure 24:
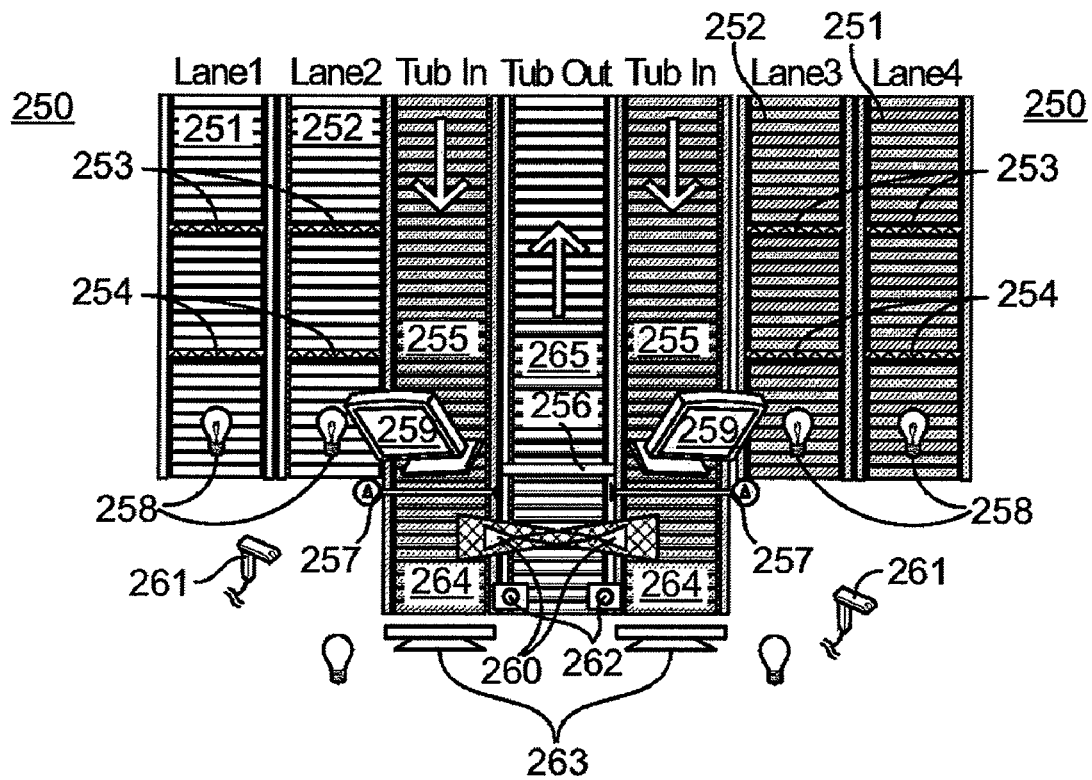
FIG. 24 is an overhead view of an exemplary de-trash workstation for use with the first embodiment of the present invention.
Figure 25:
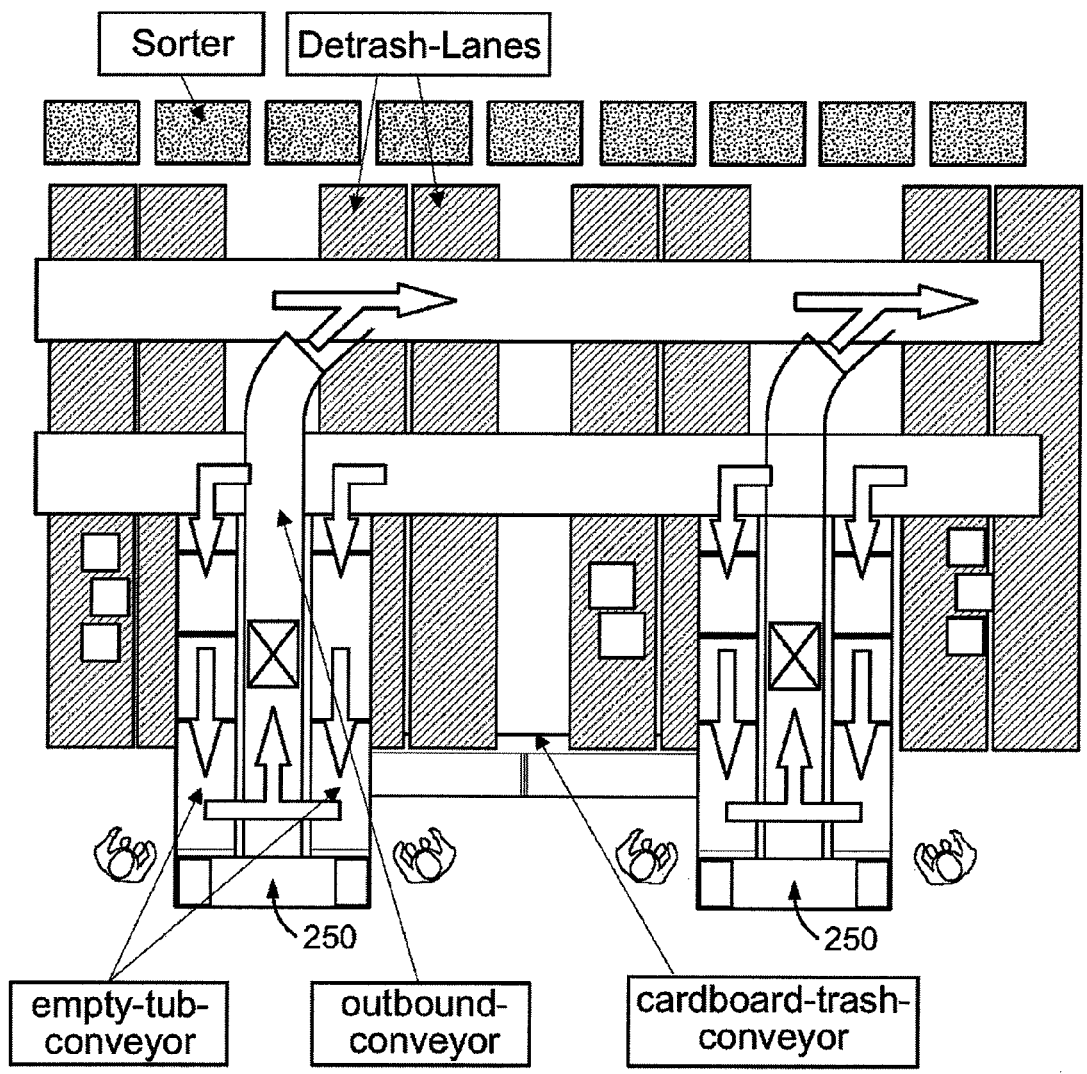
FIG. 25 is an overhead view of an exemplary layout of the de-trash stations for use with the first embodiment of the present invention.

From the case check-in station, case 120 is conveyed to de-trash station 250. FIG. 24 depicts an exemplary de-trash station 250. As seen in FIG. 25, several de-trash stations 250 may be employed at one time. While de-trash station 250 may comprise many components, depending on the needs of the various distribution center, an exemplary de-trash station 250, as depicted in FIG. 24, may comprise a first incoming lane 251 and a second incoming lane 252. Each incoming lane 251 and 252 may comprise a first case stopper 253 and a second case stopper 254. De-trash station 250 may further comprise a tub in lane 255, a photo eye 256, a tub induction switch 257, a green light 258, touch-screen monitor 259, tub scanner 260, hand scanner 261, a tub complete button 262, and a unit scale 263, each of which can be in communication with the computers 22, 23 and software application 30 therein. As described more fully below, each de-trash station 250 may double as a case hospital station.

A. Normal De-Trash

As stated above, each case 120 may contain numerous inners 124, and each inner 124 may comprise one or more pieces 125. In the depicted embodiment, operator 270 may be tasked by the respective interface screens generated by the computers 22, 23 and software application 30, to conduct one of several de-trash levels, depending on the nature of case 120. Exemplary de-trash levels, as well as the graphical icons that may be displayed through the interface screens on monitor 259, are depicted and explained in FIG. 26 through FIG. 33. While not shown, if a supervisor assigned to the de-trash station, or any other staff member at distribution center 10, believes that the icons below will not sufficiently describe how to de-trash an item, the supervisor may take a digital picture of how the de-trashed item should appear and upload the picture into one or more interface screens generated by computers 22, 23 and software application 30, and displayed on monitor 259. Thereafter, the interface screen(s) may display both the icons shown in FIGS. 26-33 as well as the associated digital picture, or just the icons or just the picture.

For de-trash level 1, computers 22, 23 and software application 30 requests or communicates to the operator 270 to place the unopened case 120 into tub 190. For de-trash level 2, computers 22, 23 and software application 30 requests operator 270 to remove lid 121 from case 120, then place case 120, without lid 121, into tub 190. For de-trash level 3, computers 22, 23 and software application 30 requests operator 270 to remove lid 121 from case 120, then place each inner 124 into tub 190. For de-trash level 4, computers 22, 23 and software application 30 requests operator 270 to remove lid 121 from case 120, then pour each inner 124 into tub 190. For de-trash level 5, computers 22, 23 and software application 30 requests operator 270 to remove lid 121, open each inner 124, then place each piece 125 into tub 190. For de-trash level 6, computers 22, 23 and software application 30 requests operator 270 to remove lid 121, open each inner 124, then pour each piece 125 into tub 190. De-trash levels 7 and 8 relate to cases 120 that do not contain any inners 124, but merely contain pieces 125. For example, in de-trash level 7, computers 22, 23 and software application 30 requests that operator 270 remove lid 121 from case 120, then place each piece 125 into tub 190. In de-trash level 8, computers 22, 23 and software application 30 requests that operator 270 remove lid 121 from case 120, then pour each piece 125 into tub 190.

It will be understood that, for de-trash levels 3, 5 and 7, operator 270 is requested to place each inner 124 or piece 125 into tub 190 in a systematic, organized manner. In this way, the maximum number of inners 124 or pieces 125 may be placed in tub 190. In contrast, for de-trash levels 4, 6 and 8, operator 270 is requested to pour each inner 124 or piece 125 into tub 190 in a seemingly haphazard way. Again, system 20 may be pre-programmed to distinguish between which inners 124 or pieces 125 must be placed, and which inners 124 or pieces 125 must be poured, into tub 190, but generally, the distinction is based on the nature of the inners 124 or pieces 125. By way of example, and in no way limiting, if each inner 124 is a cardboard box full of medicine, such as Aspirin, operator 270 may be asked to place such inners 124 into tub 190 (de-trash level 3). However, if each inner 124 is a plastic bag full of athletic socks, operator 270 may be asked to pour such inners 124 into tub 190 (de-trash level 4).

In the depicted embodiment, there are a number of de-trash workflows operator 270 may encounter, and that system 20 may provide for through the computers 22, 23 and software application 30, and respective interface screens. Some of these workflows, as described in detail below, include normal or regular overflow tub, damaged product, mismatched item, incorrect de-trash level, dirty tub and damaged tub workflows.

1. Normal Workflow

Figure 34:
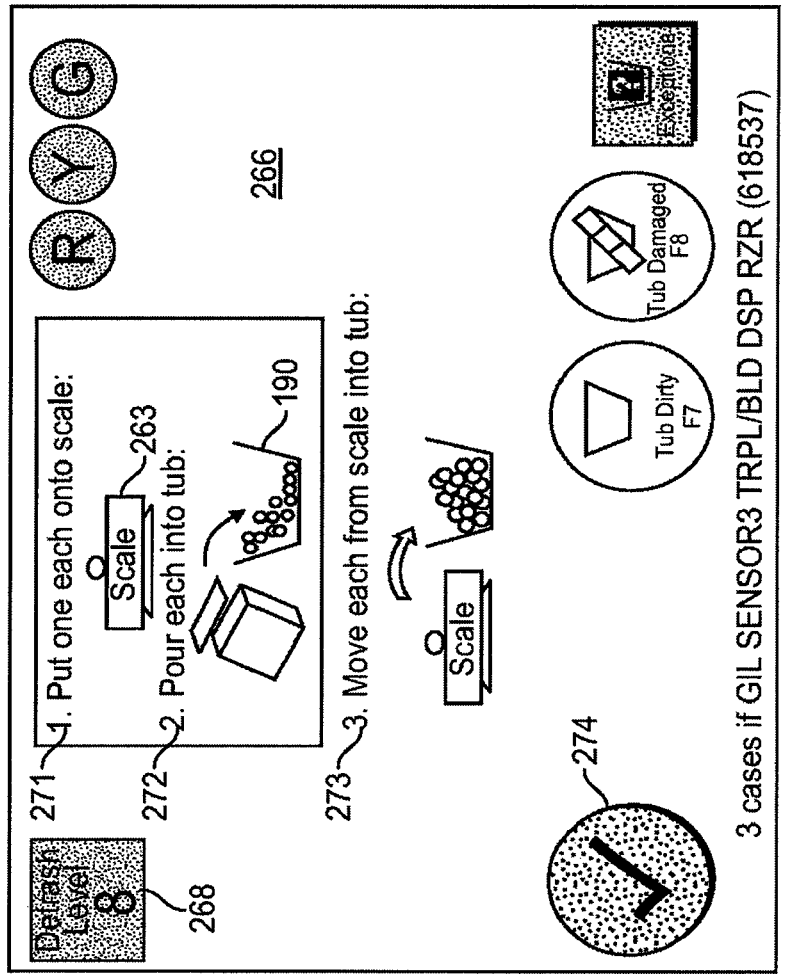
FIG. 34 is an exemplary screen shot of a de-trash screen for use with the first embodiment of the present invention.
Figure 35:
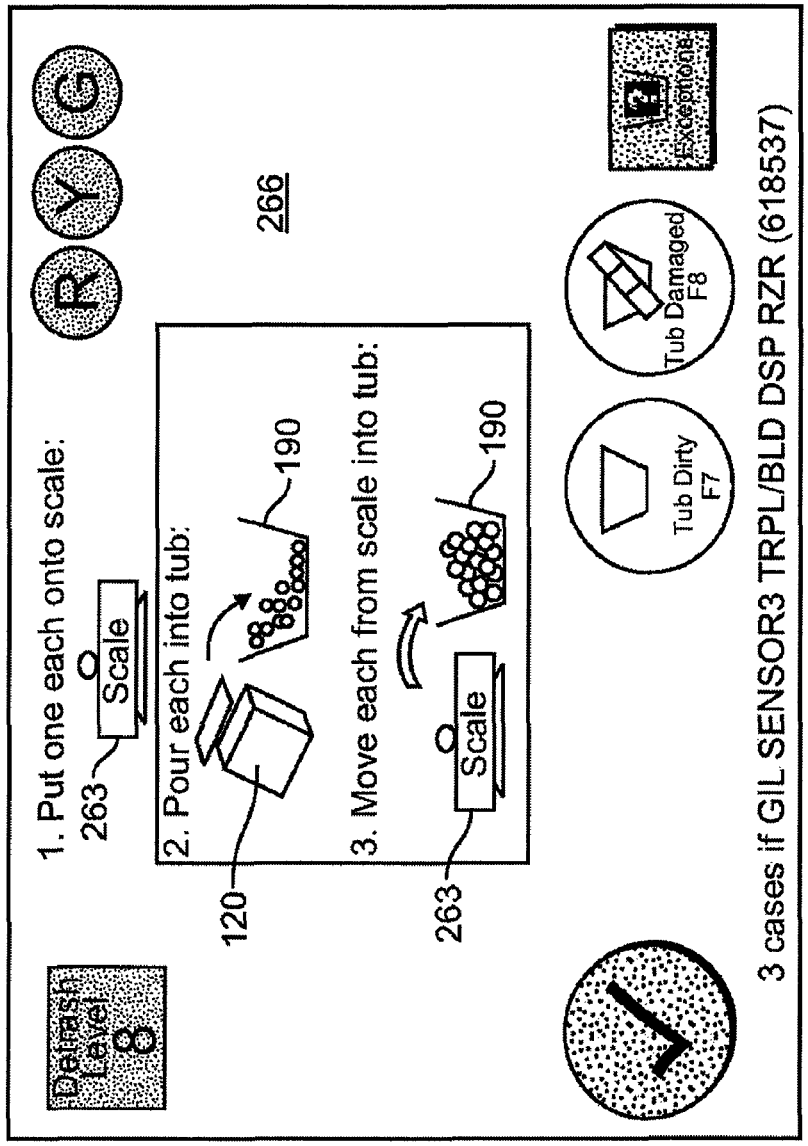
FIG. 35 is a further exemplary screen shot of the de-trash screen as seen in FIG. 34.
Figure 36:
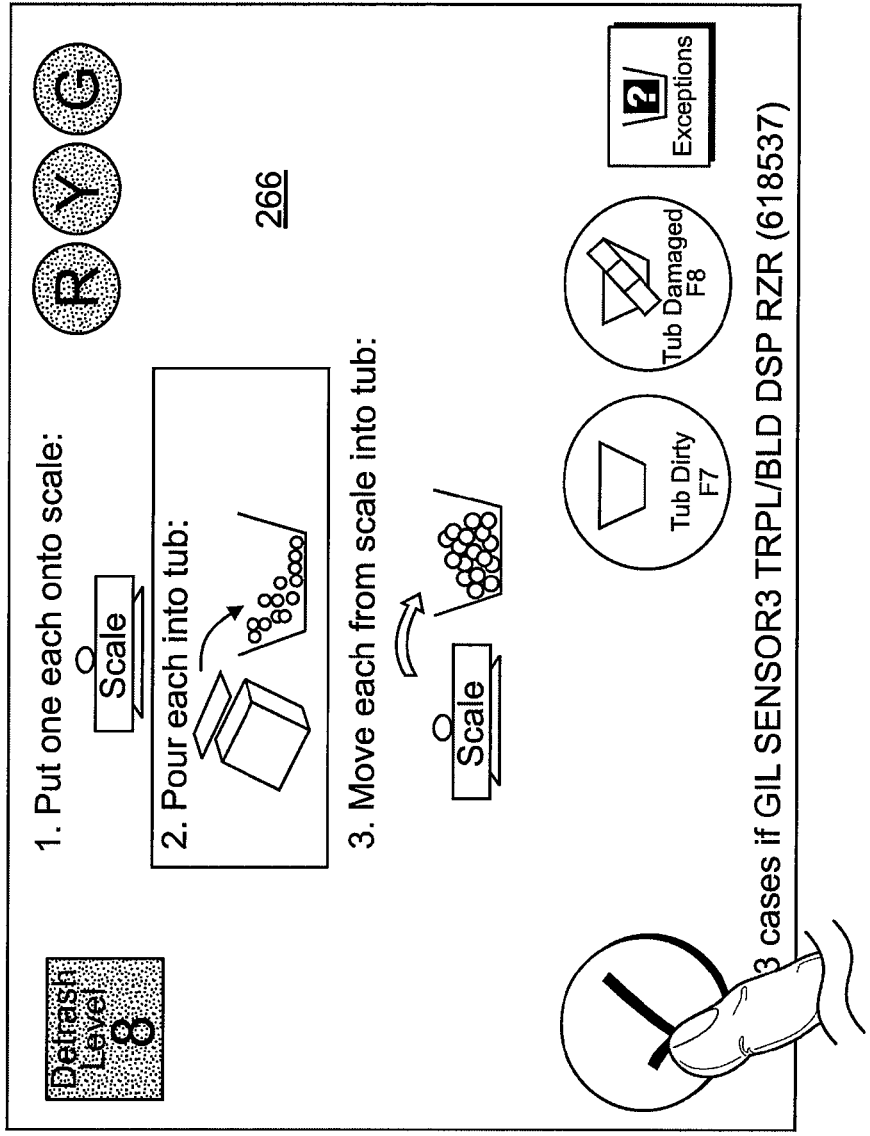
FIG. 36 is a further exemplary screen shot of the de-trash screen as seen in FIG. 35.

FIG. 34 through FIG. 36 depict exemplary interface screens shown on monitor 259 during normal workflow. An empty tub 190 is transported to filling point 264 automatically by tub-in conveyor 255. At this point, tub 190 is entered into system 20 by automatically scanning it with tub scanners 260. As described below, if tub 190 is manually inserted, tub scanners 260 will automatically scan that tub into system 20 as well.

As seen, both first incoming lane 251 and second incoming lane 252 comprise green light 258. Which ever of first incoming lane 251 or second incoming lane 252 that comprises the next case 120 that needs to be de-trashed will be indicated by an illuminated green light 258. Operator 270 then scans the case 120 that is located in the incoming lane with the illuminated green light 258. Depending on the contents of that case 120, system 20 will determine which level of de-trash must be employed, then display the proper icons and instructions on touch screen monitor 259. FIGS. 34-36 depict exemplary interface screens for a de-trash level of 8, but it will be appreciated by those in the art that any of the de-trash levels described above may be employed and may be displayed by system 20. As seen, the interface screen in FIG. 34 comprises, among other elements, window 266, de-trash level indicator 268, instructions 271, 272 and 273 and slug complete button 274.

After scanning case 120 into system 20, then reviewing monitor 259 for instructions, operator 270 then places one de-trash unit on unit scale 263. Because, in this example, the de-trash level is 8, the screen shot in FIG. 34 requests that operator 270 place one piece 125 on unit scale 263. At first, instruction 273 is grayed-out, indicating to operator 270 that he or she is not to complete that instruction yet. As seen in FIG. 35, once a stable weight is detected on unit scale 263, instruction 271 will become grayed-out, and instruction 273 will become highlighted. Operator 270 will then proceed to de-trash the remaining units into tub 190. Again, because the depicted example is a level 8 de-trash, this means that operator 270 will then pour the remaining pieces 125 into tub 190, including the original piece 125 that was on scale 263.

When operator 270 has finished filling tub 190 and there are no more cases 120 in the incoming lane with the illuminated green light 258, operator 270 presses lane complete button 274, and tub 190 will be conveyed to the next appropriate station.

Because unit scale 263 may be engaged to or connected to computers 22, 23, software application 30, and the respective database, system 20 may determine if operator 270 inadvertently leaves a de-trash unit on unit scale 263. If this occurs, the display on touch screen monitor 259 will indicate the error to operator 270, and will not allow tub 190 to be conveyed away from filling point 264. Rather, tub 190 will remain at filling point 264 for operator 270 to remove the de-trash unit from unit scale 263 and place it in tub 190. Once unit scale 263 is cleared, tub 190 is automatically conveyed, and an initial height check is performed on the tub using photo eye 256. The computers 22, 23 and software application 30 may have predetermined height clearances which can be used to compare to the measured height by photo eye 256 and communicated to all received by computer 22, 23. In one embodiment, the predetermined height clearance is less than or equal to 320 mm. However, it will be appreciated by those in the art that the scope of the present invention includes predetermined height clearances that may be more or less, and can be set by the system administrator.

As tub 190 moves further down stream, a weight check and additional height check is done on central weighting stations (not shown). These additional weighting stations may be engaged to or connected to computer 22, 23 and software application 30 for tracking of the actual weight and height of tubs 190, which is stored in the database. The computers 22, 23 and software application 30 also determine if each tub 190 is within acceptable predetermined tolerances so that the tubs may be conveyed about the distribution center without error occurring.

Once tub 190 leaves de-trash station 250, the next empty tub 190 is driven or conveyed to filling point 264 automatically, unless the automatic tub induction switch 257 is turned to the manual position, as described more fully below.

As noted above, during case check-in, system 20 may indicate and display that certain cases 120' and/or pieces 125 may not be conveyable without the use of a tub 190. At de-trash station 250, these tubs 190 are treated in the same manner as a case 120. In other words, tub 190 is conveyed by either first incoming lane 251 or second incoming lane 252, and operator 270 performs the regular de-trash procedure described above, moving case 120', inners 124 or pieces 125, depending on the de-trash level, from tub 190 into empty tub 190 that is located at filling point 264. The de-trashed tub 190 will then be stacked to the side or behind operator 270 to be used later.

When operator 270 determines that the stack of empty tubs 190 is at a sufficient level, he may stop the automated delivery of tubs 190 by system 20 by turning tub induction switch 257 to manual insertion which is communicated to computers 22, 23 and software application 30. Once this occurs, operator 270 removes an empty tub 190 from the stack of tubs that is either behind or to the side of him and places it on filling point 264. From here, the tub bar code 195 is automatically scanned by tub scanner 260 the same way an automatically fed tub 190 is scanned. The rest of the normal workflow de-trash process proceeds in the same way as described above. This process can be repeated until tub induction switch 257 switch is moved back to the automatic mode for empty tub feeding.

2. Overflow Tub Workflow

Occasionally, as operator 270 begins the regular de-trash process described above, he will notice that not all of the de-trash units, for example, in FIGS. 37-41, not all of the pieces 125, that are poured into tub 190, will fit. Consequently, system 20 and computers 22, 23 and software application 30 therein, provides for an overflow tub workflow procedure.

Figure 37:
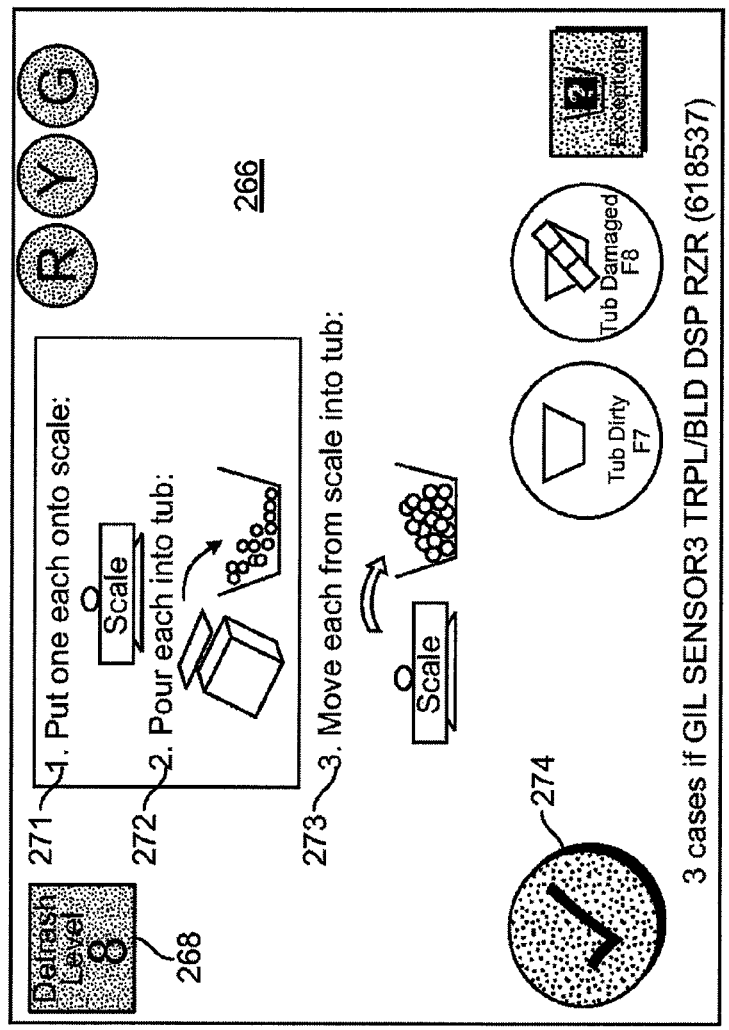
FIG. 37 is an exemplary screen shot of the overflow de-trash screen for use with the first embodiment of the present invention.
Figure 38:
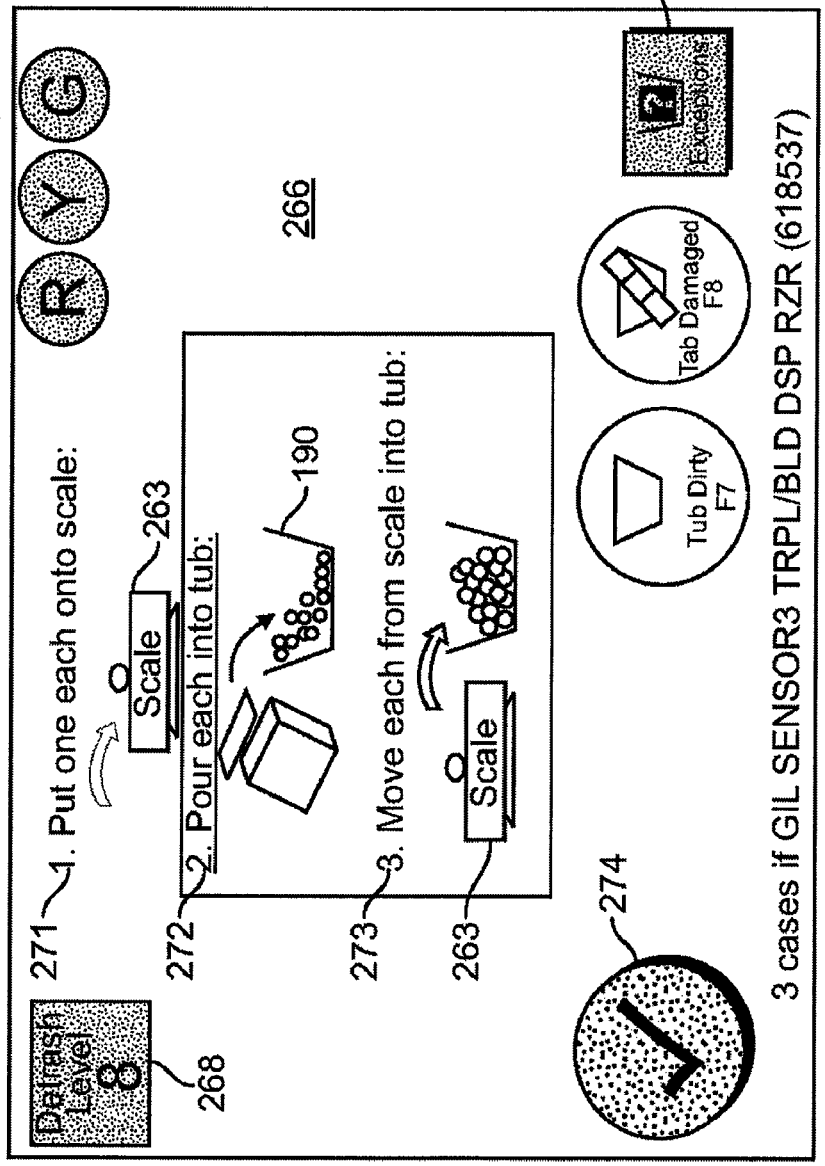
FIG. 38 is a further exemplary screen shot of the overflow de-trash screen as seen in FIG. 37.
Figure 39:
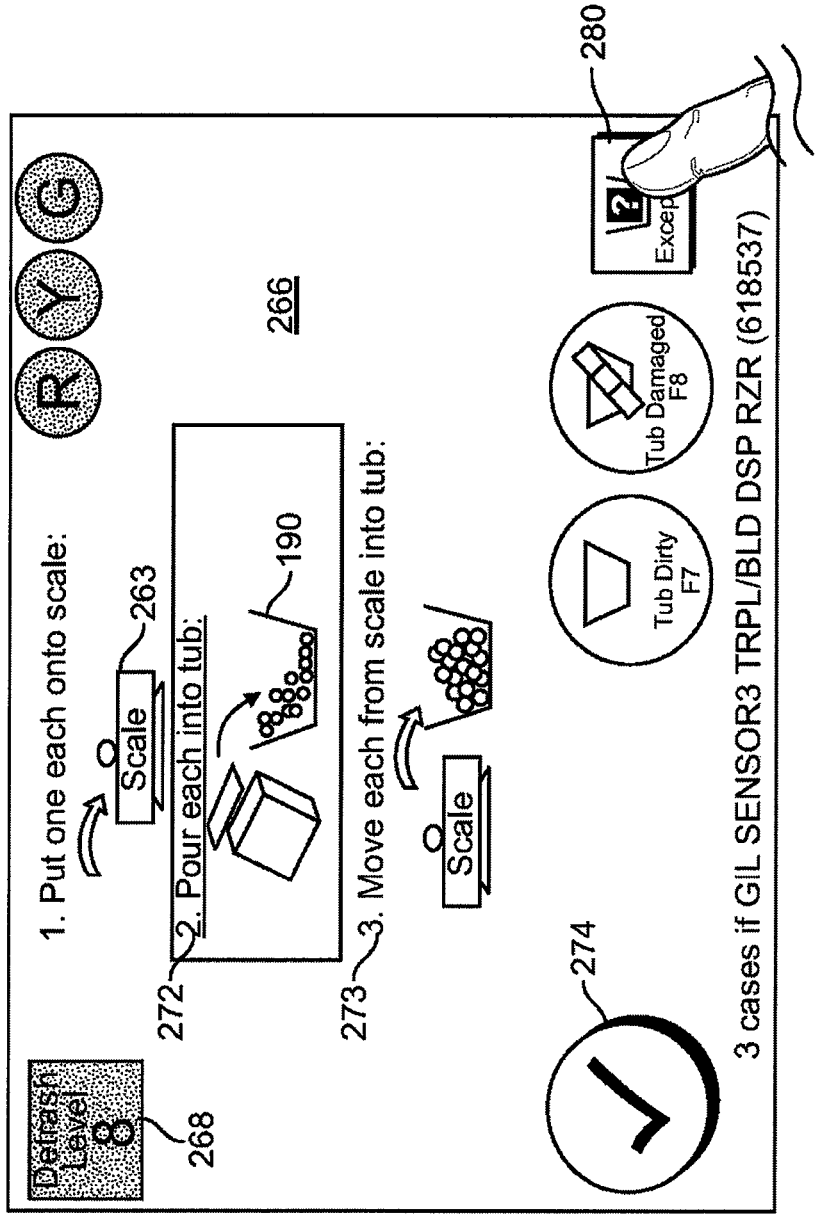
FIG. 39 is a further exemplary screen shot of the overflow de-trash screen as seen in FIG. 38.
Figure 40:
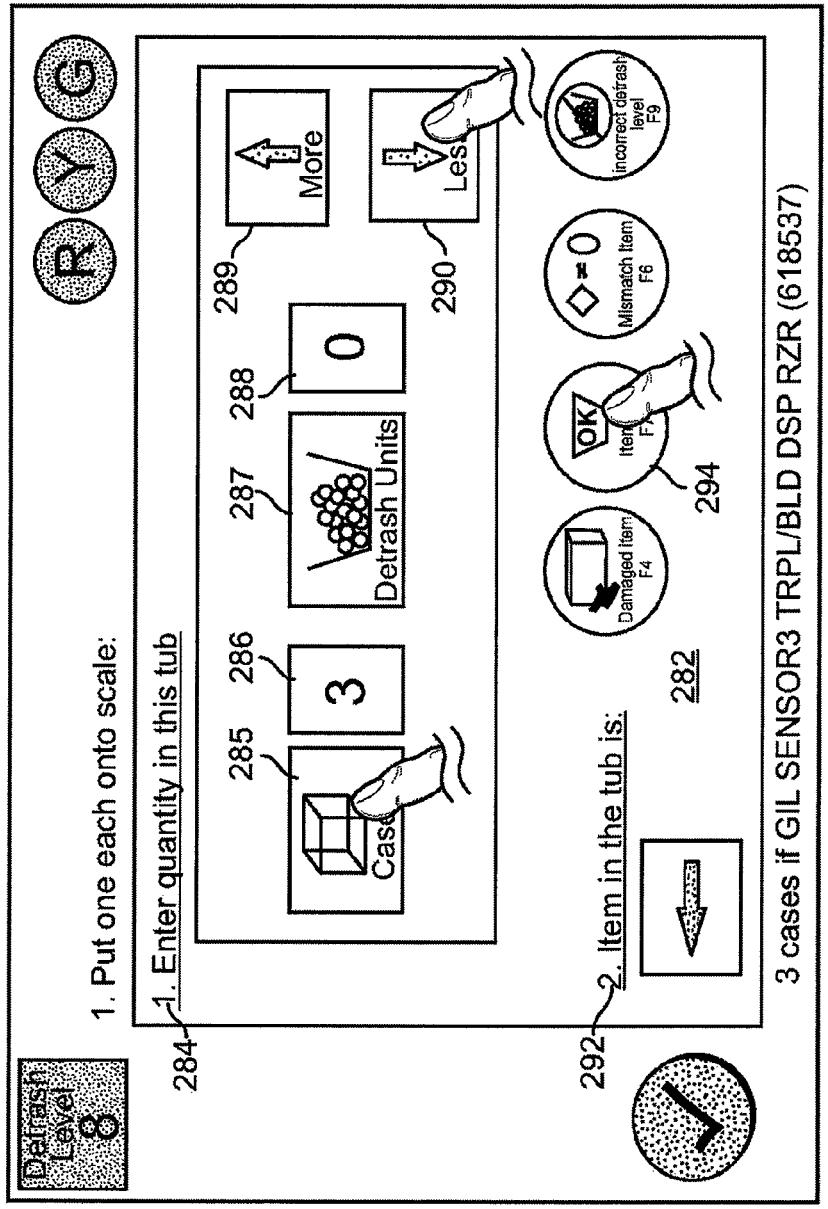
FIG. 40 is a further exemplary screen shot of the overflow de-trash screen as seen in FIG. 39.
Figure 41:
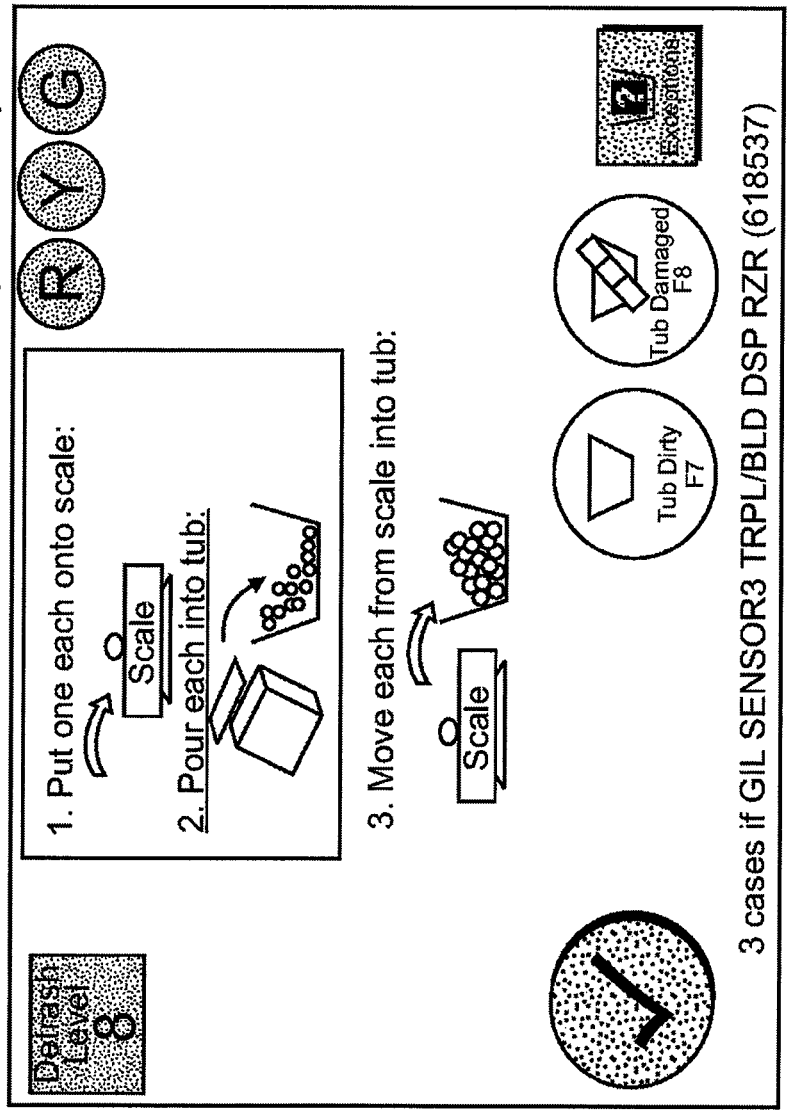
FIG. 41 is a further exemplary screen shot of the overflow de-trash screen as seen in FIG. 40.

As shown in FIG. 37, the interface screen for this procedure may be identical to the screenshot of the normal workflow de-trash procedure. When operator 270 takes the de-trash unit, for example, piece 125, off of unit scale 263, instruction 273 will be enabled, along with exceptions button 280 with the interface screen. If the piece 125 from unit scale 263 is one of those that will not fit in tub 190, operator 270 may place it aside. Operator 270 then depresses exceptions button 280, as depicted in the interface screen of FIG. 39. This will bring up overflow window 282, as shown in the interface screen of FIG. 40.

As seen, overflow window 282 comprises instructions 284 and 292. Instruction 284 further comprises a cases button 285, case number indicator 286, de-trash unit button 287, de-trash unit number indicator 288, more button 289 and less button 290. Operator 270 first enters the quantity being put in the current tub 190 by first selecting cases button 285 or de-trash units button 287, whichever is appropriate, using more button 289 or less button 290 to input or select how many of the appropriate units are currently in tub 190. In the exemplary embodiment depicted in FIG. 40, operator 270 has selected cases button 285, then has used the more button 289 and the less button 290 to input/select that three cases are currently in tub 190, as shown in case number indicator 286.

Once the proper number of either cases or de-trash units is shown, operator 270 presses product ok button 294 under instruction 292 to indicate that the product in the tub is not damaged. When this button is pressed, a transport order is created and tub 190 is taken away. Operator 270 then continues the normal de-trash workflow with the remaining de-trash units, using a second empty tub 190.

3. Damaged Product Workflow

Occasionally, as operator 270 begins the regular de-trash process described above, he will notice that some or all of the product is damaged. Consequently, system 20 provides for a damaged workflow procedure.

Figure 42:
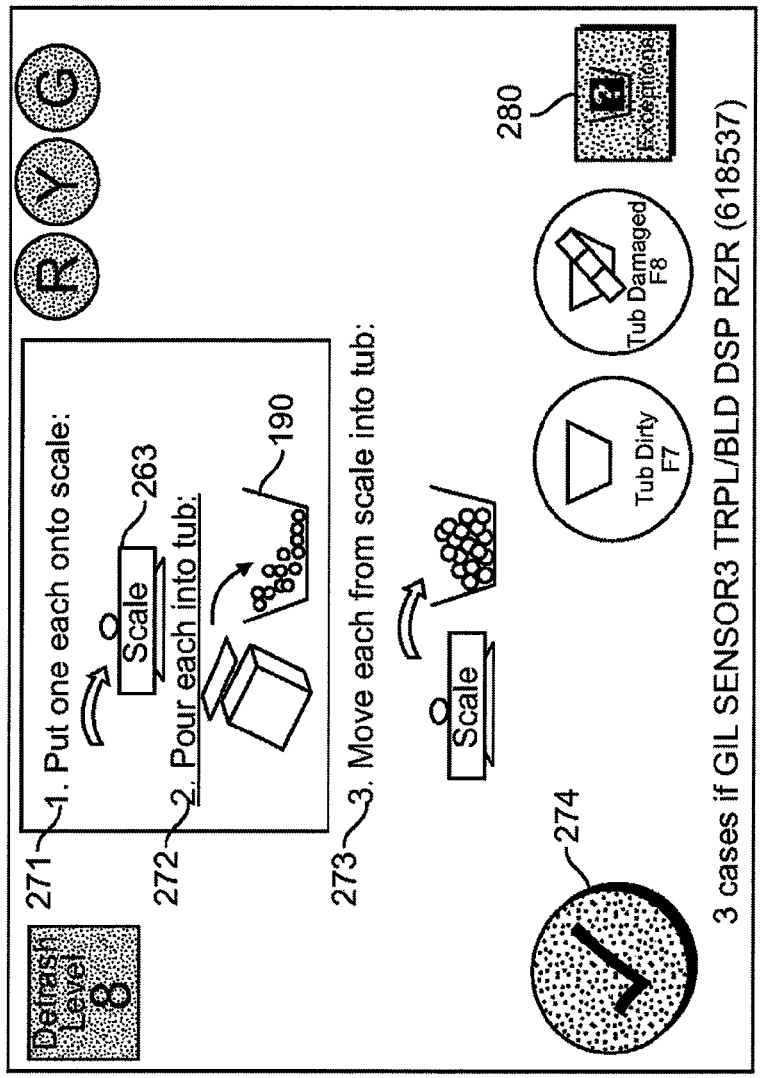
FIG. 42 is an exemplary screen shot of a damaged product screen for use with the first embodiment of the present invention.
Figure 43:
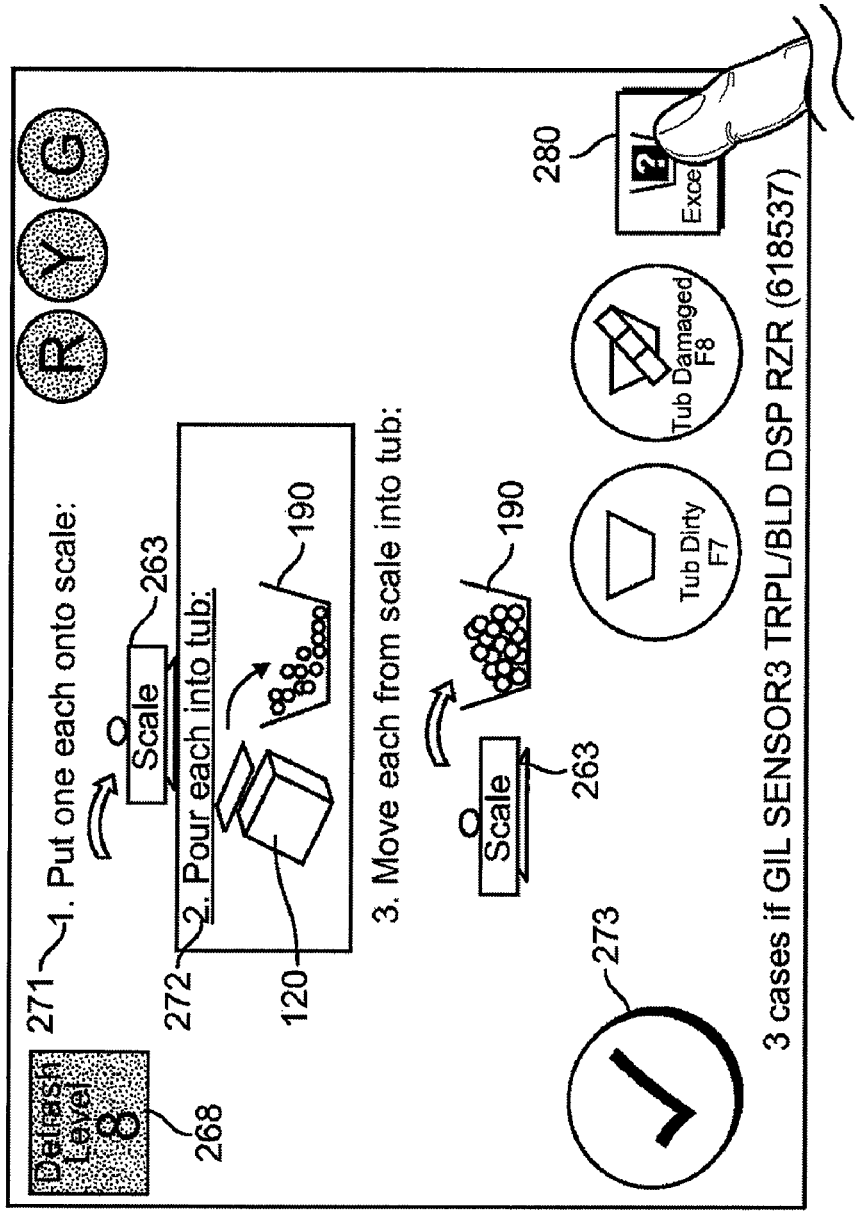
FIG. 43 is a further exemplary screen shot of the damaged product screen as seen in FIG. 42.

FIGS. 42-49 depict exemplary interface screens the computers 22, 23 and software application 30 display on touch screen monitor 259 in the event of a damaged product workflow. As with the above description, for simplicity, the product in the depicted example is pieces 125, and the damaged product will be referred to as pieces 125'. As shown in FIG. 42, the initial interface screen for this procedure may be identical to the initial interface screen of the normal workflow de-trash procedure. Once operator 270 discovers that some of pieces 125 are damaged, he first removes the de-trash unit, in this example, a piece 125, from unit scale 263. This will enable instruction 273 as well as exceptions button 280 within the interface screen. Operator 270 then separates all of the damaged pieces 125' from the non-damaged pieces 125. Operator 270 then depresses exceptions button 280, as depicted in FIG. 43. This will bring up damaged product window 300.

Figure 44:
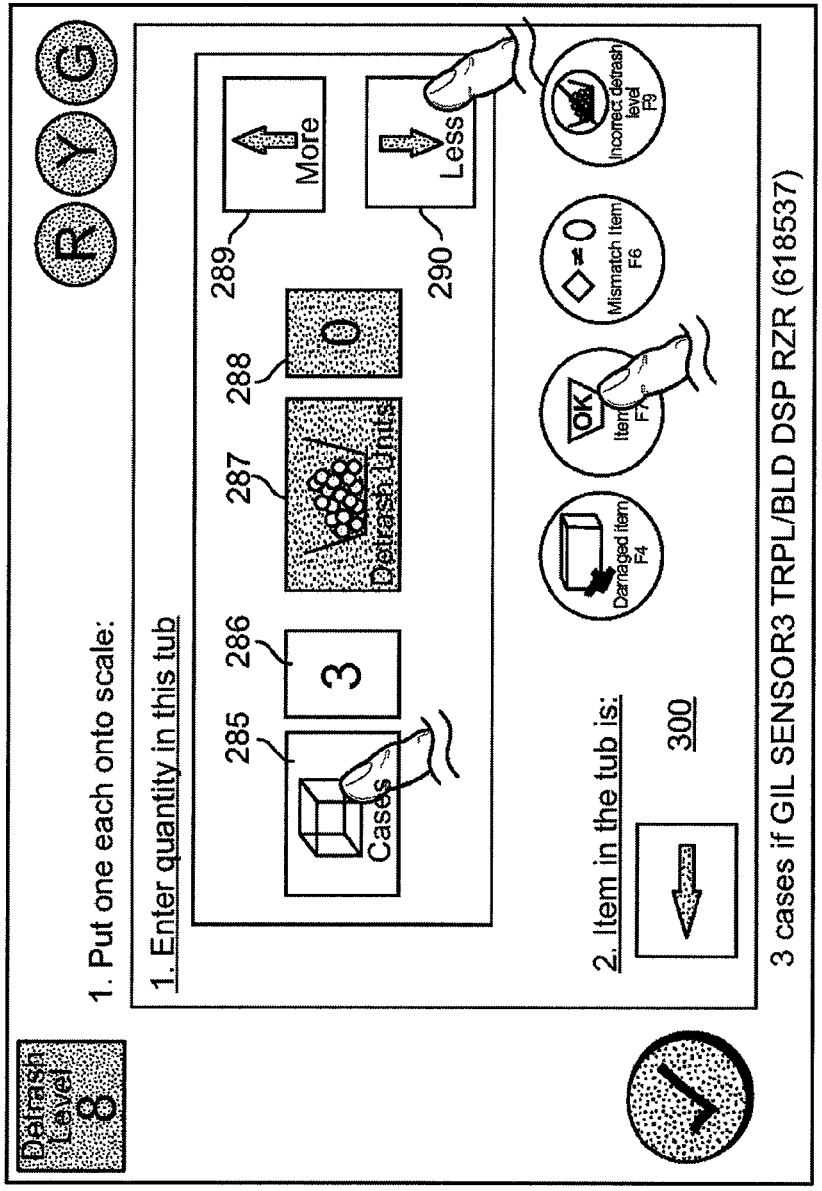
FIG. 44 is a further exemplary screen shot of the damaged product screen as seen in FIG. 43.

As shown in FIG. 44, damaged product window 300 may be identical to overflow window 282. As with the overflow tub workflow procedure described above, operator 270 first enters the quantity being put in the current tub 190 by first selecting cases button 285 or de-trash units button 287, whichever is appropriate, then using more button 289 or less button 290 to input/select how many of the appropriate units are currently in tub 190. In the exemplary embodiment depicted in FIG. 44, operator 270 has selected cases button 285, then has used the more button 289 and the less button 290 to input/select that three cases are currently in tub 190, as shown in case number indicator 286.

Once the proper number of either cases or de-trash units is shown, operator 270 presses product ok button 294 under instruction 292 to indicate that the product in the tub is not damaged. When this button is pressed, the computers 22, 23 and software application 30 create a transport order and tub 190 is conveyed.

Figure 45:
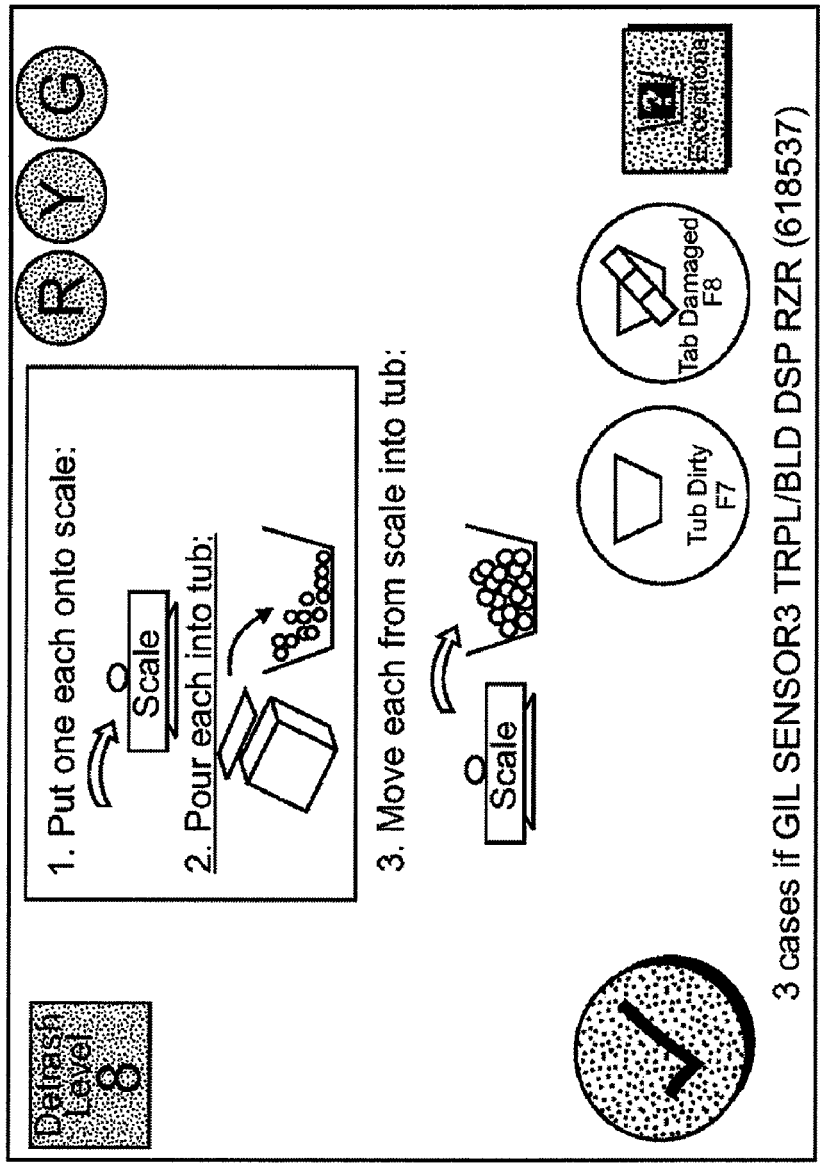
FIG. 45 is a further exemplary screen shot of the damaged product screen as seen in FIG. 44.
Figure 46:
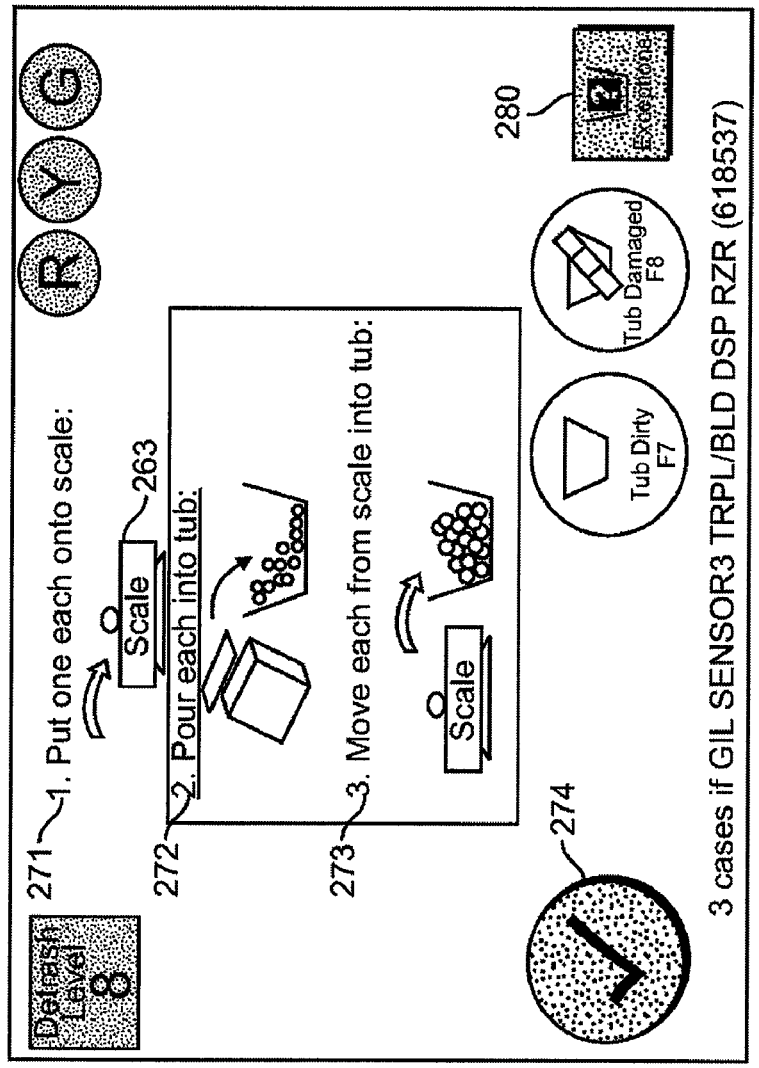
FIG. 46 is a further exemplary screen shot of the damaged product screen as seen in FIG. 45.
Figure 47:
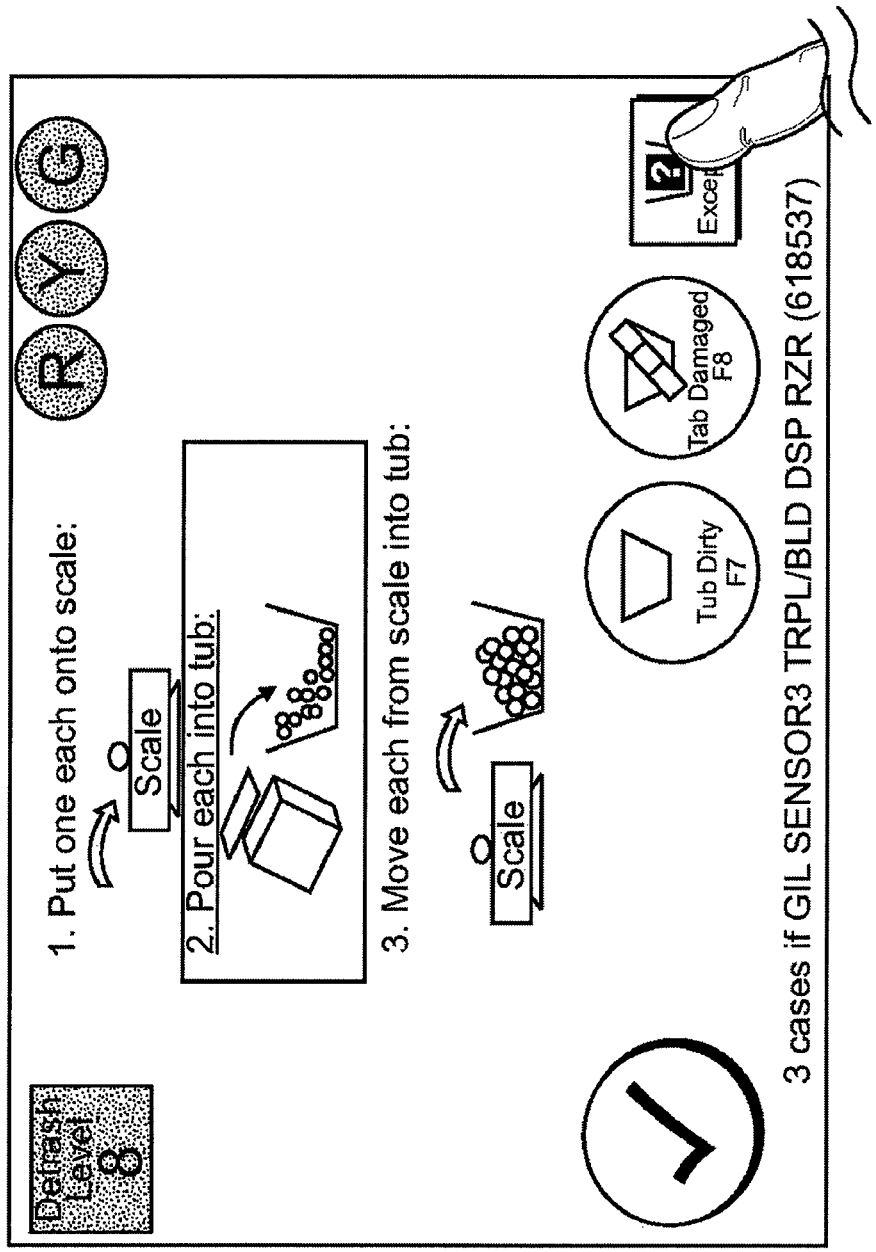
FIG. 47 is a further exemplary screen shot of the damaged product screen as seen in FIG. 46.
Figure 48:
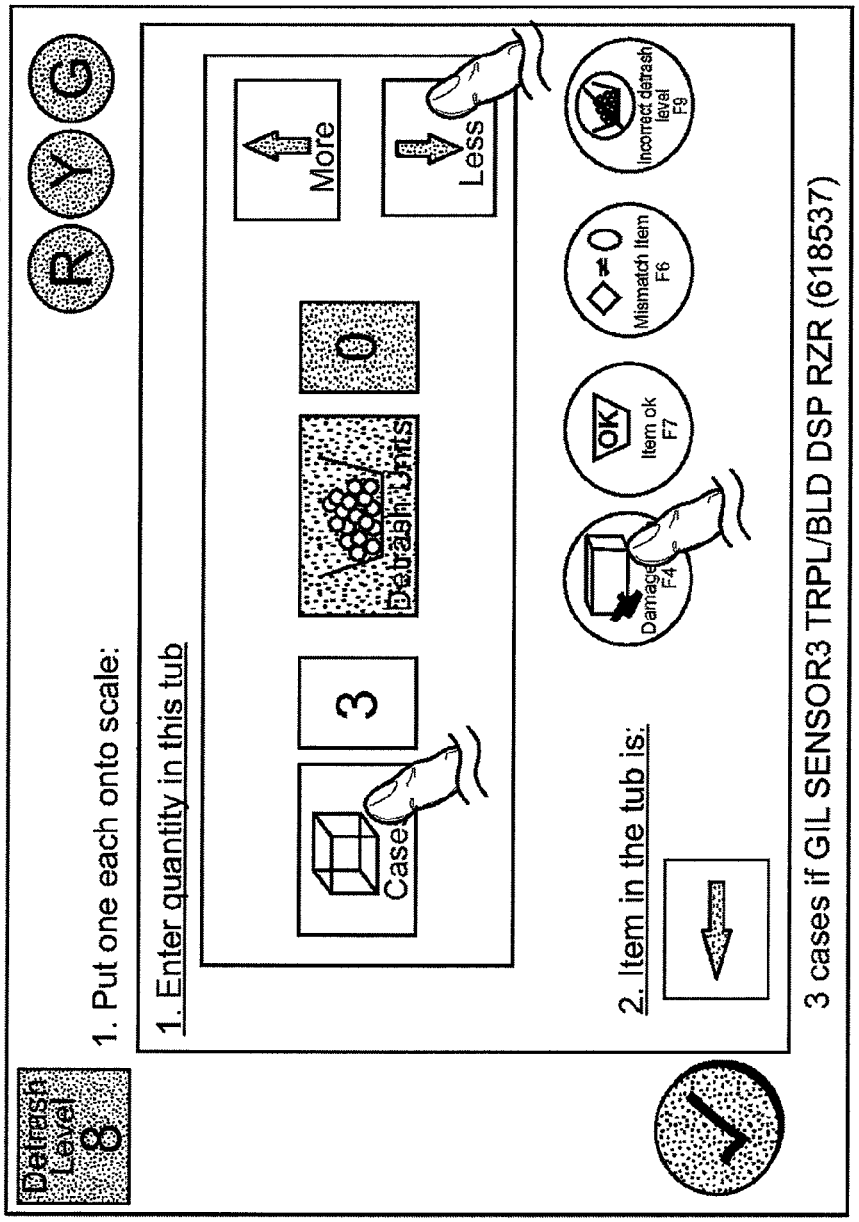
FIG. 48 is a further exemplary screen shot of the damaged product screen as seen in FIG. 47.
Figure 49:
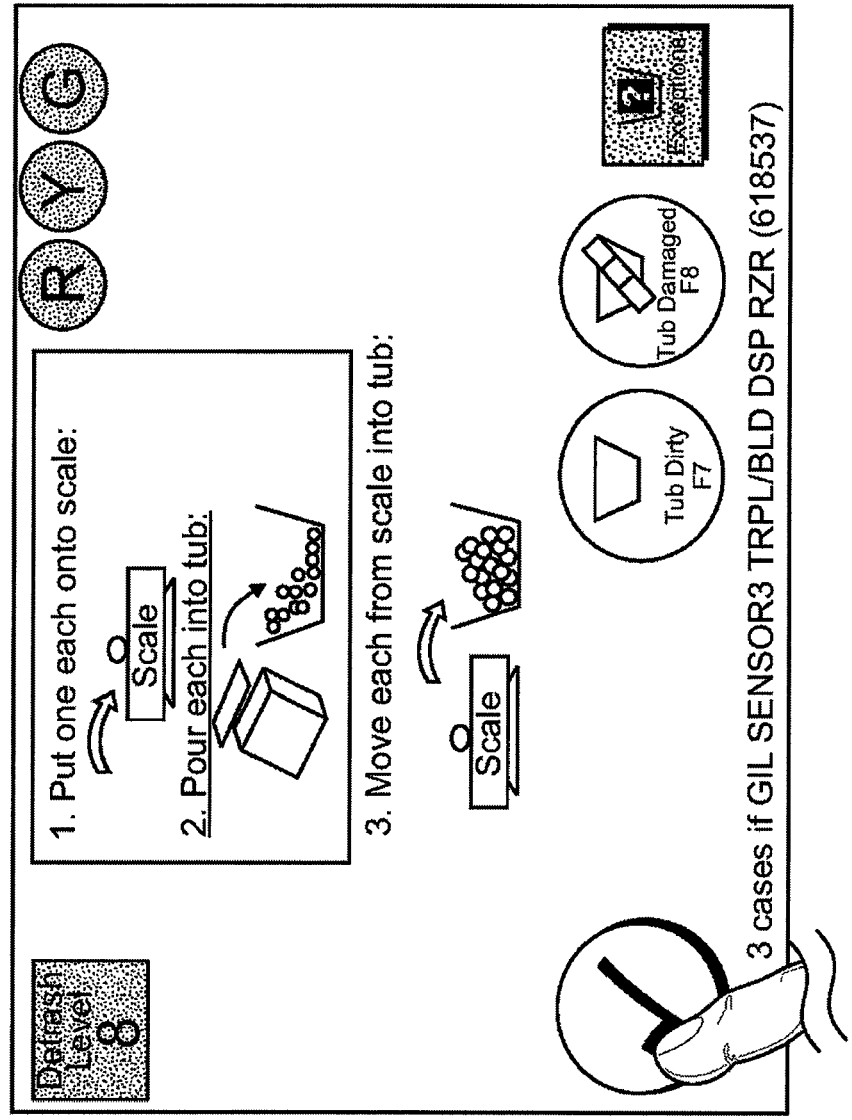
FIG. 49 is a further exemplary screen shot of the damaged product screen as seen in FIG. 48.

At this point, as shown in FIG. 45, a new empty tub 190 is inducted, and operator 270 follows the first instructions 271 and 272 shown on the interface screen. Specifically, operator 270 will place one damaged piece 125' on to unit scale 263. Once a stable weight is determined, operator 270 removes the damaged piece 125' from unit scale 263 and puts it in tub 190. This enables instruction 273 as well as exceptions button 280. Operator 270 then presses exceptions button 280, on the interface screen, and the computers 22, 23 and software application 30 are configured to then generate and display damaged product window 300 on touch screens 259.

Again, operator 270 first enters the quantity being put in the current tub 190 by first selecting cases button 285 or de-trash units button 287, whichever is appropriate, then using more button 289 or less button 290 to input/select how many of the appropriate units are currently in tub 190 which, as previously, is communicated to computers 22, 23 and software application 30, and respective database. In the exemplary embodiment depicted in FIG. 48, operator 270 has selected cases button 285, then has used the more button 289 and the less button 290 to indicate that three cases are currently in tub 190, as shown in case number indicator 286.

Once the proper number of either cases or de-trash units is shown, operator 270 presses product damaged button 296 to indicate that pieces 125' currently in tub 190 are damaged. When this button is pressed, computers 22, 23 and software application 30 generate a transport order and tub 190 is conveyed to the tub hospital 500 station, which is described in detail below. Operator 270 then presses lane complete button 274, and computers 22, 23 and software application 30 will determine and communicate to the operator 270, such as through the interface screen, which of the incoming lanes operator 270 needs to address next in order to continue the workflow.

4. Mismatched Item

Occasionally, as operator 270 begins the regular de-trash process described above, he will notice that some or all of the product in the active incoming lane does not match the product displayed on touch screen monitor 259. Consequently, system 20 and computers 22, 23 and software application 30 therein are configured to provide for a mismatched item workflow procedure.

Figure 50:
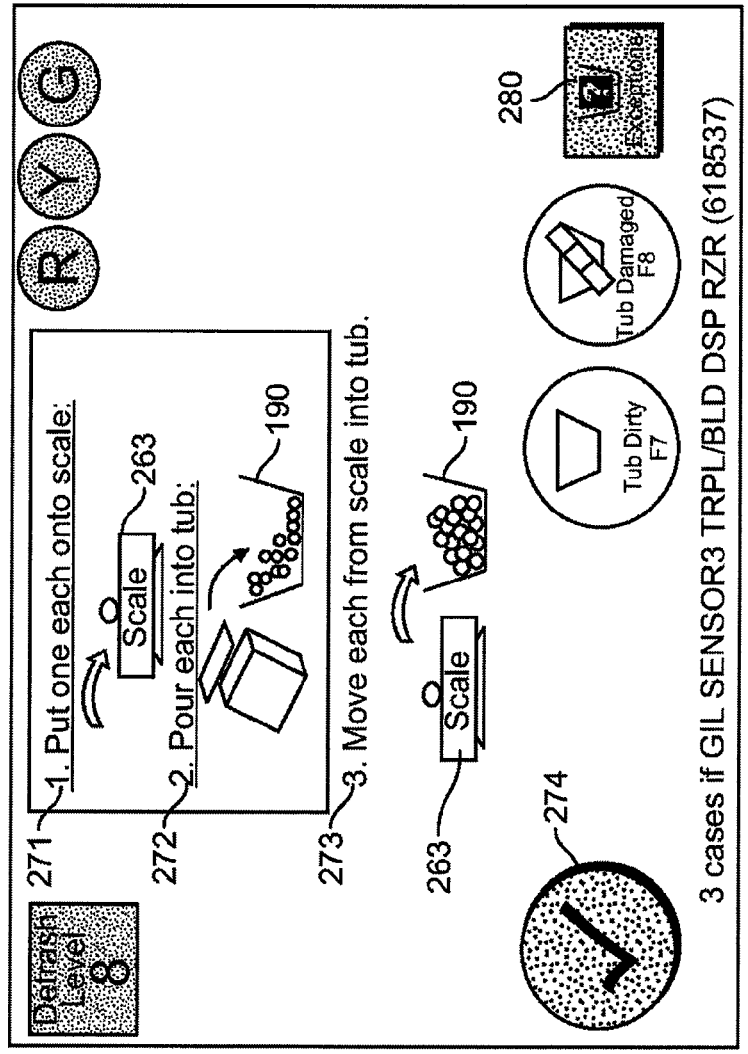
FIG. 50 is an exemplary screen shot of an incorrect items screen for use with the first embodiment of the present invention.
Figure 51:
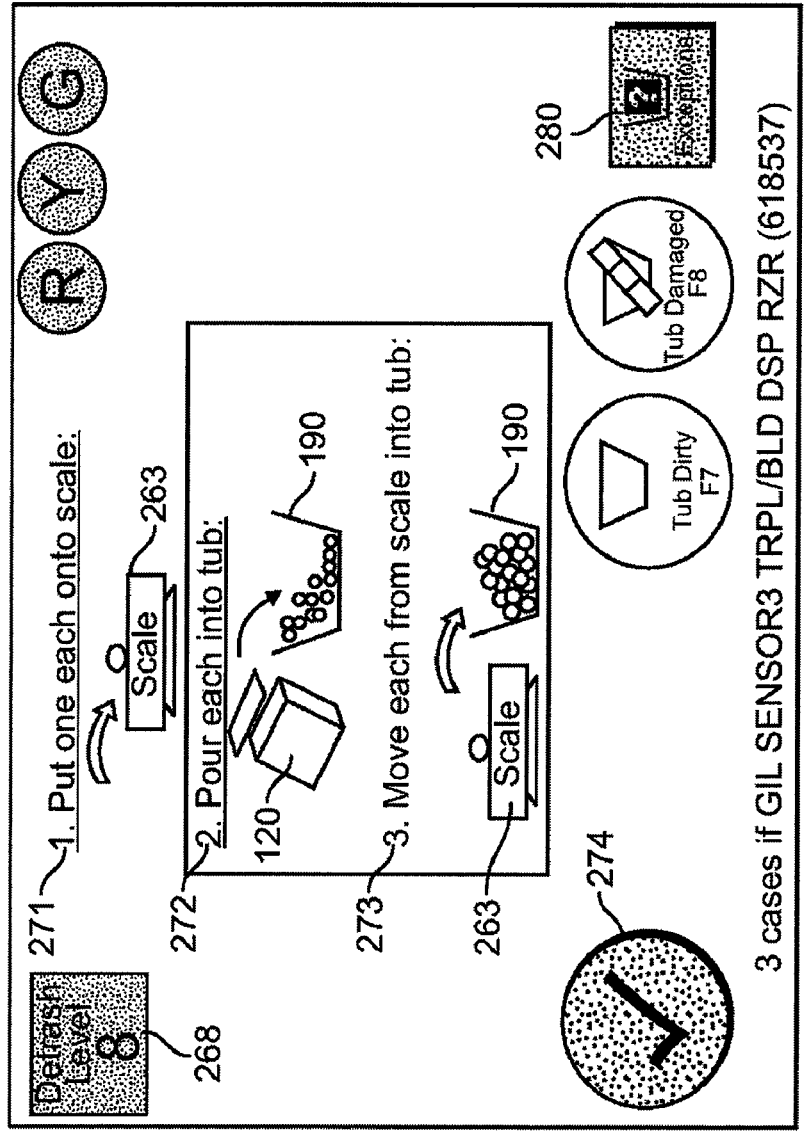
FIG. 51 is a further exemplary screen shot of the incorrect items screen as seen in FIG. 50.
Figure 52:
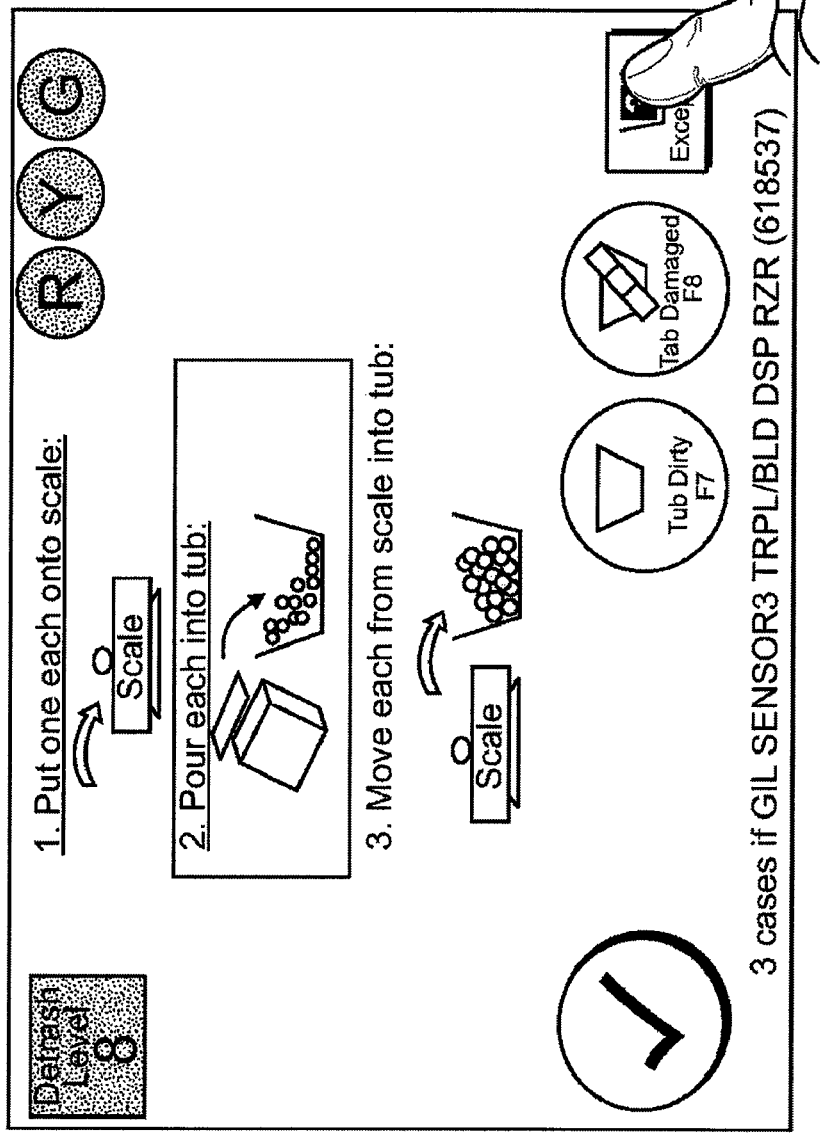
FIG. 52 is a further exemplary screen shot of the incorrect items screen as seen in FIG. 51.
Figure 53:
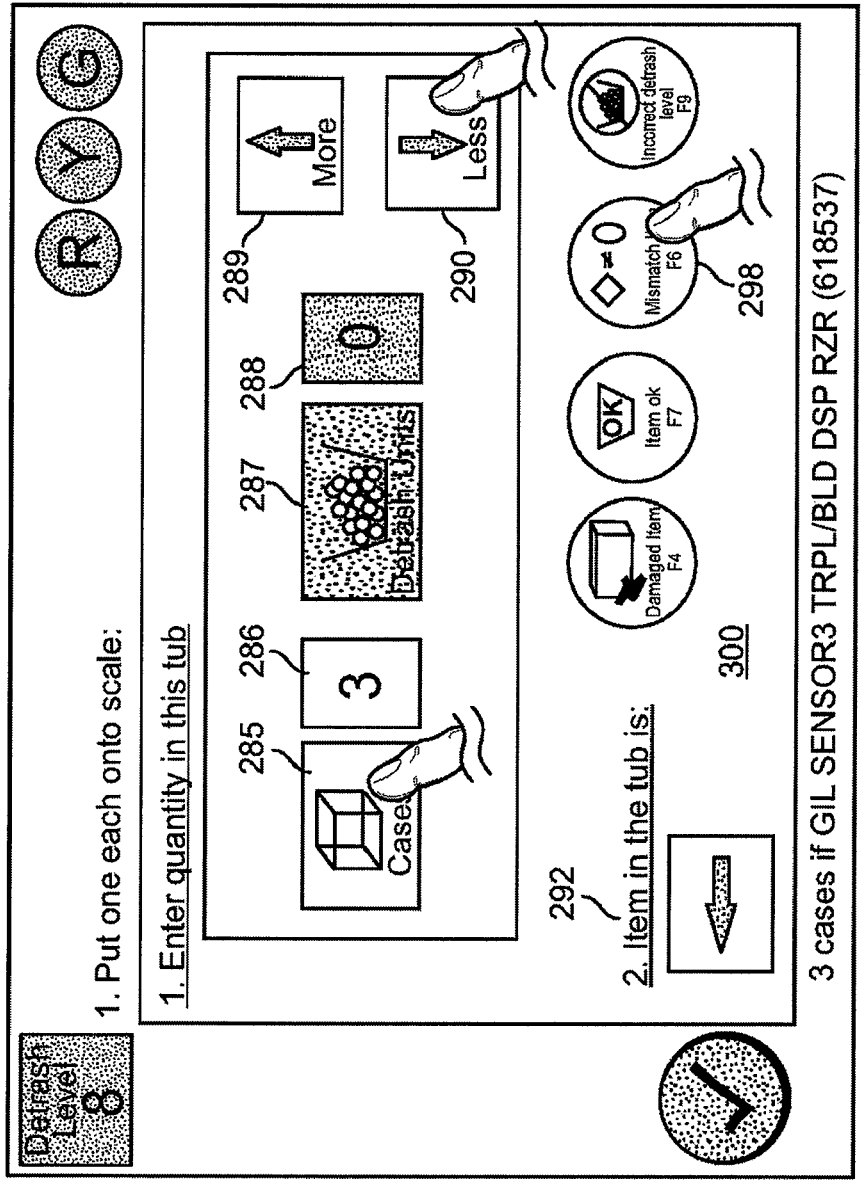
FIG. 53 is a further exemplary screen shot of the incorrect items screen as seen in FIG. 52.

FIGS. 50-54 depict exemplary interface screens the computers 22, 23 and software application 30 display on touch screen monitor 259 in the event of a mismatched item workflow. As with the above descriptions, for simplicity, the product review by operator 270 in the depicted example is pieces 125, rather than a case 120 or inners 124, and the mismatched product will be referred to as pieces 125'. As shown in FIG. 50, the initial interface screen for this procedure may be identical to the initial interface screen of the normal workflow de-trash procedure. Once operator 270 discovers that some or all of pieces 125' do not match what is shown on touch screen monitor 259, he first completes instructions 271 and 272. Specifically, operator 270 places one piece 125' on unit scale 263, then pours the remaining pieces 125' into tub 190. Operator 270 then removes the de-trash unit, in this example, a piece 125', from unit scale 263. This will enable instruction 273 as well as exceptions button 280 on the interface screen, as shown in FIG. 51. Operator 270 then depresses exceptions button 280, as depicted in FIG. 52. This will bring up exceptions window 282.

As with the overflow tub workflow procedure described above, operator 270 first enters the quantity being put in the current tub 190 by first selecting cases button 285 or de-trash units button 287, whichever is appropriate, then using more button 289 or less button 290 to input/select how many of the appropriate units are currently in tub 190. In the exemplary embodiment depicted in FIG. 53, operator 270 has selected cases button 285, then has used the more button 289 and the less button 290 to input/select that three cases are currently in tub 190, as shown in case number indicator 286.

Once the proper number of either cases or de-trash units is shown, operator 270 presses mismatch item button 298 under instruction 292 to indicate that the product in tub 190 does not match the product displayed on the screen. When this button is pressed, the computers 22, 23 and software application 30 create a transport order and tub 190 conveyed to the tub hospital 500 station.

Figure 54:
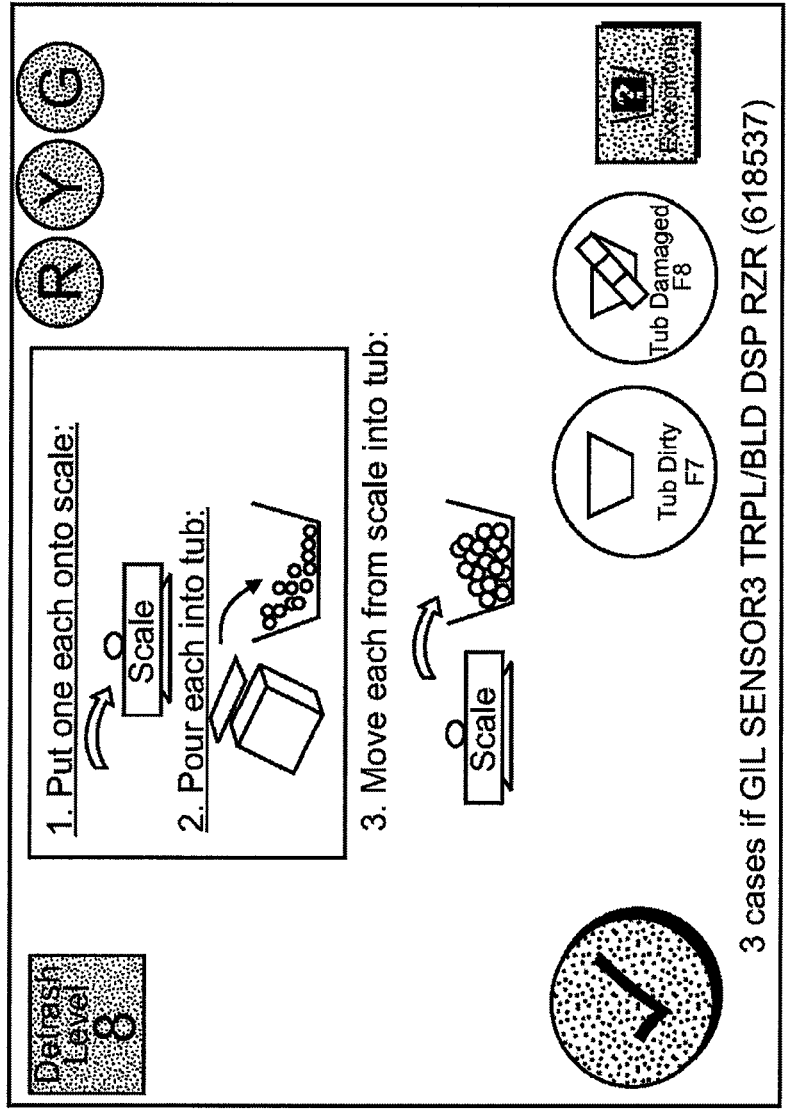
FIG. 54 is a further exemplary screen shot of the incorrect items screen as seen in FIG. 53.

At this point, as shown in FIG. 54, a new empty tub 190 is inducted to de-trash station 250. If there is any remaining product that did match the description shown on touch screen monitor 259, operator 270 may de-trash those pieces 125 according to the normal workflow process described above. If there is no more product (i.e., case 120 was comprised solely of pieces 125') then operator 270 may press lane complete button 274 on the interface screen, and computers 22, 23 and software application 30 will determine and communicate to the operator 270, such as though the interface screen, which of the incoming lanes operator 270 needs to address next in order to continue the workflow.

5. Incorrect De-trash Level Workflow

Occasionally, as operator 270 begins the regular de-trash process described above, he will notice that he has inadvertently de-trashed the product to the wrong level, i.e., system 20 requested a level 4 de-trash, pouring inners 124 into tub 190, but operator 270 inadvertently performed a level 5 de-trash, pouring pieces 125 into tub 190. Consequently, computers 22, 23 and software application 30 therein are configured to provide for a incorrect de-trash level workflow procedure.

Figure 55:
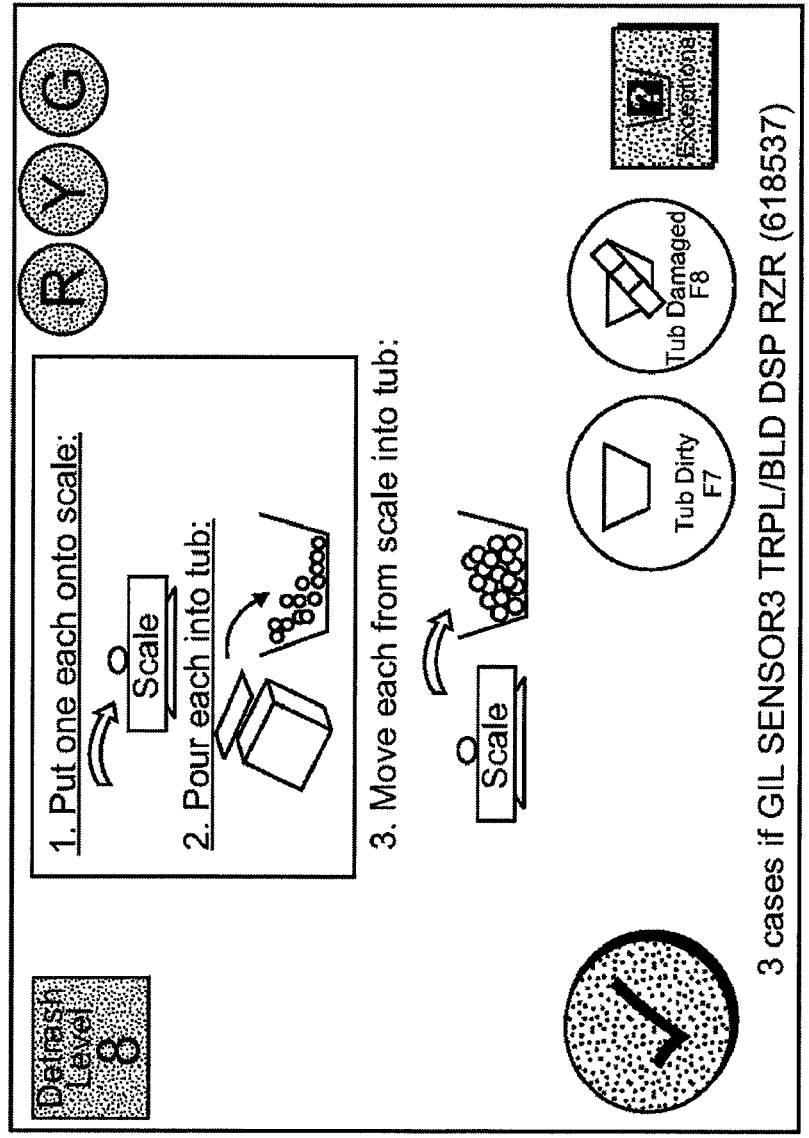
FIG. 55 is an exemplary screen shot of an incorrect de-trash level screen for use with the first embodiment of the present invention.
Figure 56:
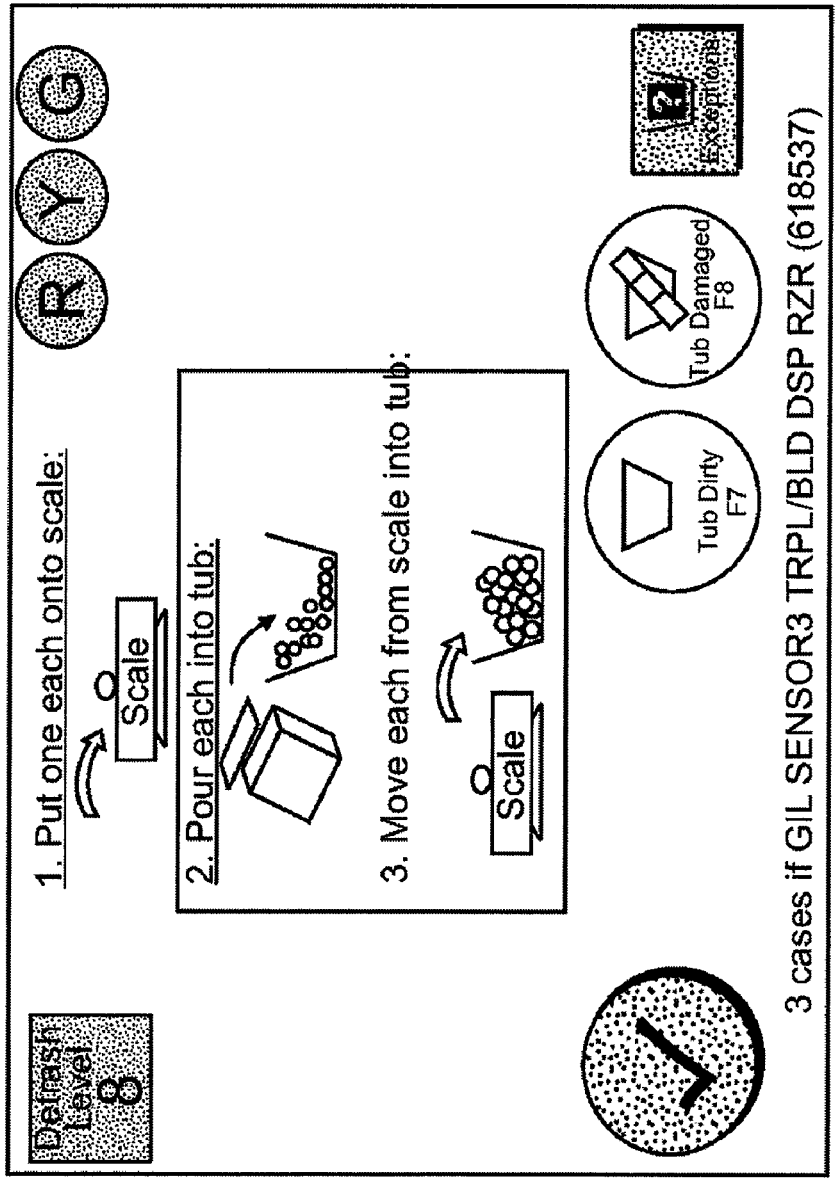
FIG. 56 is a further exemplary screen shot of the incorrect items screen as seen in FIG. 55.
Figure 57:
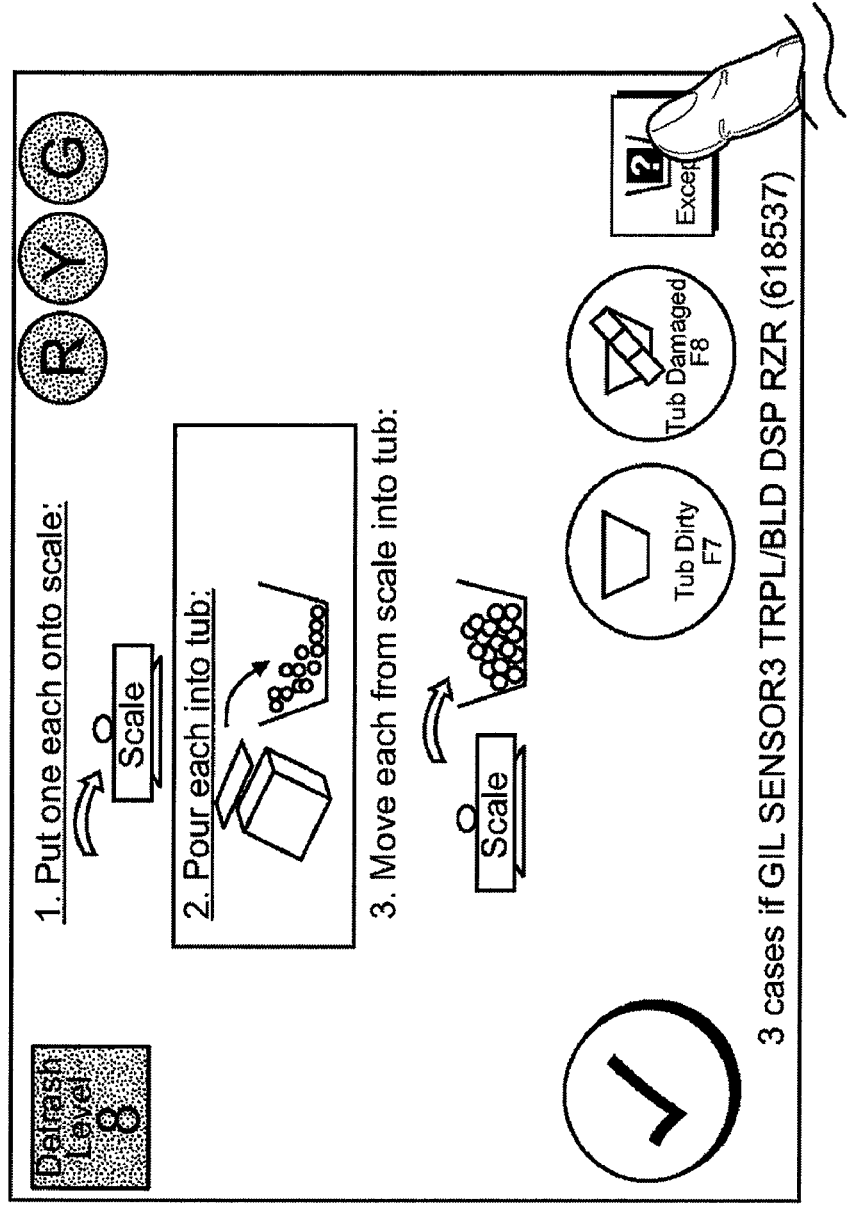
FIG. 57 is a further exemplary screen shot of the incorrect items screen as seen in FIG. 56.
Figure 58:
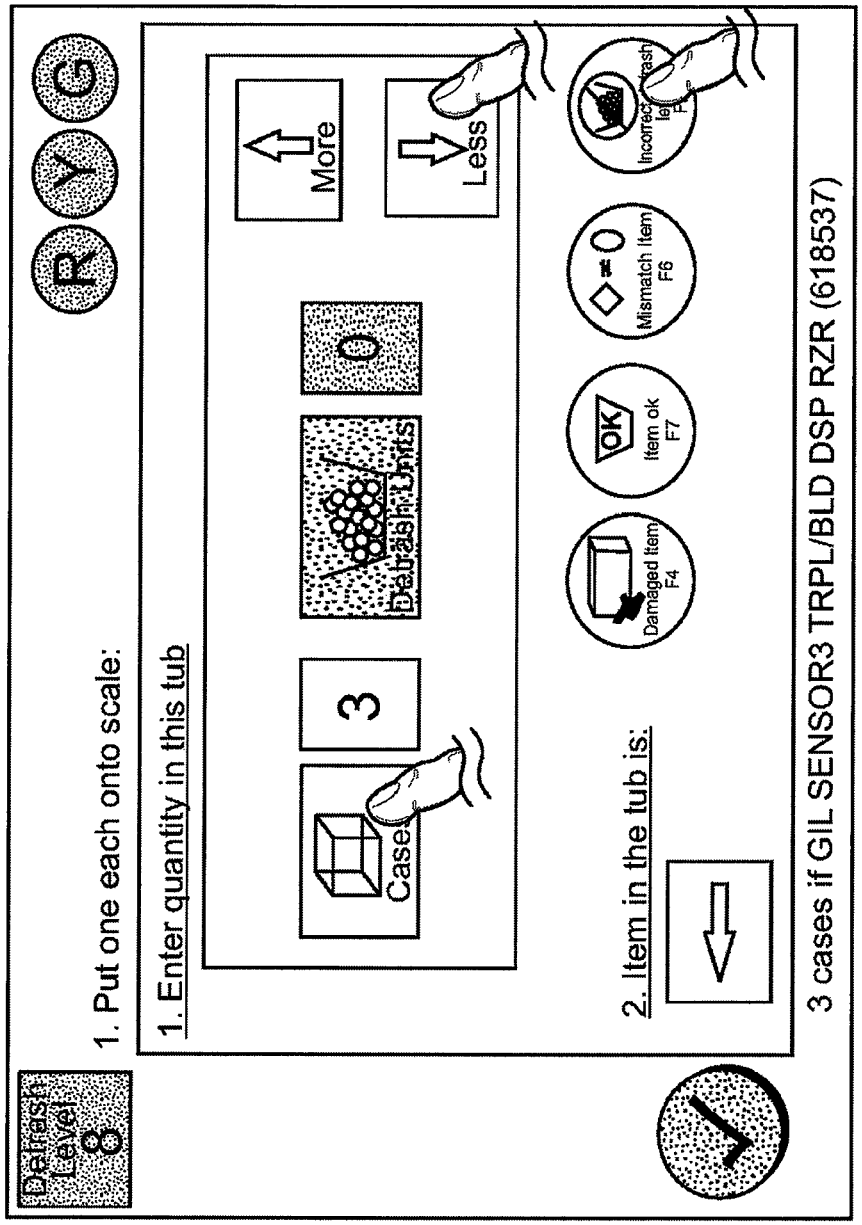
FIG. 58 is a further exemplary screen shot of the incorrect items screen as seen in FIG. 57.
Figure 59:
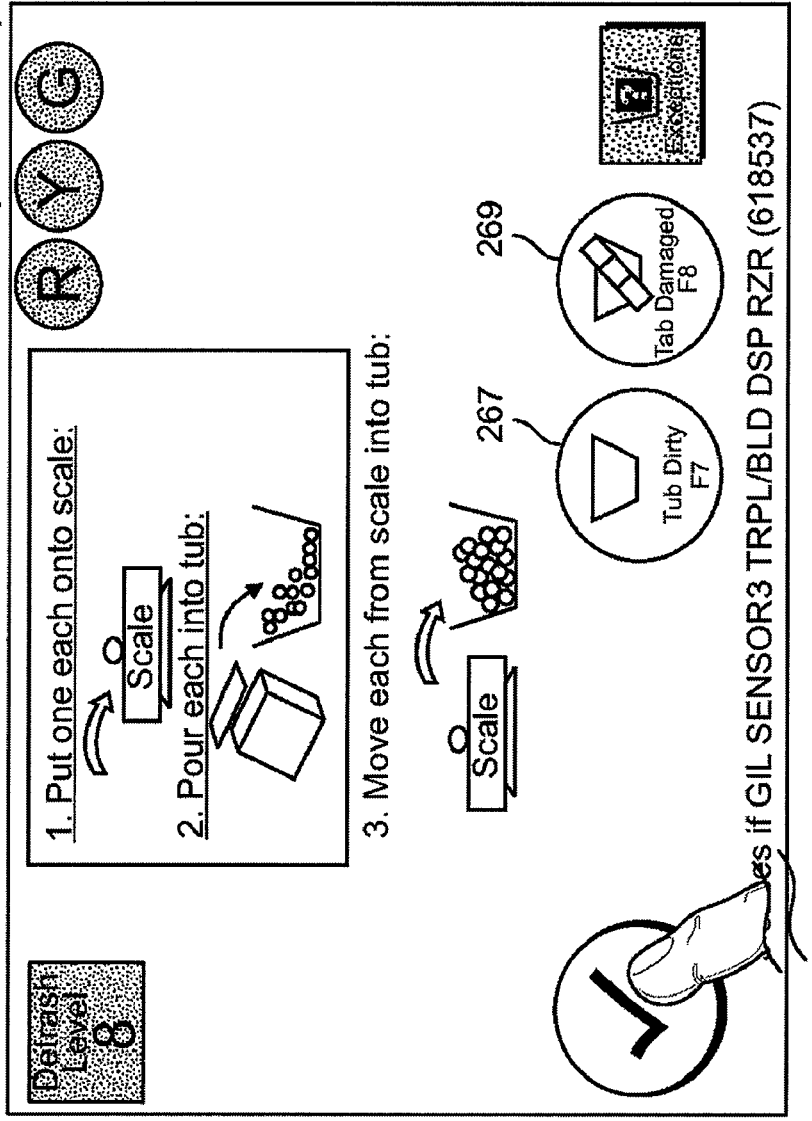
FIG. 59 is a further exemplary screen shot of the incorrect items screen as seen in FIG. 58.

FIGS. 55-59 depict exemplary interface screens the computers 22, 23 and software application 30 may display on touch screen monitor 259 in the event of an incorrect de-trash level workflow. As shown in FIG. 55, the initial interface screen for this procedure may be identical to the initial interface screen of the normal workflow de-trash procedure. Once operator 270 discovers that he has inadvertently de-trashed some case 120, he is trained to stop de-trashing, then remove the de-trash unit from unit scale 263 and put it in tub 190. This will enable instruction 273 as well as exceptions button 280. Operator 270 then depresses exceptions button 280 on the interface screen, as depicted in FIG. 57. This will bring up exceptions window 282.

As with the workflow procedures described above, operator 270 first enters the quantity being put in the current tub 190 by first selecting cases button 285 or de-trash units button 287, whichever is appropriate, then using more button 289 or less button 290 to input/select how many of the appropriate units are currently in tub 190. In the exemplary embodiment depicted in FIG. 58, operator 270 has selected cases button 285, then has used the more button 289 and the less button 290 to input/select that three cases are currently in tub 190, as shown in case number indicator 286.

Once the proper number of either cases or de-trash units is shown, operator 270 presses incorrect de-trash level button 299 under instruction 292 to indicate that the product in the current tub 190 has been incorrectly de-trashed. When this button is pressed, a transport order is transmitted from computers 22, 23 and software application 30, and tub 190 is conveyed to the tub hospital 500 station.

At this point, a new empty tub 190 is inducted, and operator continues with the normal workflow described above with regard to the remaining, properly de-trashed product.

6. Other Potential Problems

As will be appreciated by those in the art, because of the conveyance throughout the distribution center, as well as normal handling, tubs 190 may get damaged or develop other problems. As such, system 20 provides for circumstances in which operator 270 notices problems with one of the tubs 190.

To provide for the occasion when operator 270 notices that a tub 190 is dirty, window 266 comprises tub dirty button 267. Instead of de-trashing product into the dirty tub 190, operator 270 can be trained to press tub dirty button 267 within this interfaces screen. This will cause computers 22, 23 and software application 30 to recognize that the tub 190 is dirty, and will automatically convey the dirty tub 190 to the tub wash room (not pictured) for cleaning. Once cleaned, the database is updated and the clean tub is placed back into circulation.

To provide for the occasion when operator 270 notices that tub 190 is damaged, window 266 further comprises tub damaged button 269 within the interface screen. Instead of de-trashing product into damaged tub 190, operator 270 is trained to press tub damaged button 269. This will cause computers 22, 23 and software application 30 to recognize and store within the database that the tub is damaged, and computers 22, 23 and software application 30 will automatically convey the damaged tub 190 to the tub hospital 500 station.

B. Case Hospital

As discussed above, if during either case check-in or de-trash, an operator notices that a case 120 is damaged or has another error associated with it, that operator can provide input to indicate to computers 22, 23 and software application 30 that the damaged case 120 should be conveyed to case hospital 340. Likewise, if computers 22, 23 and software application 30, through automatic input from scanners, scales, or other inputs, determine that a case 120 has been damaged during conveyance, computers 22, 23 and software application 30 may divert that damaged case 120 to case hospital 340. Finally, in the depicted embodiment, certain products are always sent to or conveyed to a specific location by the system 20 to be de-trashed or have their errors fixed. By way of example, and in no way limiting, pharmaceutical products are always de-trashed, or fixed if damaged, in one of eight specified locations or stations, and system 20 and computers 22, 23 and software application 30 will convey these products to the correct station(s).

As discussed above, each de-trash station 250 may also serve as a case hospital station. In fact, it may happen that certain de-trash stations 250 serve simultaneously as both a de-trash station and a hospital station, depending on the needs of system 20. Operator 270 will be able to determine the required function by the interface screen that appears on touch screen monitor 259. As with the de-trash workflows, operator 270 may be presented with a number of functional scenarios during the case hospital workflow. Each of these scenarios will comprise different interface screens and different instructions displayed thereon.

Figure 60:
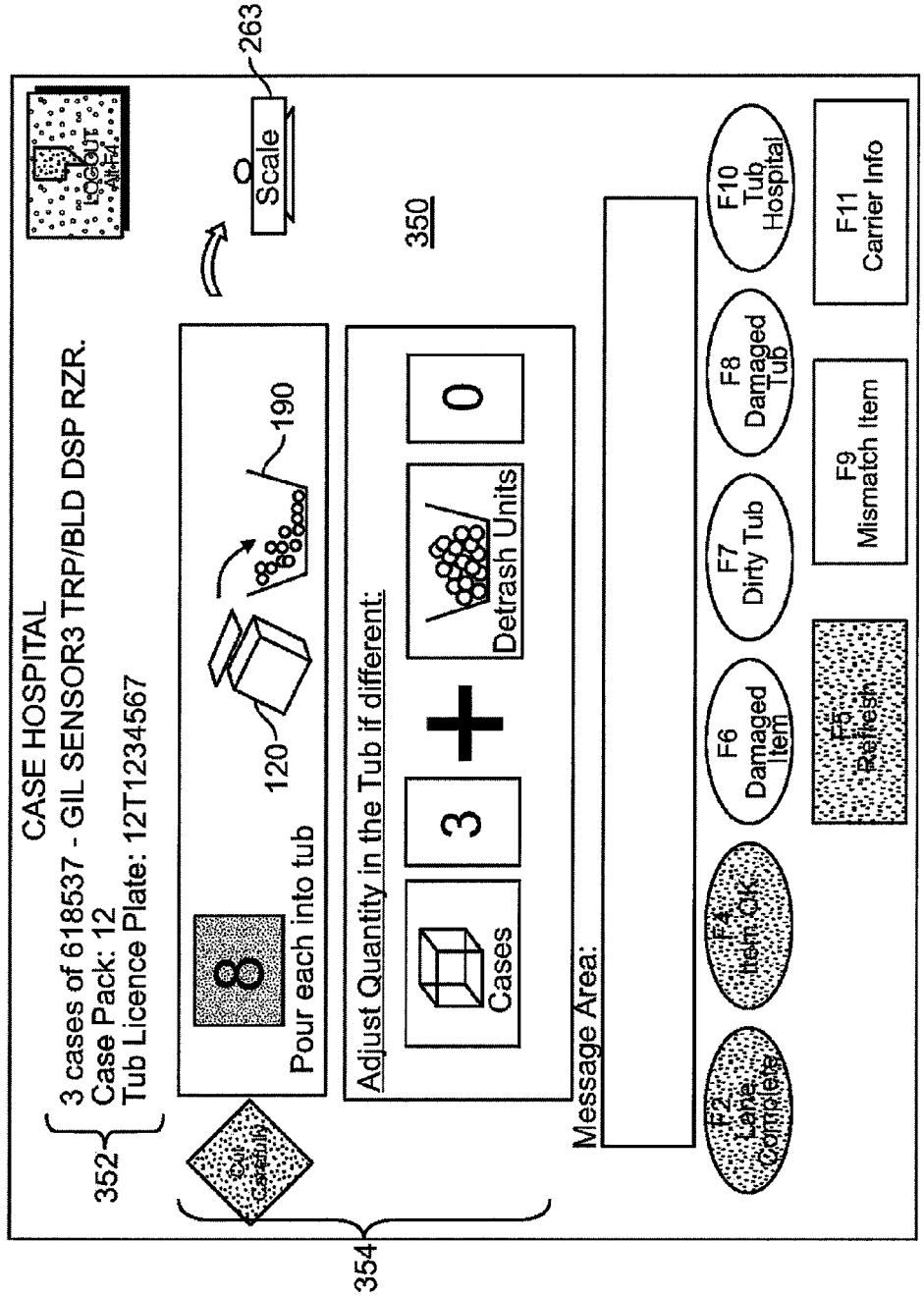
FIG. 60 is an exemplary screen shot of a case hospital screen for use with the first embodiment of the present invention.

FIG. 60 depicts an exemplary interface screen generated by computers 22, 23 and software application 30 when station 250 is used as a case hospital station. As seen, window 350 comprises case information area 352. In the depicted embodiment, information area 352 comprises the number of cases 120 in a tub 190, the type of product contained inside each case 120, the number of case packs inside each case 120, and the numeral identification associated with each tub bar code 195. It will be appreciated by those in the art that information area 352 can comprise a variety of information, and the scope of the present invention includes an information area 352 that may comprise additional or less information than that depicted in FIG. 60.

Window 350 further comprises instruction area 354, which comprises information related to the error that caused the case 120 to be sent to case hospital 340, as well as instructions on how to fix the errors associated with the specific case 120, and how to de-trash the repaired items. Instruction area 354 will further comprise message window 356, which may include additional instructions. In the exemplary embodiment, if a slug 275 has been routed to case hospital 340 because of a load balancing issue, no message, or a 'No Error' message, will be displayed in message window 356.

III. Manual Palletizing

As discussed above, typically, product that is received at distribution center 10 follows one of two product flows. If all of the product delivered on a vendor pallet 99 is identical, that product will be moved to a system pallet 100, then conveyed to pallet storage 601, described in detail below. If, however, the product delivered on a vendor pallet 99 is mixed, it will be conveyed to case check-in 110. Eventually, this mixed product, after being sorted through de-trash, and the other stations described herein, will be stored in tub storage 602, described in detail below.

Occasionally, however, this normal workflow may be disrupted. Depending on the number of orders received from various stores or franchisees, or the amount of product located in the storage areas 601 and 602, or any other parameters entered into system 20, computers 22, 23 and software application 30 may divert and convey some cases 120 or tubs 190 to the manual palletizing 360 station. As described below, after manual palletizing 360, the product in the diverted cases 120 or tubs 190 will then be stored in pallet storage 601 (rather than tub storage 602, where it normally would have gone). In this manner, system 20 and computers 22, 23 and software application 30 can track inventory, determine whether any actions are necessary to make sure that there is a proper balance between predetermined levels of the product that is stored in pallet storage 601 and that stored tub storage 602.

Figure 76:
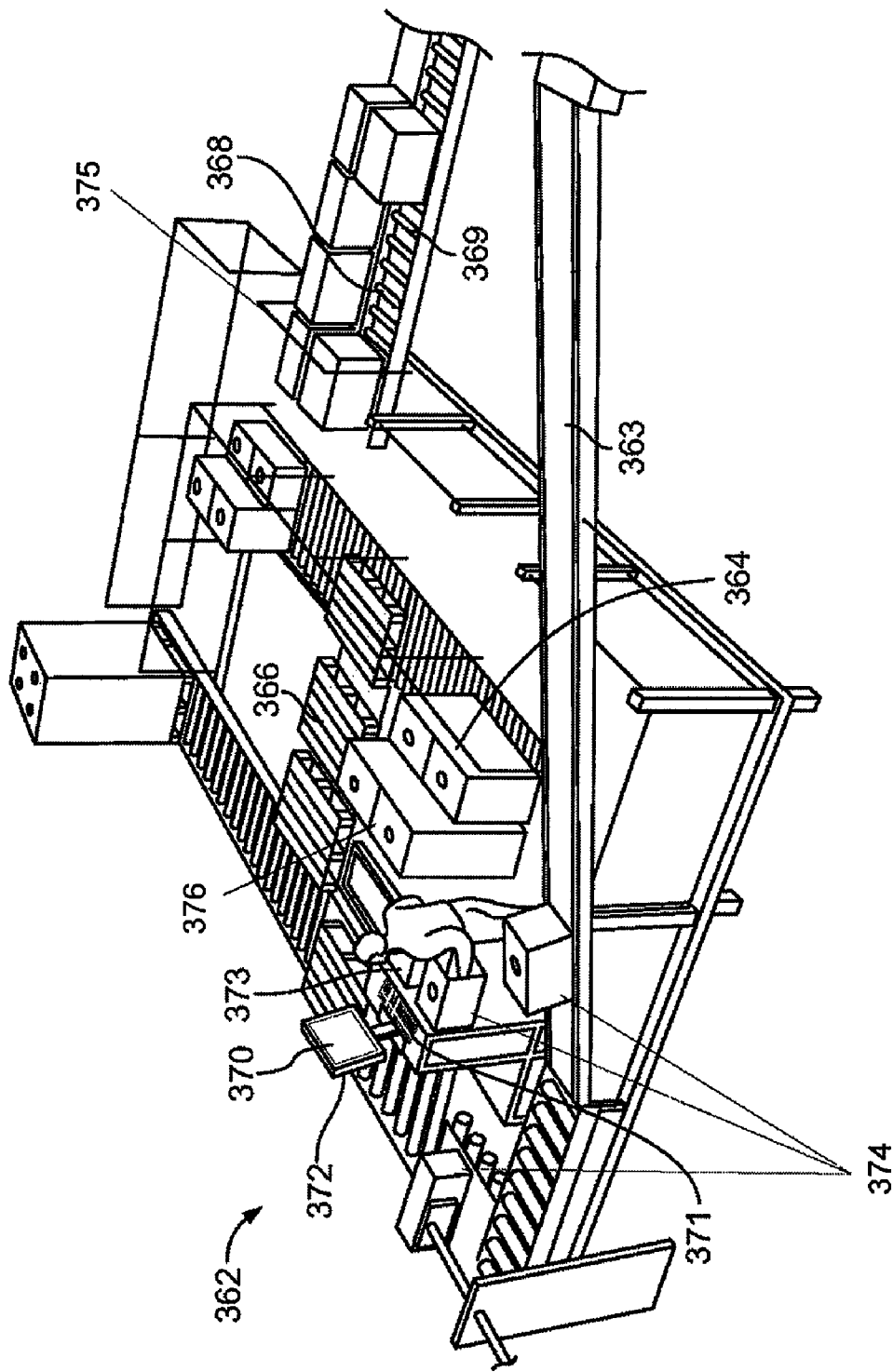
FIG. 76 is an exemplary view of a palletizing station for use with the first embodiment of the present invention.

FIG. 76 depicts an exemplary manual palletizing workstation 362. As seen, palletizing workstation 362 comprises incoming conveyor 363, scissor lift 364, pallet to be loaded (on scissor lift) 375, empty pallet infeed 366, empty tub infeed 368, tub take-away conveyor 369, touch screen monitor 370, keyboard 371, hand scanner 372 and bed scanner 373, each of which is in communication with computers 22, 23 and operating in conjunction with software application 30, units (cases or filled tubs) to be palletized 374, and empty tub infeed 375.

An example of a normal workflow is described below. It will be appreciated by those in the art that, for convenience, the normal workflow is described with respect to the palletizing of numerous cases 120 on to a pallet 100. It will be appreciated by those in the art, however, that the same workflow will be followed in order to palletize numerous tubs 190 on pallet 100, or, under certain circumstances, a combination of cases 120 and tubs 190. It will likewise be appreciated by those in the art that, occasionally, cases 120 will be conveyed by system 20 to the manual palletizing 360 station in tubs 190, but will be palletized as cases 120. Under this circumstance, system 20 and computers 22, 23 and software application 30 will indicate and display on touch screen monitor 370 that cases 120 must be removed from tubs 190 before following the palletizing workflow described below.

During normal workflow, the system 20 will convey an empty pallet 100 to scissor lift 364. When empty pallet 100 is on scissor lift 364, the system 20 will convey a case 120 to operator 374. System 20 will then indicate on touch screen monitor 370 how operator 374 is to load the case 120 on to the pallet 100. Operator 374 will then scan the case 120, confirm that the information displayed on touch screen monitor 370 is the same as what is in case 120 by pressing a confirmation button on the interface screen, and will load the case 120 on to pallet 100. Operator 374 then completes this process until the proper number of cases, as indicated by system 20 on touch screen monitor 370, have been stacked on pallet 100.

It will be appreciated by those in the art that cases 120 on pallet 100 will be stacked on top of each other. By way of example, if only twelve cases 120 can be stacked on a pallet 100, system 20 may instruct operator 374 via the interface screen, to stack four rows of three cases 120 (or three rows of four cases 120, etc). Regardless of the stacking arrangement, each time operator 374 completes a row, he can push lower button 367 (not shown), located on palletizing workstation 362. Actuating lower button 367 will cause system 20 to lower scissor lift 364 by a set predetermined amount. This amount will vary depending on the type of cases 120 that are being stacked on to pallet 100. In this manner, the surface on which operator 374 is stacking cases 120 will remain at a constant height. By way of example, if cases 120 are twelve inches high, once operator 374 completes the first row, he will push lower button 367 on the interface screen, and system 20 will cause scissor lift 364 to lower by twelve inches. When the second row is complete, system 20 will lower scissor lift 364 by an additional twelve inches (i.e., 24 inches below the height at which pallet 100 was when operator began stacking cases 120).

Once all of cases 120 have been stacked on to pallet 100, operator will push pallet complete button 376 within interface screen on touch screen monitor 364. This will cause system 20 to lift scissor lift 364 to its original height, and the system 20 will convey pallet 100 to pallet scale 378. Pallet scale 378 will weigh pallet 100 to ensure that the actual weight of loaded pallet 100 and send a weight signal to computers 22, 23 and software application 30 and the system 20 will compare the actual weight to predetermined weights contained in database 24. Once the system 20 determines that the weight is correct, it may convey pallet 100 to pallet storage 601.

IV. Pallet Hospital

As stated above, during normal workflow, a pallet comprising cases 120 that each comprise the same product is immediately conveyed to pallet storage 601, as described in detail below. Occasionally, as described above, system 20 will direct and convey some product to the manual palletizing 360 station, and from there, the system 20 will convey pallet 100 to pallet storage 601. Occasionally, however, problems develop that cause some pallets 100 to become non-conveyable. Often, this is because the cases 120 that are stored on pallet 100 are wider or taller than the extremely tight tolerances employed by system 20 allow for. Additionally, the total weight of cases 120 stored on pallet 100 may exceed the predetermined and stored parameters for conveyance, with the database 24. Additional irregularities, as described below, with pallet 100 may also prevent normal workflow. If system 20 determines that a pallet 100 is non-conveyable, the system 20 will divert and convey that pallet to the pallet hospital 400 station.

Figure 61:
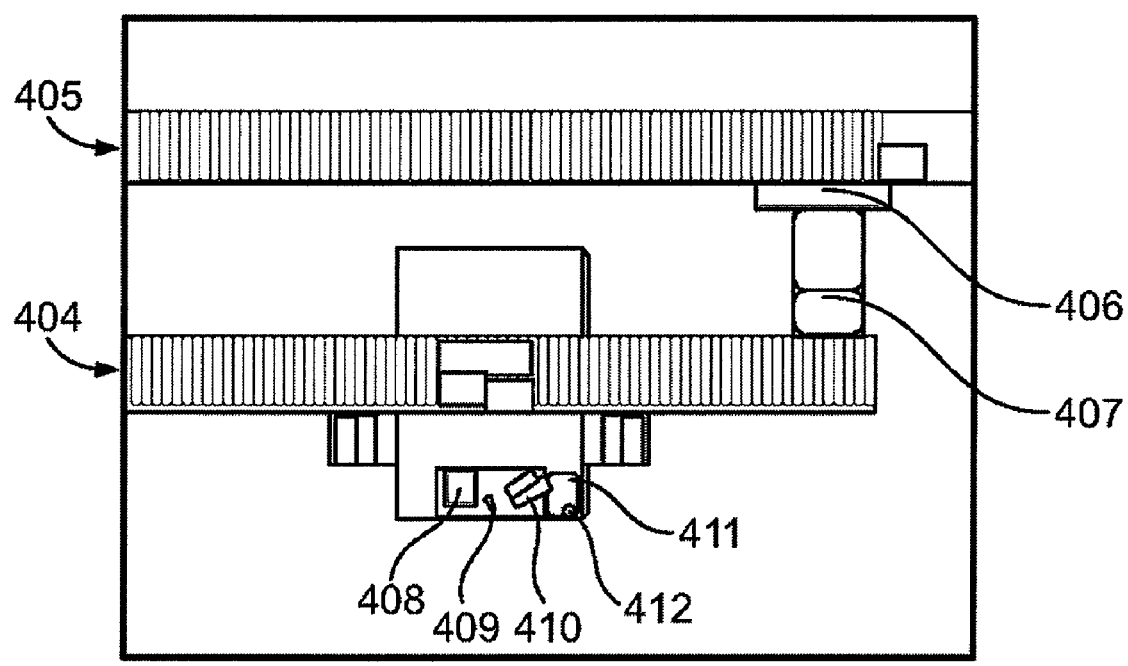
FIG. 61 is an overhead view of an exemplary pallet hospital workstation for use with the first embodiment of the present invention.
Figure 62:
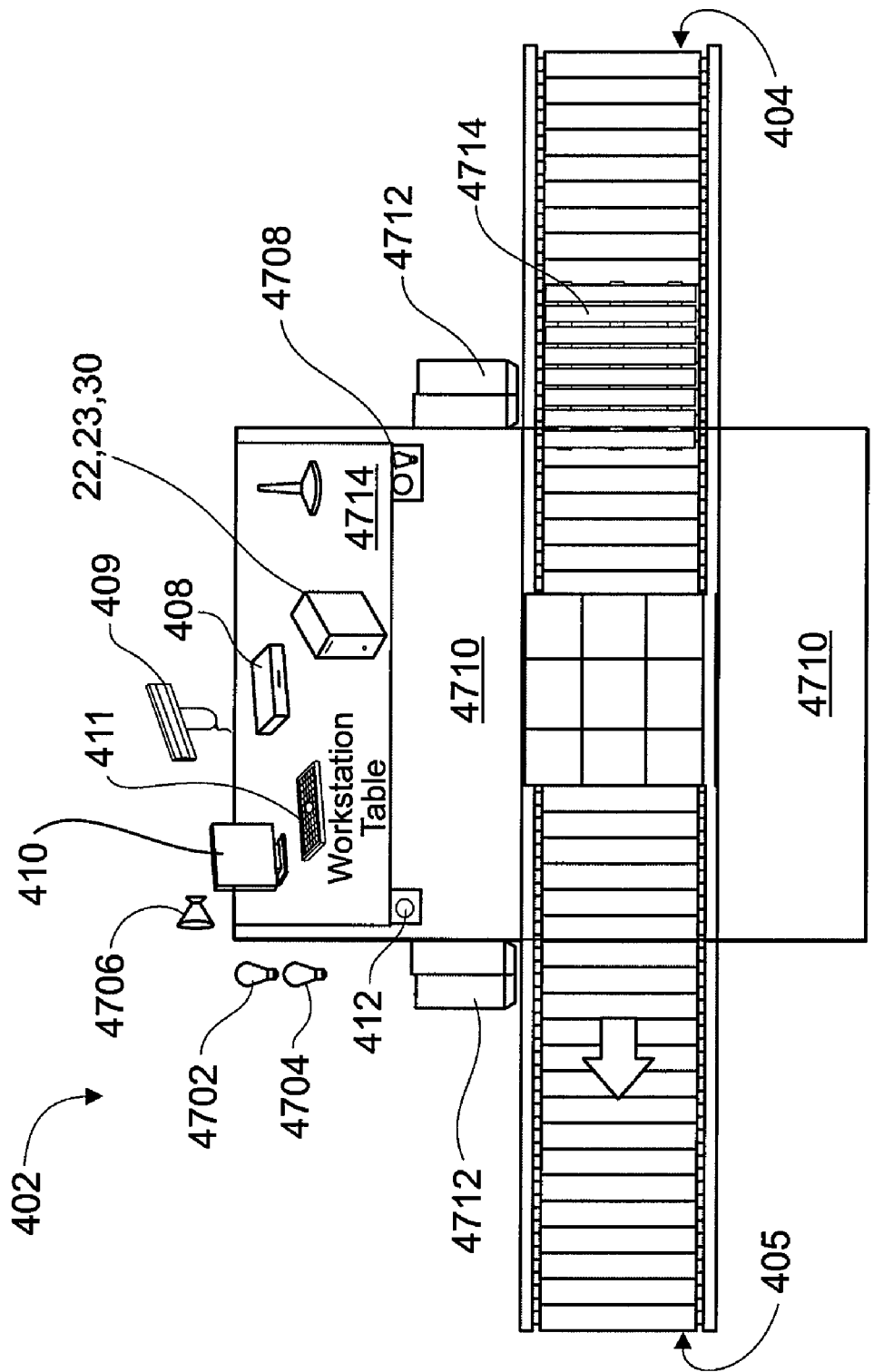
FIG. 62 is a close-up view of the pallet hospital workstation seen in FIG. 61.

FIGS. 61-62 depict an exemplary pallet hospital workstation 402. While pallet hospital workstation 402 may comprise many components, depending on the needs of the various distribution center, the exemplary pallet hospital workstation 402 depicted comprises pallet in conveyor 404, pallet out conveyor 405, contour controls 406, scale 407, case scale 408, hand scanner 409, touch screen monitor 410, keyboard 411, and pallet release button 412, each of which is in communication with computers 22, 23 and software application 30. A green light 4702 is provided to indicate that work is present at the workstation 402. A yellow flashing light 4704 is provided to indicate that the pallet is moving at the workstation. A chime 4706 is also provided to audibly indicate certain functions are taking place. An emergency stop button and indicator light 4708 is provided to stop the workstation 402 and conveyors 404, 405 in an emergency situation. The workstation 402 also has raised platform 4710 upon which an operator can stand, which can be accessed by a user with access stairs 4712. Various components of the workstation 402 can be located on a workstation table 4714 as shown. An empty pallet 4716 is shown on the pallet in conveyor 404 in FIG. 62.

As system 20 conveys pallet 100 to pallet hospital workstation 402, the operator (not shown) scans pallet bar code 101. System 20 then displays on the interface screen what is wrong with pallet 100. By way of example, and in no way limiting, a pallet 100 may be sent to pallet hospital 400. The operator scans pallet bar code 101, the computers 22, 23 and software application 30 receive the scanned information, and system 20 indicates, via the interface screen, that the cases 120 are stacked on pallet 100 in such a way that the overall width is too wide for conveyance. The operator 414 then removes each case 120 from pallet 100 and re-stacks them, such that the overall envelope of cases 120 fits within the established tolerances. The operator then hits pallet release button 414. The computers 22, 23 and software application 30 receive the signal generated by the pallet release button 414 and then conveys pallet 100 through contour controls 406 to ensure that cases 120 are not stacked too wide or too high on pallet 100. The computers 22, 23 and software application 30 then convey pallet 100 to pallet storage area 601.

Figure 63:
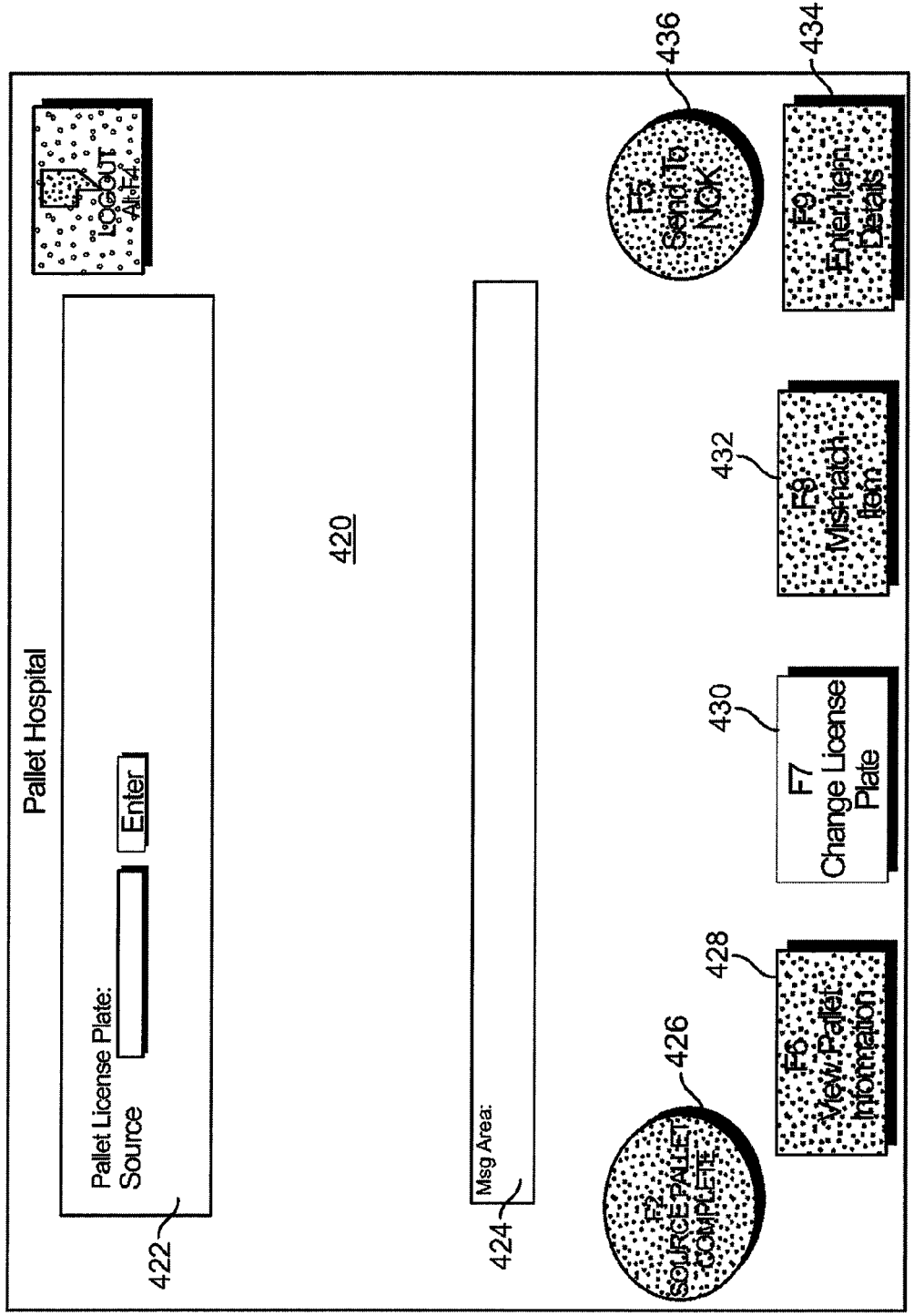
FIG. 63 is an exemplary screen shot of the pallet hospital home screen for use with the first embodiment of the present invention
Figure 65:
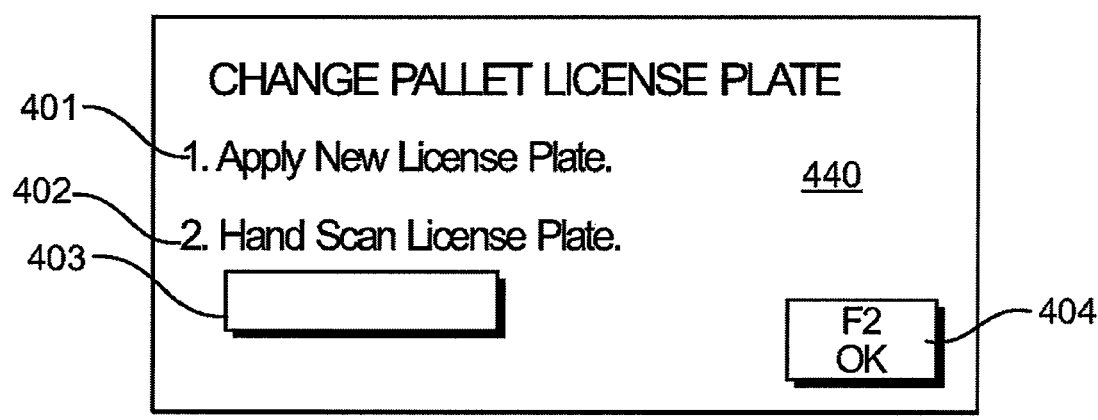
FIG. 65 is an exemplary screen shot of the change pallet license plate window for use with the first embodiment of the present invention.

FIGS. 63-65 depict exemplary interface screens generated by computers 22, 23 and software application 30 on touch screen monitor 410. As seen in FIG. 63, home screen 420 may comprise pallet information window 422, message window 424, source pallet complete button 426, view pallet information button 428, change license plate button 430, mismatch item button 432, enter item details button 434 and send to NOK button 436. As seen, each of the buttons 426-436 are initially grayed out and inactive, except for change license plate button 430. In this manner, the operator has the ability to always change pallet bar code 101 in the case of a NO_READ or LICENSE PLATE DOES NOT EXIST error.

As seen in FIG. 64, when the computers 22, 23 and software application 30 receive scanned information from the scanning of the pallet bar code 101, the computers 22, 23 and software application 30 will cause the touch screen monitor 410 to display the errors associated with pallet 100. For example, pallet information window 422 comprises information related to the alpha-numeric representation of pallet bar code 101, error information, item information and case pack information. Additionally, scanning pallet bar code 101 causes the computers 22, 23 and software application 30 to generate case information window 423 on the display, which may include such information as the number of cases on pallet 100, the number of cases per layer, the number of layers, whether the layers interlock, the expiration date, the number of damaged cases, whether there are any cases on a partial layer, whether there is any stretch wrap used, and the lot number associated with the cases. It will be appreciated by those in the art that the information contained within case information window 423 and pallet information window 422 is not set, and may vary from pallet to pallet. In the example depicted in FIG. 64, pallet 100 is overweight, is too wide to the left, and is too wide to the back. Other examples of errors include unidentifiable pallet, no transport order, duplicate bar code, weight tolerance exceeded, maximum height exceeded, mismatch item, damaged pallet, contour left, contour right, contour bottom, contour front, contour back and missing master data. In one embodiment, information relating to each of these parameters is received by the computers 22, 23 and software application 30 from the respective input devices and sensors and the computers 22, 23 and software application 30 compare such information to predetermined parameters stored in the database 24 to determine if such predetermined parameters are exceeded to determine if an error exists.

If pallet bar code 101 is damaged or otherwise unreadable, or if pallet bar code 101 is somehow a duplicate of another pallet bar code 101 associated with another pallet 100 as determined by the computers 22, 23 and software application 30, then system 20 provides for a procedure to replace it. First, the operator presses change license plate button 430, then computers 22, 23 and software application 30 receive this input and generate license plate window 440 on the display. As depicted in FIG. 65, exemplary license plate window 440 comprises instruction 401, instruction 402, bar code window 403 and ok button 404. After operator presses change license plate button 430, he affixes new pallet bar code 101' to pallet 100, then scans new pallet bar code 101' with hand scanner 409 after being instructed to do so by the instructions on the display. The alpha-numeric representation of bar code 101' will appear in bar code window 403. The operator then presses ok button 404. This causes system 20 to associate pallet 100 with new pallet bar code 101', and such association is stored in the database 24. The operator then continues fixing any remaining problems with pallet 100. If there are no further problems, the operator presses pallet release button 414 on the interface screen, the computers 22, 23 and software application 30 receive this input, and then convey and pallet 100 to pallet storage area 601.

Based on the different errors shown by system 20, operator 414 may be required to check each pallet 100 and each case 120 individually. By way of example, and in no way limiting, an error of weight exceeded may be caused by the wrong number of pieces 125 per case 120, or the wrong number of total cases 120, wrong master data for item weight and tolerances that was pre-entered into system 20, or some or all of the product associated with the current pallet bar code 101 does not match some or all of the product that is actually stacked on pallet 100, as determined by computers 22, 23 and software application 30.

This error may be solved by scanning and weighing one case 120 from pallet 100 on case scale 408. By scanning the case 120, system 20 will display on touch screen monitor 410 how much case 120 should weigh based on predetermined information stored in the database for the product in the case 120. If the weight of that one case 120 displayed on case scale 408 matches the weight displayed by system 20 caused by case scale 408, the error might be caused by the wrong number of cases 120. The system 20 may then instruct the operator to count the number of cases 120 on pallet 100 and update the results to system 20.

If the weight of one case 120 displayed on case scale 408 does not match the weight displayed by system 20 on the display, as determined by the computers 22, 23 and software application 30, the problem could be a wrong item or wrong master data, either of which can be solved by the workflows described below.

If an already corrected pallet 100 fails once again at a check-station (not shown), system 20 returns/conveys that pallet 100 to pallet hospital 400. If after checking each case 120 as required by computers 22, 23 and software application 30, and each piece 125 or inner 124, there is still an error, the operator may access system 20 directly through the interface and update the information stored in database 24 that is related to that specific product. By way of example, if a vendor has changed the dimensions of case 120 in which the vendor's product is shipped, pallet 100 will always appear to be too heavy (or too light), until the operator changes the information stored in database 24.

V. Source Tagging

Occasionally, a case 120, a pallet 100 or a tub 190 is conveyed to source tagging 470 for radio frequency tagging.

Essentially, source tagging adds an additional layer of protection against theft for certain items. By way of example, and in no way limiting, high value items, such as CD players, are often sent to source tagging. In one embodiment, the computers 22, 23 and software application 30 automatically make this determination based on price or value data associated with the database, and will automatically convey such products to source tagging based on the predetermined data. Additionally, the computers 22, 23 and software application 30 may be configured to convey a predetermined percentage of a specific product to be source tagged. As such, the system 20 may convey that percentage of the product to source tagging 470 in order apply security tags to the product through a source tagging procedure.

Figure 66:
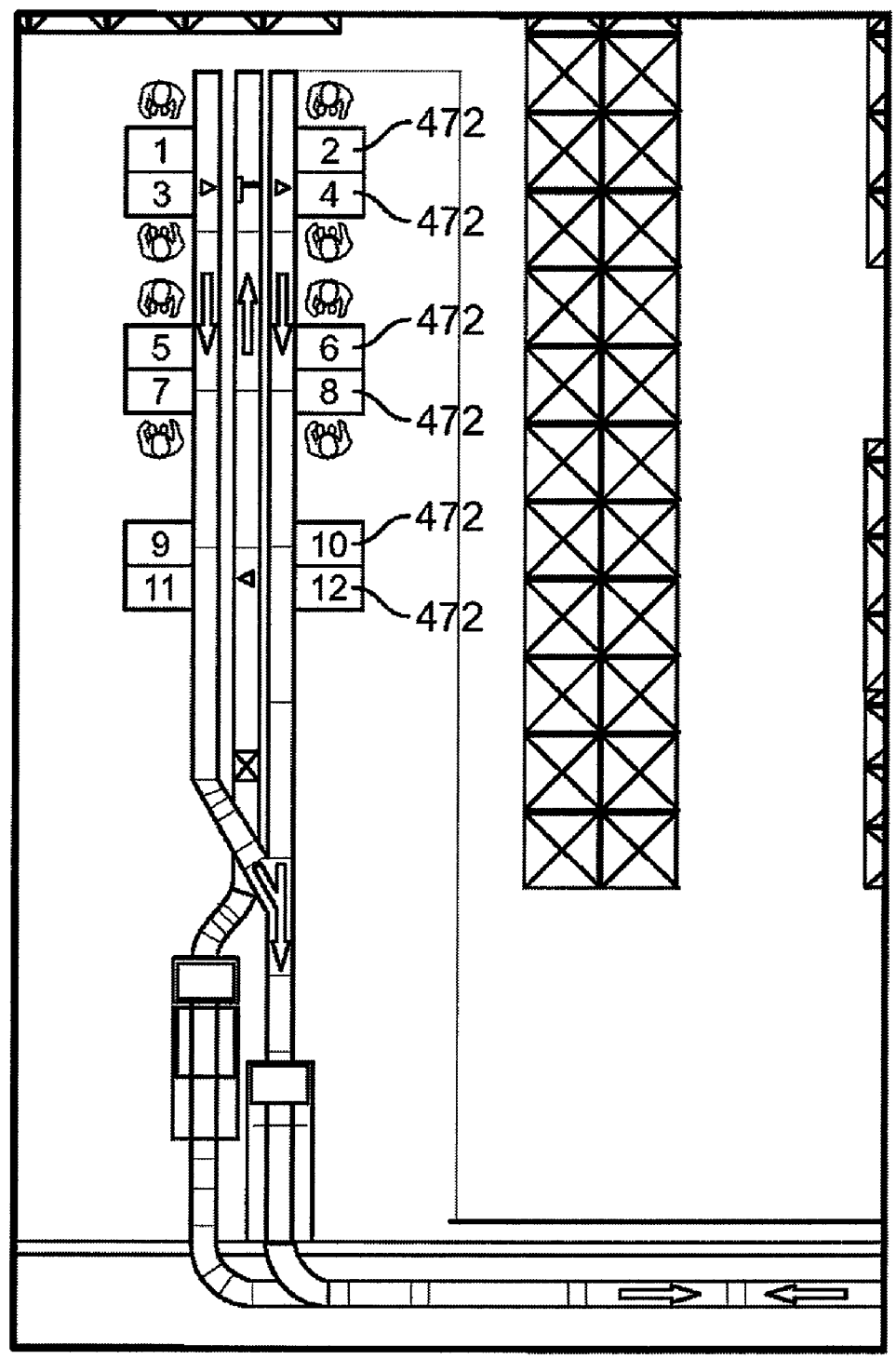
FIG. 66 is an overhead view of an exemplary layout of the source tagging workstations for use with the first embodiment of the present invention.

FIG. 66 depicts an exemplary layout of the source tagging 470. As shown, source tagging 470 comprises twelve tagging workstations 472, an incoming conveyor 474, a first outgoing conveyor 476 and a second outgoing conveyor 477, each in communication with computers 22, 23 and software application 30. Each tagging workstation 472 comprises a touch screen monitor 478, keyboard 479 and hand scanner 480. Though touch screen monitor 478, keyboard 479 and hand scanner 480 are not shown in FIG. 66, it would be understood to those in the art that these elements are similar, if not identical, to the touch screen monitors, keyboards and hand scanners described in the above-described workstations and work flows.

Figure 67:
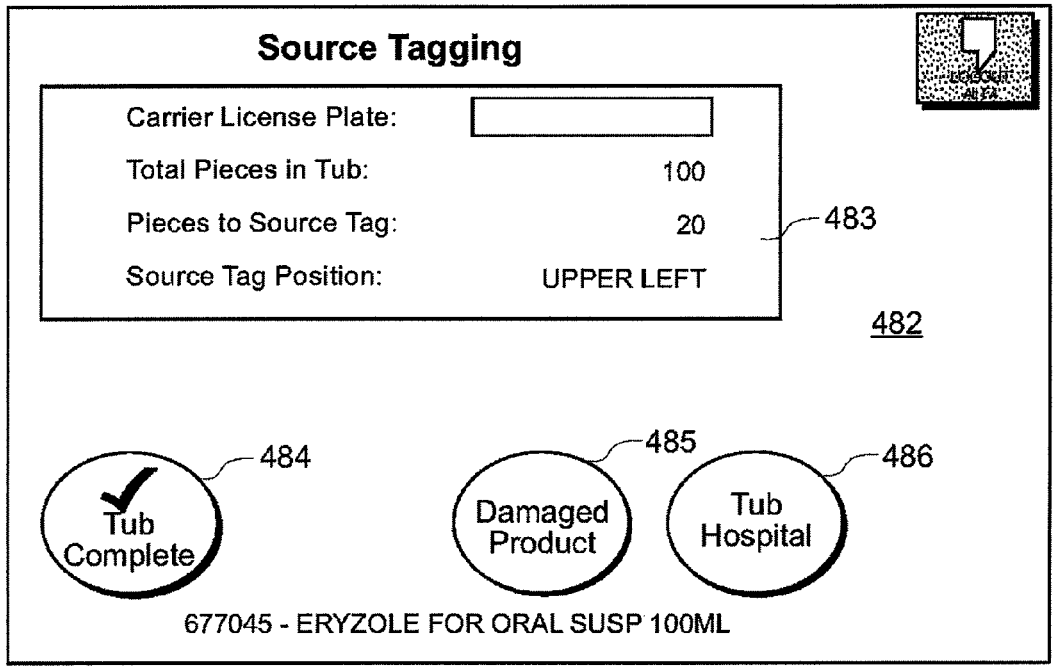
FIG. 67 is an exemplary screen shot of the source tagging screen for use with the first embodiment of the present invention.
Figure 68:
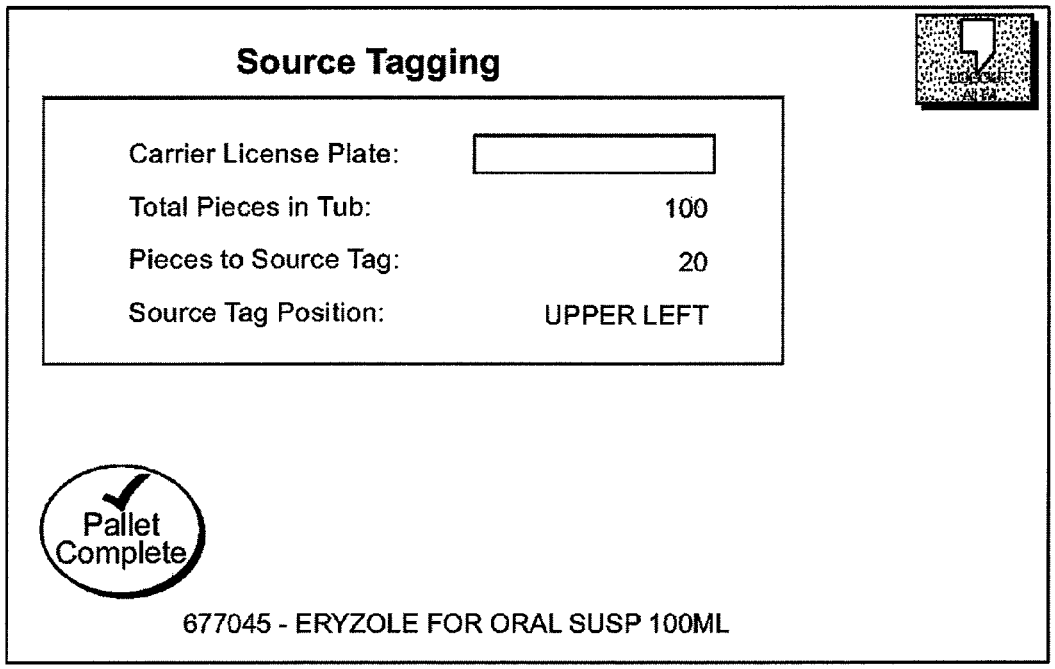
FIG. 68 is a further exemplary view of the source tagging screen as seen in FIG. 67.

FIGS. 67-68 depict exemplary interface screens generated and displayed by computers 22, 23 and software application 30 on touch screen monitors 478. As seen, home screen 482 is the default screen displayed by system 20. Home screen 482 comprises information window 483, tub complete button 484, damaged product button 485 and tub hospital button 486.

As operator 471 receives the case 120 or tub 190 for source tagging, he is directed by the interface screen to scan the case bar code 122 or tub bar code 195, which ever is appropriate. Upon receipt of the scan, the computers 22, 23 and software application 30 will generate information relevant to the product that was scanned and populate information window 483 with such information. In the depicted embodiment, a tub 190 was scanned. The instructions in information window 483 let operator 471 know how many pieces 125 are in tub 190 (100 total pieces), how many of those pieces he needs to source tag (20 total pieces), and where he needs to put the actual source tag (upper left). In another embodiment (not depicted), information window 482 may also have an icon representation, or a digital picture, or both, showing and instructing operator 471 where to place the source tag on the product. Once this is complete, operator 471 presses tub complete button 484, and the computers 22, 23 and software application 30 convey tub 190 back to the normal workflow. It will be appreciated that occasionally, operator 471 may notice, and/or the system 20 may determine, that certain of the product is damaged, or that the tub 190 has an error. If either of these situations presents itself, operator 471 may press damaged product button 485, or tub hospital button 486, respectively. The computers 22, 23 and software application 30 will receive this signal, and the computers 22, 23 and software application 30 will generate the respective workflows for the operator to follow described herein.

VI. Tub Hospital

As stated above, during the de-trash workflow, or at any other point during conveyance throughout the distribution center, a operator or system 20 may notice or detect a problem or errors with a tub 190. While exemplary problems are set forth below, any detected problem or error will cause the computers 22, 23 and software application 30 to convey tub 190 to tub hospital 500.

Figure 77:
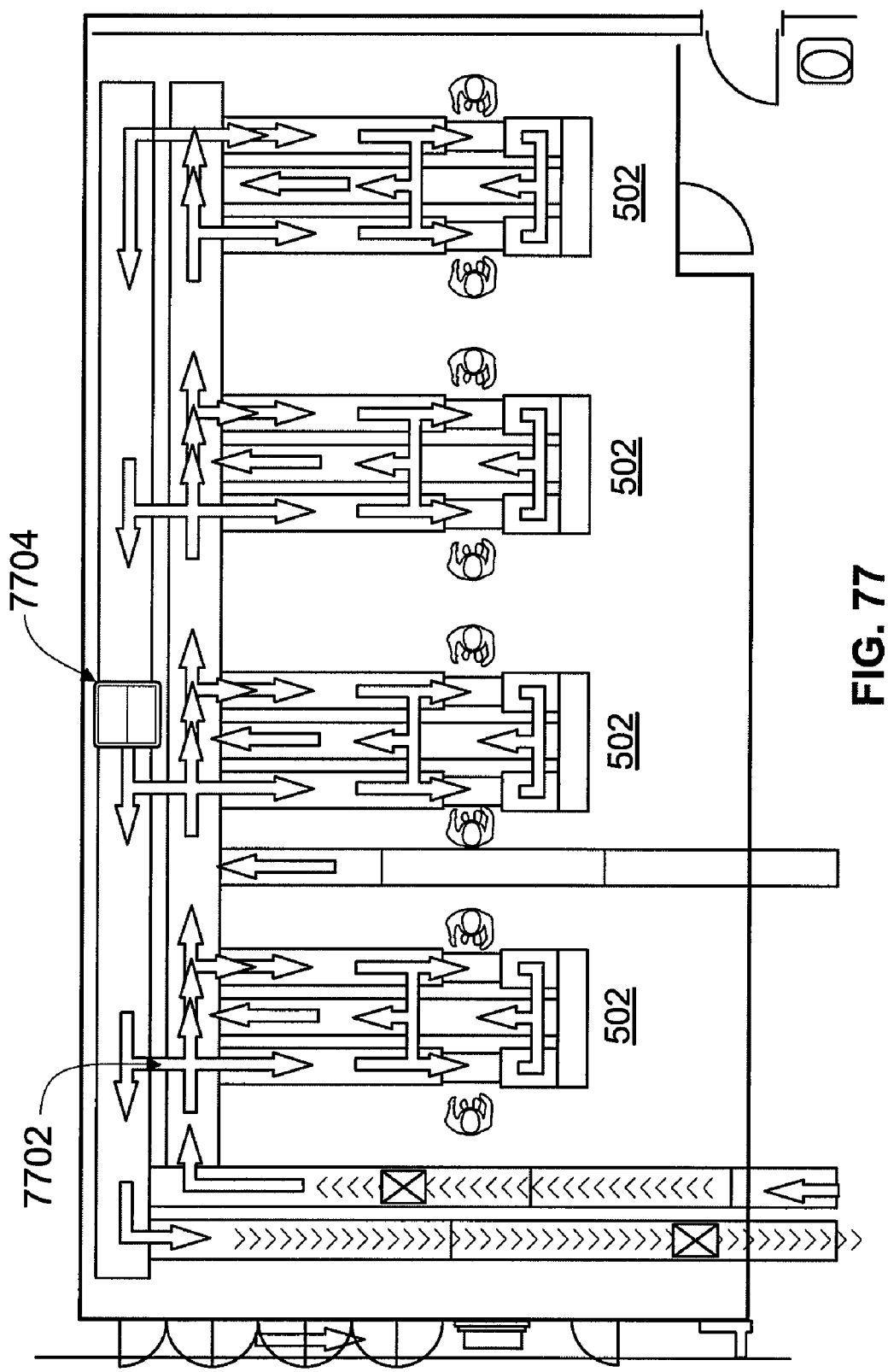
FIG. 77 is an exemplary top view of a tub hospital area for use with the first embodiment of the present invention.
Figure 78:
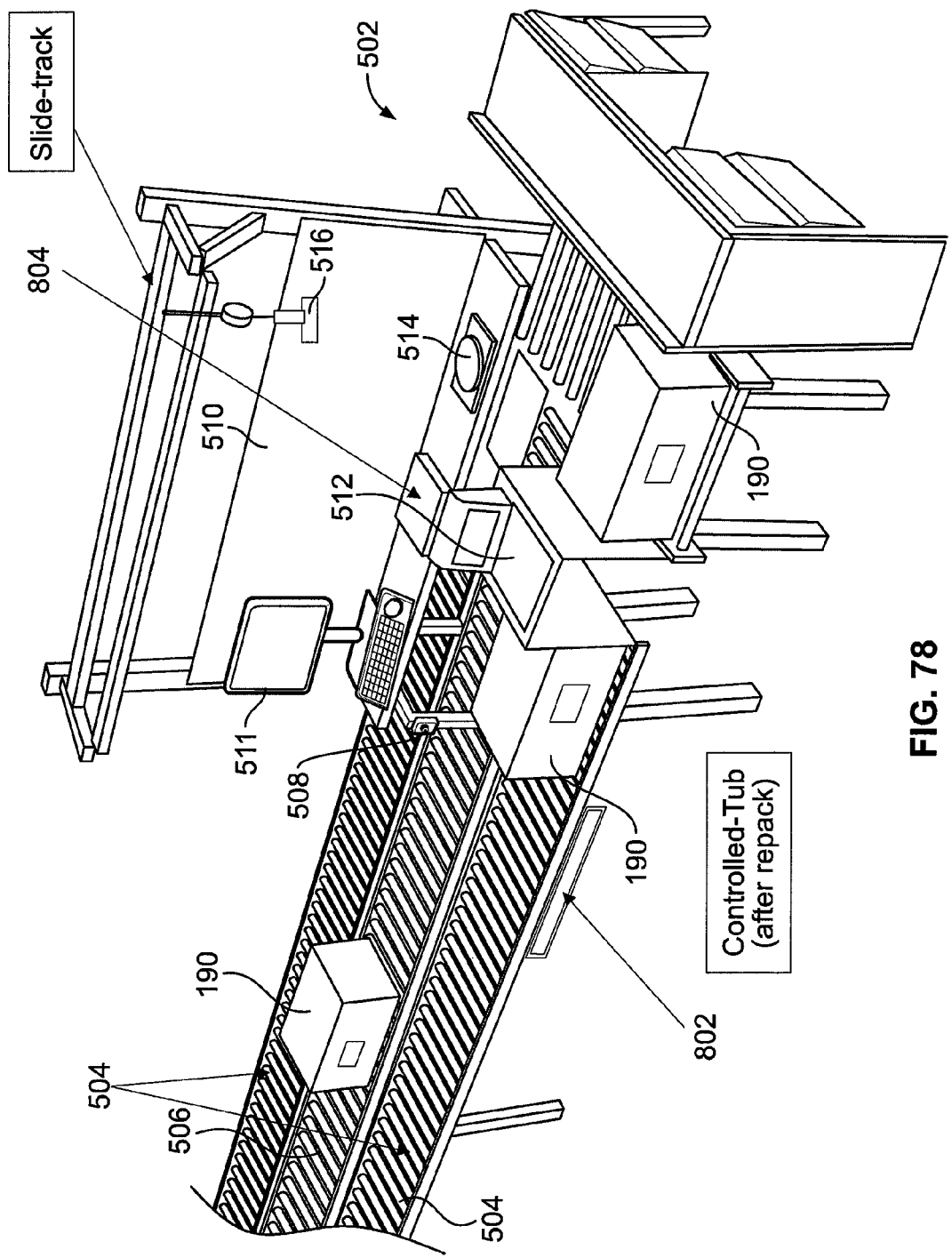
FIG. 78 is an exemplary view of a tub hospital station for use with the first embodiment of the present invention.

FIG. 77 depicts an exemplary layout of tub hospital 500. As seen, tub hospital 500 comprises several tub hospital stations 502. While each tub hospital workstation 502 may comprise many components, depending on the needs of the various distribution centers, the exemplary tub hospital workstation 502 depicted in detail in FIG. 78 comprises incoming conveyor 504, outgoing conveyor 506, tub-call button 508, touch screen monitor 510, keyboard 511, bed scanner 512, unit scale 514 and hand scanner 516, each in communication with computers 22, 23 and software application 30. As shown in FIG. 77, arrows 7702 shown that tubs 190 can transfer between conveyors 504, 506 for recirculation. The conveyors 504, 506 can also have a central tub scale 7704 for weighting tub 190 and to check for height of tubs and tub contents. As shown in FIG. 78, the tub hospital station 502 can also have a fixed scanner 7802 for scanning incoming tubs 190. The tub hospital station 502 can also have a unit scale for allowing an operator to weigh items.

During normal workflow, operator 518 communicates to system 20 that he is ready to receive a tub 190. This may be done by pressing a hardware button (not shown) on tub hospital workstation 502, or by pressing a button (not shown) on an interface screen generated and displayed by system 20 on touch screen monitor 510. System 20 receives signals from sensors (not shown) to detect and confirm that tub hospital workstation 502 is empty, and conveys tub 190 to tub hospital workstation 502 by way of incoming conveyor 504. Operator 518 is then instructed to scan, and scans, the tub bar code 195 (not shown) with hand scanner 516. After receipt of the scanned information, the system 20 is configured to display relevant information related to tube 190 on touch screen monitor 510, including, among other information, the error or errors that originally caused tub 190 to be sent to tub hospital 500, as well as directions and instructions on how to correct the error.

Operator 518 is instructed to verify, and verifies, that the error displayed by system 20 is in fact present on tub 190. If the error is present, operator 518 is instructed to follow the directions displayed on touch screen monitor 510 and is instructed to correct the error.

Operator 518 then confirms that he has corrected the error by pressing tub ok button 520, which may either be a hardware button disposed on tub hospital workstation 502, or may be a button on a screen displayed on touch screen monitor 510. In either event, this causes system 20 to receive signals from various sensors (not shown) and detect and verify that outgoing conveyor 506 is not blocked. Once this is detected and confirmed, system 20 conveys fixed tub 190 by way of outgoing conveyor 506.

Figure 69:
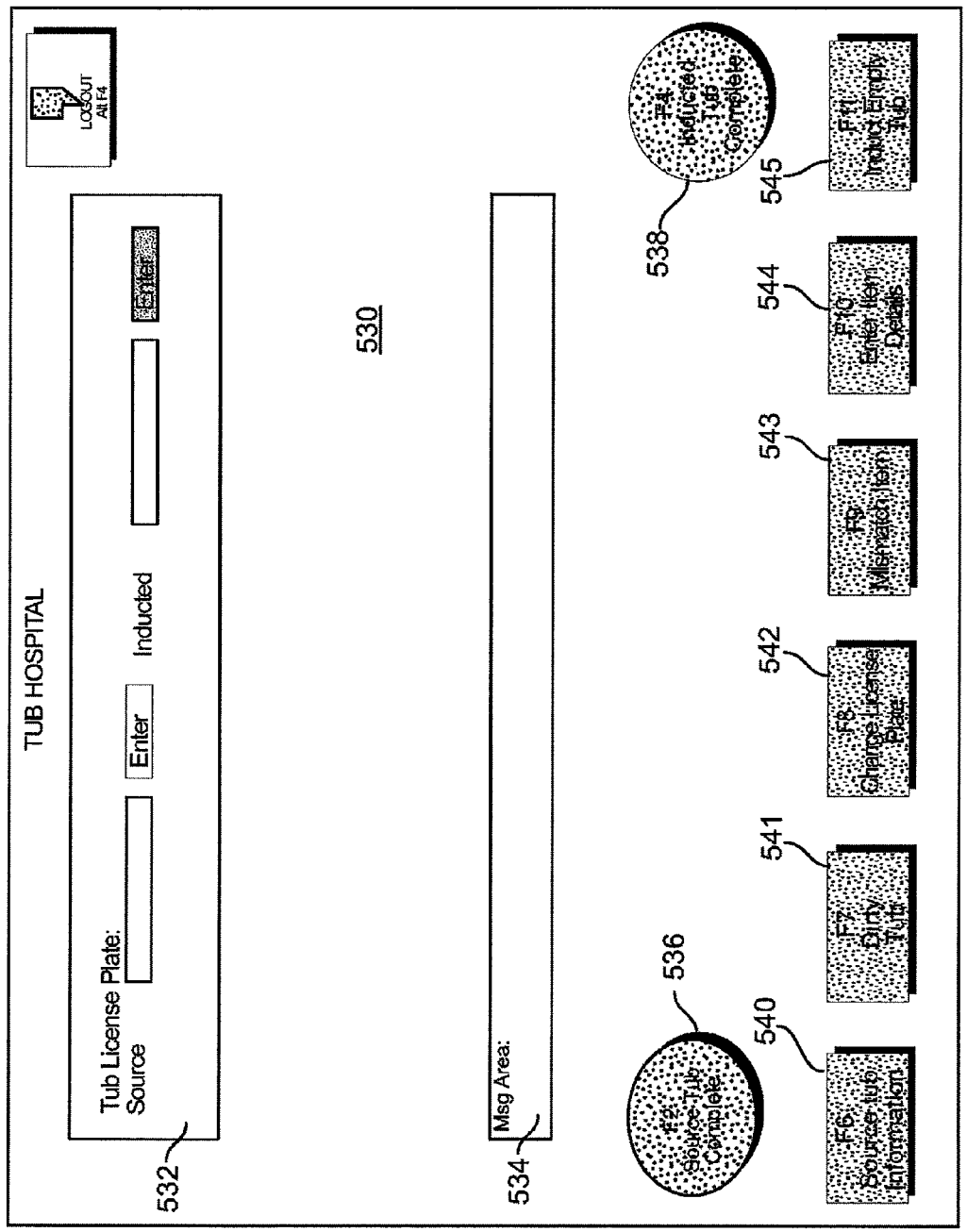
FIG. 69 is an exemplary screen shot of the tub hospital screen for use with the first embodiment of the present invention.

FIGS. 69-73 depict exemplary screenshots displayed by system 20 on touch screen monitor 510. As seen in FIG. 69, home screen 530 comprises tub information window 532, message area window 534, source tub complete button 536, inducted tub complete button 538, source tub information button 540, dirty tub button 541, change license plate button 542, mismatch item button 543, enter item details button 544 and induct empty tub button 545, each in communication with computer 22, 23 and software application 30.

Figure 70:
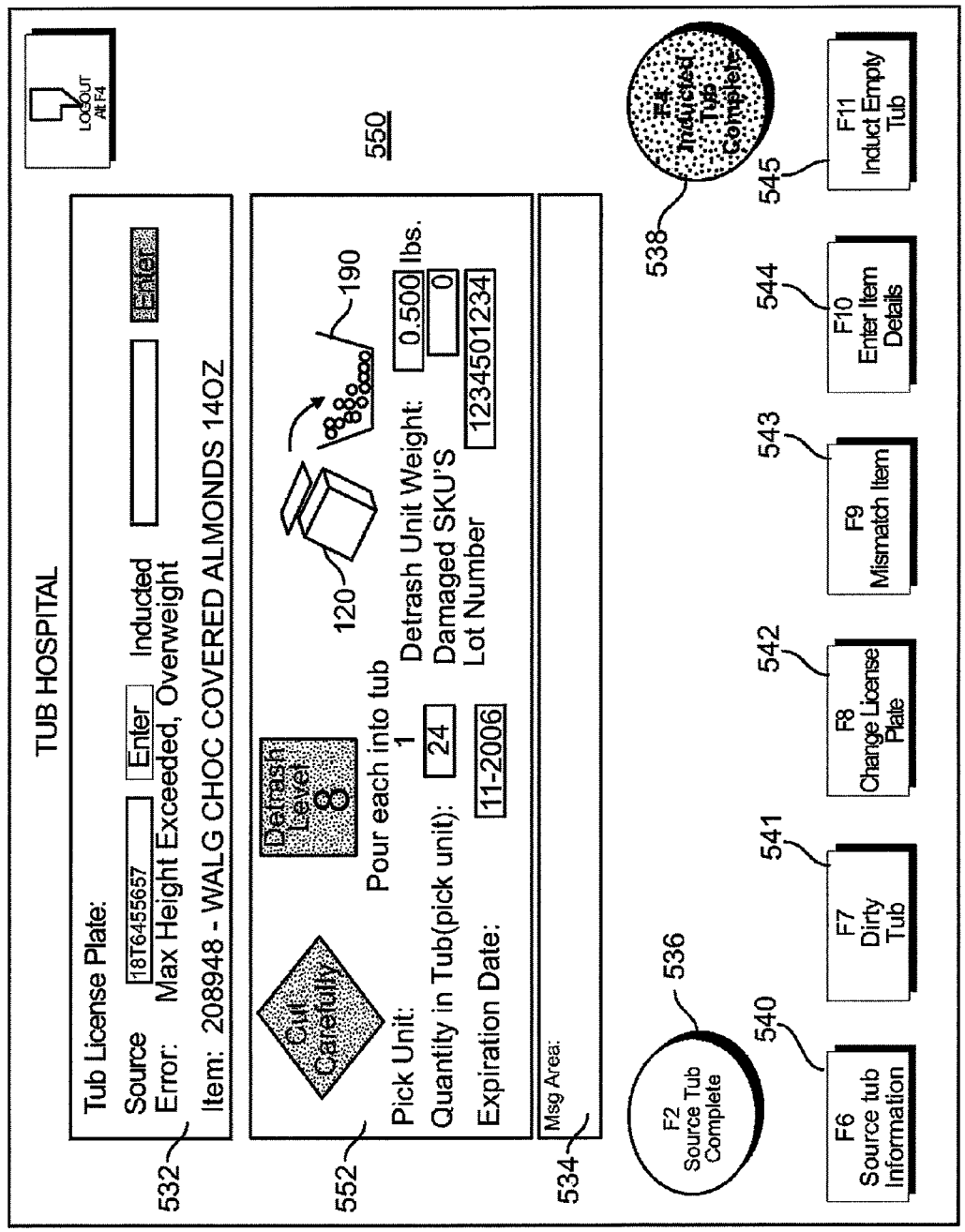
FIG. 70 is a further exemplary screen shot of the tub hospital screen as seen in FIG. 69.
Figure 71:
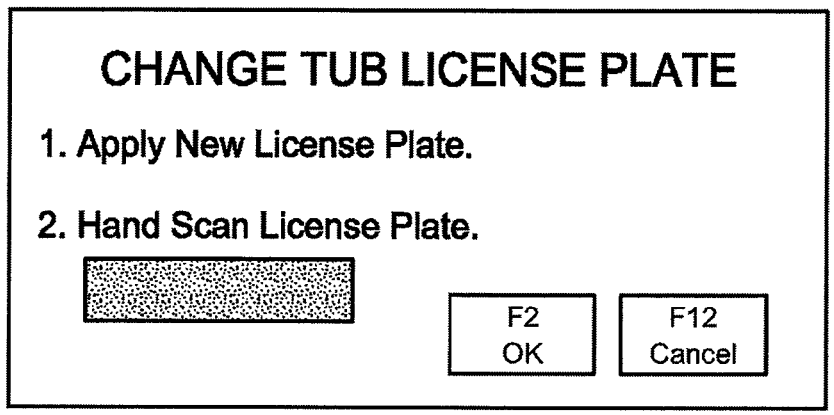
FIG. 71 is an exemplary screen shot of the change tub license plate window for use with the first embodiment of the present invention.
Figure 72:
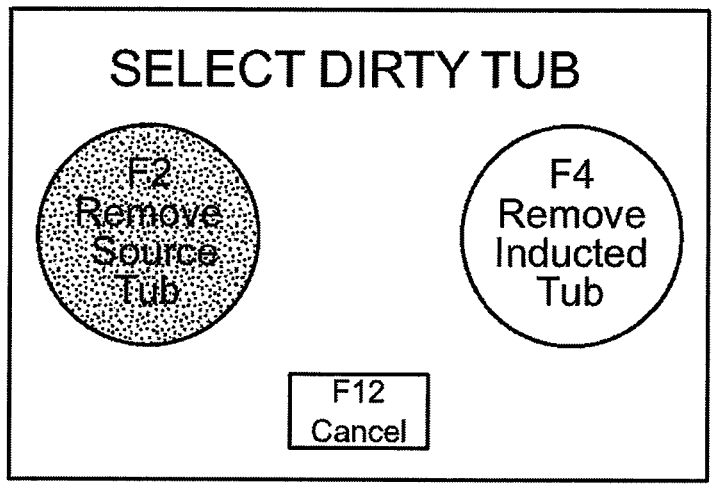
FIG. 72 is an exemplary screen shot of the select dirty tub window for use with the first embodiment of the present invention.
Figure 73:
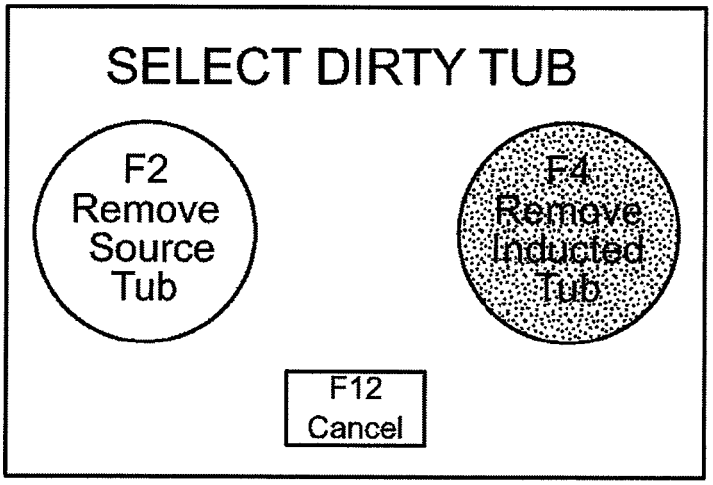
FIG. 73 is a further exemplary screen shot of the select dirty tub window as seen in FIG. 72.
Figure 74:
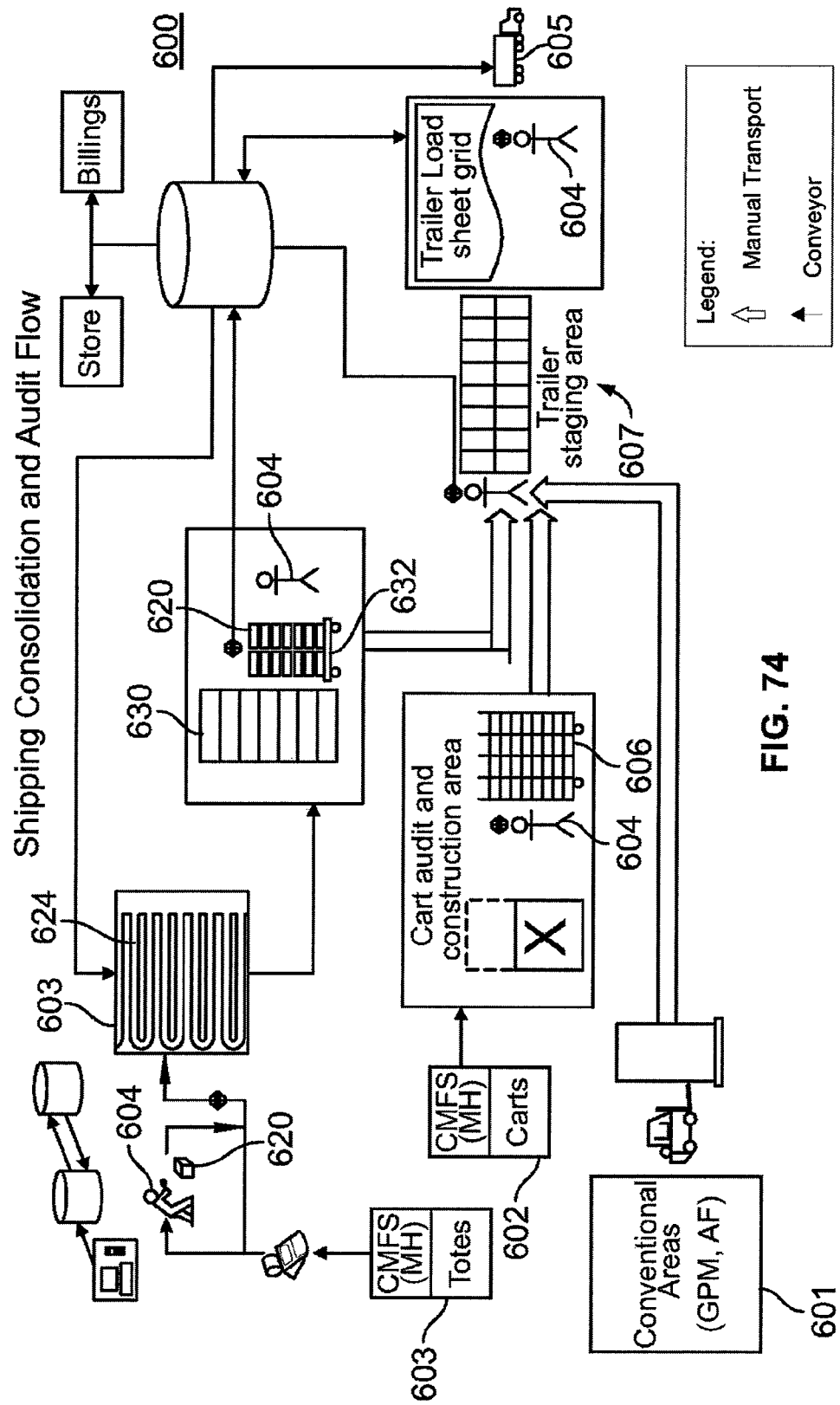
FIG. 74 is an exemplary diagram of the product flow in shipping for use with the first embodiment of the present invention.

Scanning tub bar code 195 and having computer 22, 23 and software application 30 receive the scanned information will cause system 20 to generate and display source tub screen 550, an example of which is depicted in FIG. 70. As shown, source tub screen 550 is similar to basic screen 530. However, tub information window 532 comprises various information related to tub 190. By way of example, tub information window 532 of source tub screen 550 comprises the alpha-numeric readout that is associated with tub bar code 195, the error associated with tub 190 (in this example, the maximum height tolerance has been exceeded, and tub 190 is over weight), and the identification of the product that is in tub 190. Source tub screen 550 further comprises instruction window 552, which contains instructions on how to correct the error or errors associated with tub 190.

It will be understood by those in the art that any one of several occurrences may interrupt the normal workflow. For example, if system 20 determines that tub hospital workstation 502 is not clear, it will not deliver a tub 190 to be corrected. Likewise, if system 20 determines that outgoing conveyor 506 is not clear, it will not convey fixed tub 190 from tub hospital workstation 502.

Occasionally, tub bar code 195 is damaged or otherwise unreadable such that, upon receiving tub 190, operator 518 will not be able to read tub bar code 195 with hand scanner 516 (i.e., the computer 22, 23 and software application 30, and database 24 does not recognize tub bar code 195). If this is the case, system 20 can instruct the operator and/or allow the operator to manually input the alpha-numeric code associated with tub bar code 195 into the system 20. By way of example, and in no way limiting, operator 518 may either input the alpha-numeric code through keyboard 511, or through touch screen monitor 510.

Another instance that may disrupt normal workflow is when operator 518 must remove the product from the first tub 190, and place it in a second tub 190'. This may be done either at the request of or instruction by system 20 through the interface screen by, for example, selection of such an option on the interface screen (by way of example, tub 190 was sent to tub hospital 500 because it is damaged), or by the initiative of operator 518 (by way of example, operator 518 notices that tub 190 is damaged, even though system 20 does not display that error on touch screen monitor 510). In either event, operator 518 is instructed to scan and will scan new tub 190' into system 20 through hand scanner 516. Operator 518 then corrects the error by following the directions displayed on touch screen monitor 510, putting the product in the new tub 190'. Operator 518 is then instructed to confirm then confirms that he has corrected the error by pressing ok button 520, and the computer 22, 23 and software application 30 conveys new tub 190' in the same way as described above. Operator 518 is then instructed to remove, and then removes, the old tub 190 from tub hospital workstation 502. If old tub 190 is reusable, it is then placed back in circulation. If it is damaged, then old tub 190 is permanently taken out of circulation.

Yet another instance that may disrupt normal workflow is when system 20 requests or instructs that operator 518 distribute the product over the first tub 190 and the new tub 190'. This may happen, for example, if the product is too high or to heavy for one tub.

During this type of workflow, system 20 will indicate on touch screen monitor 510 that operator 518 must input a new tub 190'. Operator 518 will scan the new bar code 195' using hand scanner 516. This will allow system 20 to associate the product with both old tub 190 and new tub 190'. Operator 518 is then instructed to distribute, and distributes, the product in both old tub 190 and new tub 190', and using touch screen monitor 510, inputs into system 20 how much product each tub 190 and 190' contain. Operator 518 then presses ok button 520, and system 20 conveys both tubs 190 and 190' away.

By way of example, and in no way limiting, if tub 190 comprises three cases 120, but is overweight by one case 120, operator will induct a new tub 190', scan new bar code 195' into system 20, the place one of the original three cases 120 into new tub 190'. Operator 518 will then input into system 20 that he has placed one case 120 into new tub 190'. Operator 518 then presses ok button 520, and system 20 conveys both tubs 190 and 190' away.

A. Different Error Correction Procedures

As will be obvious to those in the art, different errors will require different correction procedures. An exemplary list of errors and correction procedures is set forth below:

1. Wrong Weight

One reason a tub 190 may be directed to or conveyed by system 20 to tub hospital 500 is because its actual weight differs from what system 20 has determined its weight should be. This discrepancy may be caused by any number of circumstances, including the wrong number of pieces 125 in tub 190, incorrect wrong master data for item weight and tolerances inputted into system 20, wrong product located in tub 190, trash and dirt inside or on tub 190, cases 120 in tub 190 contain mixed pieces because of a mistake at the vendor, or the weight of the empty tub 190 is, for some reason, out of tolerance levels.

First, operator is instructed by the interface screen to scan, and scans, one of cases 120 (or inners 124 or pieces 125) that is located in tub 190 with hand scanner 516, and is instructed to weigh, and weighs, it on unit scale 514. If the computer 22, 23 and software application 30 determines that the weight measured by unit scale 514 matches predetermined the master data stored by system 20 and displayed on touch screen monitor 510, then the error is not in the master data, and must be caused by some other source, such as the wrong number of cases 120 in the tub, the wrong number of pieces 125 in one of or each case 120, or garbage and dirt located in tub 190. If the weights do not match, then the error has been identified.

If garbage and dirt is the reason, then operator 518 cleans tub 190 and presses ok button 520 to send the tub out onto outgoing conveyor 506.

If no garbage was found, operator 518 can be instructed to count, and will count, the product in tub 190. During this process, operator 518 can be instructed to remove, and will remove, each piece 125 from tub 190, scan it with hand scanner 516 or bed scanner 512, and put it in new tub 190' each based on instructions from the system 20. In this manner, system 20, based on the received scanned information, associates each piece 125 with new tub 190', and the system 20 and operator can locate the product and recall it, should the operator so desire. It will be appreciated by those in the art that, under certain scenarios, not every piece 125 will need to be scanned before it is put into new tub 190'.

Occasionally, there is a mistake by the vendor, in that its packaging mixes the same product with different filling quantities. This error will most likely not be recognized at de-trash workstation 250 because the operator 270 will have de-trashed the correct level and will have placed the correct item on the unit scale. One solution for this scenario is for the operator 518 to visually check and scan each piece 125 to verify that it is correct and matches the master data displayed by system 20.

2. Random Tub Audit

Occasionally, system 20 will divert and convey a tub 190 to tub hospital 500 for a tub audit. This will occur for various reasons, such as a new employee somewhere in the workflow, or to check high value items sent from vendors. The system 20 can be configured to automatically cause an audit to occur on a predetermined number of times per day or per week, or when an employee has been employed less than a predetermined time period and/or until error detection associated with a particular employee is less than a predetermined percentage for stations/product that the particular employee handles or comes into contact with. Supervisors can input audit criteria into system 20 for example, as provided above. In this manner, when system 20 determines that the inputted criteria has been met, it will likewise divert or convey the tub 190 to tub hospital 500 for a tub audit. The system 20 can also randomly select a tub 190 for auditing. Regardless of the reason, if a tub has been diverted or conveyed to tub hospital for audit purposes, system 20 will display the fact that the tub 190 should be audited on touch screen monitor 510 when operator 518 scans tub bar code 195. If this is the case, operator 518 is directed to, and will scan, weigh and count each piece to determine that the correct number of pieces 125 is in tub 190. After scanning, weighing and counting each piece, operator 518 may return the pieces to the original tub 190 or, if easier, he may move each piece 125 to a new tub 190'. Again, it will be appreciated by those in the art that, occasionally, operator 518 need not scan and/or weigh each piece 125. Once operator 518 has verified that the contents of tub 190 are correct, he presses tub ok button 520, and the system 20 conveys appropriate tub 190 or 190' away from tub hospital workstation 502.

3. No-Read

As described above, multiple automatic scanners (not shown) are placed at various, strategic points throughout distribution center and are in communication with the computer 22, 23 and software application 30. If, for some reason, one of these automatic scanners is unable to read a tub bar code 195, and/or the computer 22, 23 and software application 30 does not recognize a tub scan code 195, system 20 will store this fact. If subsequent scanners are able to read tub bar code 195, then system 20 will communicate to an operator/supervisor that there may be a problem with the first automatic scanner. If, however, subsequent automatic scanners are also unable to read tub bar code 195, system 20 will then send or convey that tub 190 to tub hospital 500.

If this error has occurred, operator 518 can be instructed to, and will visually check tub 190 for a readable tub bar code 195, then test it by using hand scanner 516. If the system 20 can read tub bar code 195 with hand scanner 516, system 20 will not be able to determine or indicate a reason for the error, and tub 190 will be sent back into normal workflow. If operator 518 determines that tub bar code 195 is damaged, or system 20/hand scanner 516 cannot read tub bar code, operator 518 is instructed to move, and will move, the contents from the old tub 190 to a new tub 190'. This process is completed in the identical manner as described above.

4. Data Mismatch

Tub hospital 500 is the default destination for tubs when there is a mismatch between the product received, as inputted into system 20, and what was actually ordered. By way of example, occasionally there may be a missing transport order, or the current data associated with the product (i.e., weight, height, etc.) is incorrect, etc. as determined by the system 20. If this is the error that caused tub 190 to be sent or conveyed to tub hospital 500, then system 20 will display that error on touch screen monitor 510 when operator 518 scans tub bar code 195. The same procedure as "wrong weight, no garbage inside" as described above may be followed to solve the data mismatch error. By way of example, if the data is incorrect, operator 518 is instructed, to and will scan a case 120 with bed scanner 512 and weigh the case 120 with unit scale 514 and this information will be received by the computer 22, 23 and software application 30. Operator 518 will then be instructed to input, and will input, the updated information into system 20 through touch screen monitor 510.

5. Problems at the De-Trash Workstation

Occasionally, operator 270 at de-trash station 250 does not know what to do with a particular product. If this occurs, operator 250 is trained to send the product to tub hospital 500. If this is the case, then operator 518 is trained and can be instructed to follow the same procedure as the "data mismatch" procedure described above.

6. Damaged Product Sent from De-Trash

Occasionally, the system 20 may send or convey damaged product to tub hospital 500 from various points and/or stations throughout distribution center 10. As with the above workflows, if a tub 190 has been sent or conveyed to tub hospital 500 because of damaged product, system 20 will display that error on touch screen monitor 510 when operator 518 scans tub 190.

To provide an area to clean product that may be damaged because it was dirty, tub hospital workstation 502 may comprise wash basin 513. Operator 518 can be instructed to, and will wash the product in wash basin 513, and place the product in a new tub 190'. Operator 518 can be instructed to, and will scan each of the product (whether it is cases 120, inners 124 or pieces 125) that has been washed into system 20, and scan new tub bar code 195' into system 20. In this manner, system 20 will now associate the cleaned product with new tub 190', and store this association within the database 24.

Operator 518 and system 20 will then identify the old tub 190 as "dirty," and the old tub 190 will be conveyed by the system 20 to the tote-tub washer.

7. Over Height

Occasionally, the system 20 may send or convey a tub 190 to tub hospital 500 from various points/stations throughout distribution center 10 because the product in tub 190 exceeds the height restrictions in place, for example, as detected and determined by system 20. As with the above workflows, if a tub 190 has been sent or conveyed to tub hospital 500 because it is over the height restrictions, system 20 will display that error on touch screen monitor 510 when operator 518 scans tub 190.

To resolve this error, operator 518 can be instructed to, and will, remove and re-stack the product in tub 190. If the product cannot be successfully stored without violating the height restrictions, then operator 518 will follow a similar workflow to that described above in the overflow tub procedure at de-trash station 250. Namely, operator 518 can be instructed to, and will, scan into system 20 and place as much product as he can in tub 190 without exceeding the height restrictions. Operator 518 will then scan the remaining product and put it in a new tub 190'. In this manner, system 20 and database 24 will be updated and will now track which tubs contain all of the product that was delivered to distribution center 10.

VII. Shipping

As stated above, during normal workflow, products are stored in one of two storage areas prior to being shipped to the various stores or franchisees. Which of these storage areas is determined by the manner in which the product is conveyed throughout distribution center 10. In the depicted embodiment, pallets 100 are stored in pallet storage 601, while product that is conveyed in tubs 190 is stored in tub storage 602. When an order from a store or franchisee is received, system 20 determines which products need to be picked to meet that order, a process described in detail below, and determines where those products are stored, either pallet storage area 601 or tubs storage area 602. Once the product has been picked or retrieved, computer 22, 23 and software application 30 conveys it to truck staging area 607, for shipping out, a process which is also described in detail below.

A. Picking the Product

As described above, in a normal workflow, a store or franchisee will send a request or order to distribution center 10 for various products. This request will be received by or entered into system 20, either automatically or manually. Once the request is received or entered, system 20 will determine where the products are located in pallet storage 601 and tub storage 602 based on information in the disclosures that are needed to meet the request/order. computers 22, 23 & software application 30 then create a "pick list," informing/communicating to operators 604 where the products are located, so that they can pull the product and send it to shipping.

1. Pallet Storage

As described above, products that are conveyed throughout distribution center 10 on pallets 100 are stored in pallet storage 601. If some product that has been ordered by a store or franchisee is stored in pallet storage area 601, system 20 sends a request to operators 604 stationed in that area to pull the relevant items. Because the product pallet storage area 601 is stored in cases 120, operator 604 pulls the requested cases 120 and places them in a cart 606. Each cart 606 is pulled by an automatically guided vehicle, or AGV, (not shown), and each AGV can pull up to three carts. In this manner, a cart 606 can be filled up with the appropriate items, then the filled cart 606 is shipped to the store or franchisee. In the depicted embodiment, the AGV is guided by magnets embedded in the floor of distribution center 10, at the direction of the computer 22, 23 and software application 30.

When a request comes in for items stored in pallet storage 601, system 20 sends a picking order to the AGV. Because database 24 of system 20 includes the location of each product in distribution center 10, system 20 will indicate to AGV where each item is located in pallet storage 601, and create a stop point, or several stop points, for the AGV. Occasionally, one or more products requested by a store will be stored in pallet storage area 601 in the same general vicinity. By way of example, a store may have requested, among other products, a case of aspirin and a case of toothpaste, both of which may be stored next to each other. Therefore, system 20 will indicate and communicate to the AGV that the AGV should stop at a first stop point that is near both the aspirin and the toothpaste, so that operator 604 can quickly and efficiently load both products into a cart 606. In the depicted embodiment, the stop points will periodically change, because the storage locations of the various products are floating. By way of example, one week aspirin may be located in the north-east corner of pallet storage 601, while a subsequent week, aspirin may be located in the north-west corner of pallet storage 601. However, the scope of the present invention includes embodiments in which the location of product remains constant. The scope of the present invention also includes those embodiments in which one type of product is stored in several locations simultaneously. These locations are tracked and stored in the database 24 for use by the computer 22, 23 and software application 30 to perform these functions.

When system 20 sends an order to the AGV, the stop points are downloaded to the AGV, a plurality of cart labels (not shown) are printed from a printer attached to the AGV. As described below, each cart label corresponds to one case 120 that has been requested by a store. An operator 604 then climbs aboard the AGV, and pushes a button, indicating that the operator 604 is ready, and the AGV travels to its first stop point.

At the first stop, operator 604 exits the AGV, and pulls all of the requested cases 120 located at that stop point, and puts the cases 120 in the appropriate cart or carts. As stated above, each AGV can pull up to three carts 606. As such, up to three different stores' requests may be addressed at the same time. When operator 604 places a case 120 in the appropriate cart 606, he affixes the corresponding cart label to the case.

Occasionally, there are more labels than there are cases 120. By way of example, this can occur when a store requests more product than distribution center 10 has in inventory. When this happens, operator 604 is trained to scan the excess cart labels, alerting system 20 that not all of the store's requests can be met. In the depicted embodiment, the scanning of the excess cart labels is performed using a portable scanner, however, other types of scanners can be used, so long as the scanner can be communicate with system 20 and to software application 30 wirelessly, such as through a wi-fi connection, Bluetooth®, or other wireless connections.

Once operator 604 pulls/retrieves all of the cases 120 that are located proximate to the first stop point, he gets back on the AGV, and is instructed to, and pushes, the ok button, indicating that he is finished pulling items there. If the store requested/ordered additional products that are located in pallet storage 601, then the AGV will continue to the next stop point, and the above process will be completed again. If all of the requested items are pulled at the first stop point, the AGV then goes cart conveyor 612 (not shown). Cart conveyor 612 will automatically disengage each of the carts 606 from the AGV, and convey them to one of several exit points. Each exit point is proximate to several loading areas, into which the various trucks 605 back up when they are about to be loaded. Depending on where each truck 605 is delivering, system 20 will determine to which exit point each cart 606 should be delivered. Once the carts 606 arrive at their respective exit points, they are then wheeled manually to staging area 607 and prepared for shipping.

2. Tub Storage

If product is conveyed by system 20 throughout distribution center 10 in a tub 190, then the tub 190, containing that product, will be stored in tub storage 602.

As the product arrives in tub storage 602, it is transferred from the multiple tubs 190 to one or several totes 620. In the depicted embodiment, this may be accomplished in one of two manners. In the first manner, an operator 604 assigned to tub storage 602 will have several totes 620 lined up in front of him. System 20 produces a list based on information stored in the database 24 of what products should be placed in what totes 620, and where in tub storage 602 operator 604 can find the product. Operators 604 then locate the product in tub storage 602, retrieve the product, and places the product in the correct tote 620.

In the second manner, a tote 620 is located in front of operator 604, and as various products are conveyed in front of operator 604, system 20 indicates which of the products should be placed in the tote 620. It will be understood by those in the art that the scope of the present invention includes multiple methods of transferring products from a tub 190 to a tote 620.

Regardless of the method, because of the transfer of products from tubs 190 to totes 620, it is necessary to randomly audit totes 620 to ensure that the proper amount of product (inners 124 or pieces 125) are located in the tote 620. This audit is conducted in much the same manner that the audit described above under the tub hospital workflow. Specifically, operator 604 scans tote bar code 622 associated with tote 620, and compares what system 20 indicates should be located within tote 620 with what is actually located within tote 620. If there is an inconsistency, then operator 604 will correct it. If not, the system 20 will convey the tote 620 to shipping carousel 624 (described below). It will be appreciated that, during the tote audit process, operator 604 may use an audit station (not shown) that is similar to tub hospital workstation 502, or he may use a portable scanner or any other portable device that may be linked to system 20, to perform an audit.

As tote 620 enters into shipping carousel 624, the location of the tote 620, as well as its contents, is tracked and stored in database 24. This may be done either manually or automatically, and may be accomplished through inputting the information through various keyboards, touch screen monitors or through various scanners connected, either directly or indirectly, to central computer 23 and software application 30 located therein. When distribution center 10 receives a request from a store for various products that are located in shipping carousel 624, system 20 will cause shipping carousel 624 to convey the totes 620 that contain the requested products to tote stacker 630, which will automatically stack the requested totes 620 on top of each other. The stacked totes 620 are then placed on a dolly 632, which is then wheeled to trailer staging area 607.

B. Shipping

As discussed above, when operators 604 have pulled/retrieved all the items requested/ordered by a store from each of the storage areas 601 and 602, they will temporarily store the product in trailer staging area 607. As seen, trailer staging area 607 comprises multiple outlines on the floor of distribution center 10, each outline comprising the same length and width of an average semi trailer. Here, operators 604 can easily determine the most efficient way to pack a truck 605. As will be understood by those in the art, depending on the situation, any number of configurations may be the most efficient. By way of example, if truck 605 is only going to one store, then the most efficient way to pack truck 605 is to put as much product on truck 605 as will fit. If truck 605 is making multiple stops, it may be more efficient to pack truck 605 such that all the products going to the first stop are closest to the trailer door, while all of the products going to the last stop are packed farthest from the trailer door. The computer 22, 23 and software application 30 can be configured to determine the most efficient routes and packing for the orders and communicate instructions to the operators accordingly.

Additionally, system 20 may indicate to operators 604 that they should act on the products being shipped before they are loaded on to truck 605. By way of example, and in no way limiting, system 20 may indicate that operators 604 should consolidate some carts 606, or some dollies 632, or both, such that the product stored on one cart 606 may be loaded on to a second cart 606, etc. In this way, the same amount of product may be loaded on to a truck 605, but only take up a fraction of the amount of space.

Figure 75:
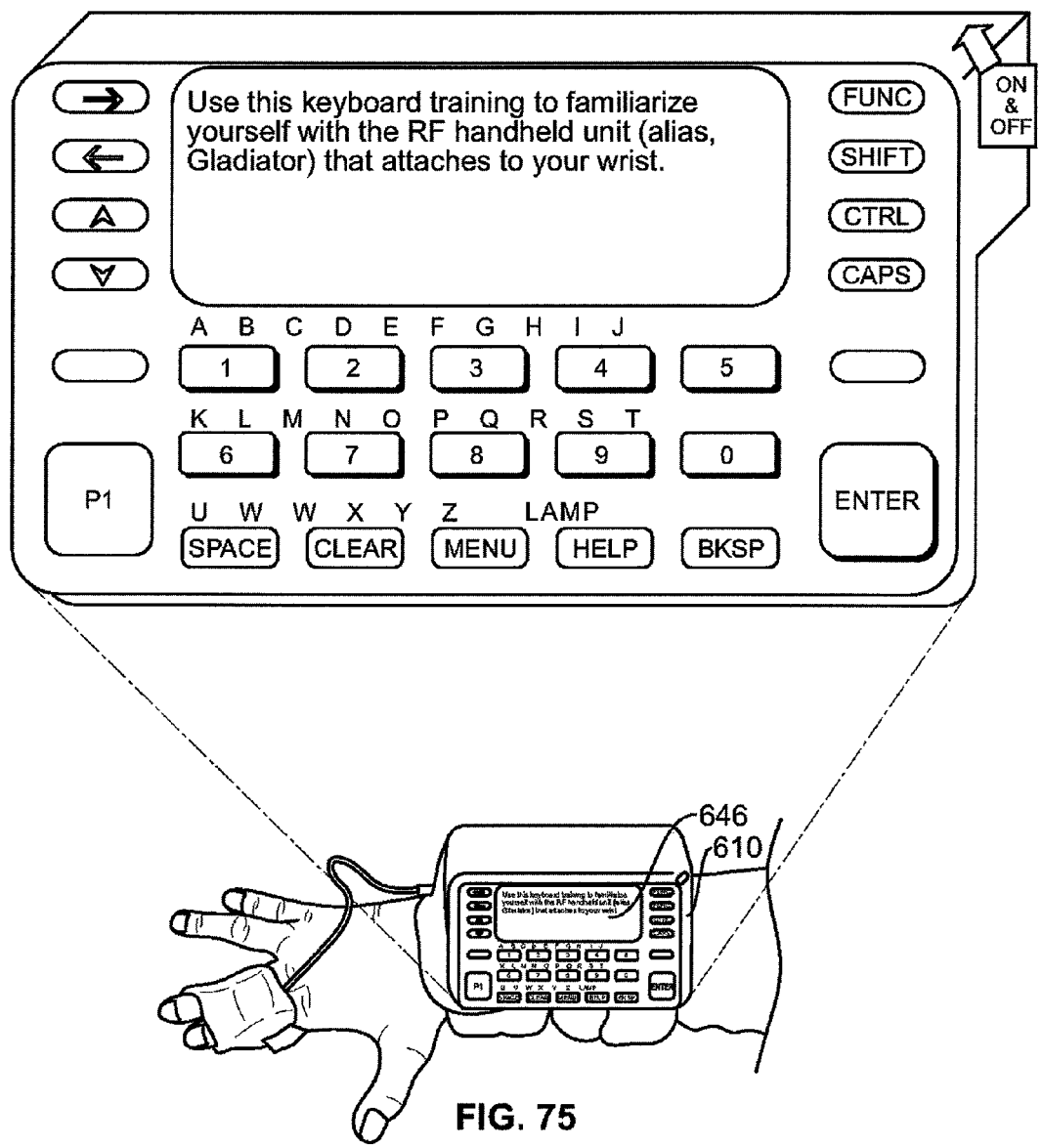
FIG. 75 is a top view of an exemplary wrist scanner for use with the first embodiment of the present invention.

In order to facilitate the communication between system 20 and operators 604, each operator 604 assigned to the shipping area may be outfitted with wrist scanner 640, such as that shown in FIG. 75. Wrist scanners, such as wrist scanner 640, are generally known in the industry, and as such, will only briefly be described herein. It will also be appreciated that operators 604 may be outfitted with any number of similar portable scanning devices, so long as they have a bar code scanner and a read-out, as described below.

As seen in FIG. 75, exemplary wrist scanner 640 comprises various buttons 642, a bar code reader 644 and a display 646. Because wrist scanner 640 is connected to system 20, various instructions may be displayed on read-out 640. As with all of the stations described above, system 20 will generate and display the various instructions on read-out 640, and operator 604 may indicate when he has accomplished those instructions. This indication may come via the bar code scanner 644, or pressing one of buttons 642.

When all of the products ordered by a store have been moved to trailer staging area 607, and have been arranged in the most efficient manner, operator 604 checks wrist scanner 640 one last time to ensure that all instructions have been followed. Once this is complete, multiple operators 604 will load truck 605, and the product will be shipped.

VIII. Training Mode

It will be appreciated by those in the art that employees are often hired or moved to new stations many times. As such, computers 22, 23 and software application 30 may be configured to cause any one of the above work stations to go into a training mode. It will be appreciated by those in the art that any single station, any group of stations, or all stations may be entered into the training mode independent of one another, or all at the same time.

While in the training mode, computers 22, 23 and software application 30 may receive a signal from a workstation, indicating that the training mode has been entered into at that workstation. The signal may be sent by a supervisor, an operator, or any other appropriate personnel.

The computers 22, 23 and software application 30 will then transmit training instructions to the workstation. These instructions may be displayed on the respective touch-screen monitor, hand held device, or what ever appropriate read-out device is used in connection with that workstation. The respective training operator will then input into system 20 the various actions he has taken with the products in front of him. These inputs will then be transmitted to computers 22, 23 and software application 30.

The databases located in computers 22, 23 and software application 30 may have data stored there indicating which actions should have been taken with the products, and which buttons or inputs should have been entered by the operator. During this training mode, computers 22, 23 and software application 30 may compare the inputs from the training operator with the data in the database, and will determine if, by way of example, the training operator made the correct modifications to the products, or made the correct inputs on the touch-screen monitor.

Once computers 22, 23 and software application 30 has determine whether the correct inputs were received, they will transmit a signal to the workstation, and indicate the determination. This signal may also have corrections. In other words, if a training operator de-trashed the incorrect level (as described in detail above), computers 22, 23 and software application 30 may not only indicate that the de-trash level was incorrect, but may also indicate how to correctly de-trash the products in the future.

Once the products have been correctly acted on by the training operator, a signal will be sent to computers 22, 23 and software application 30 that the products are ready to be conveyed. The products will then enter into the normal workflow. This signal may either be entered automatically—for example, via scanners—or manually, such as by a supervisor.

While specific configurations of the invention have been described in detail, it will be appreciated by those skilled in the art that various modifications and alternatives to those details could be developed in light of the overall teachings of this disclosure. The particular arrangements disclosed herein are meant to be illustrative only and not limited as to the scope of the invention which is to be given the full breadth of the appended claims and any equivalents thereof.

What is claimed is:

1. A method of receiving, conveying, storing and shipping products within a distribution center, the method comprising the steps of:
receiving a product arrival signal at a central computer indicating that products to be received have arrived;
transmitting from the central computer a first conveying signal for conveying the products to a check-in workstation for automatically conveying and storing the products in the distribution center;
receiving object identifier information originating from an object identifier located on the products from at least one of a bed scanner, a handheld scanner, a keyboard and a touch-screen monitor;
storing the object identifier information in a database associated with the central computer;
generating at the central computer a second conveying signal for conveying the products to at least one subsequent location within the distribution center, the subsequent location determined by parameters uploaded into the database, wherein the parameters comprise characteristics of the products and guidelines stored in the database which are at least in part based on the characteristics of products;
transmitting the second conveying signal for conveying the products to the at least one subsequent location;
receiving a second product arrival signal at the central computer indicating when the products have arrived at the at least one subsequent location;
generating at the central computer a first set of instructions for use in instructing a user to perform at least one task related to the products, the first set of instructions determined by parameters inputted and stored in the database relating to the at least one task;
transmitting the first set of instructions to the at least one subsequent location, for displaying the first set of instructions on a second touch-screen monitor in communication with the central computer;
receiving a first completion signal at the central computer indicating that the user has completed the first set of instructions;
transmitting a third conveying signal for conveying the products from the at least one subsequent location;
receiving at the central computer from a store, an order for products;
storing the order in the database associated with the central computer;
generating a list of requested products to compile to fulfill the order;
transmitting the list of requested products to a remote device;
receiving at the central computer a confirmation signal indicating that the requested products have been compiled to fulfill the order;
generating at the central computer a second set of instructions to transmit to a portable scanning device, the second set of instructions comprising a proper method, order and orientation for manually loading the requested products in a truck, based on information stored in the database; and,
receiving at the central computer a order fulfilled signal indicating that the requested products have been loaded on the truck in compliance with the second set of instructions.

2. The method of claim 1, wherein the first set of instructions are only text.

3. The method of claim 1, wherein the second set of instructions are only text.

4. The method of claim 1, wherein the first set of instructions are only graphics.

5. The method of claim 1, wherein the second set of instructions are only graphics.

6. The method of claim 1, wherein the first set of instructions are only pictures without text.

7. The method of claim 1, wherein the second set of instructions are only pictures without text.

8. The method of claim 1, wherein the first set of instructions are a combination of pictures and text.

9. The method of claim 1, wherein the first set of instructions are a combination of graphics and text.

10. The method of claim 1, wherein the second set of instructions are a combination of pictures and text.

11. The method of claim 1, wherein the second set of instructions are a combination of graphics and text.

12. The method of claim 1, wherein the at least one subsequent station is a de-trash station.

13. The method of claim 1, wherein the at least one subsequent station is a case hospital station.

14. The method of claim 1, wherein the at least one subsequent station is a palletizing station.

15. The method of claim 1, wherein the at least one subsequent station is a source tagging station.

16. The method of claim 1, wherein the at least one subsequent station is a pallet hospital station.

17. The method of claim 1, wherein the at least one subsequent station is tub hospital station.

18. The method of claim 1, wherein the at least one subsequent station is a shipping area.

19. The method of claim 1, further comprising the step of displaying on the second touch-screen monitor only graphics representing the type of products received, graphics indicating what actions are to be taken with the products, graphics indicating the order in which the products are to be stacked on a pallet, an error button, a button to lower the lift, an exception button, a completed button and the first set of instructions.

20. The method of claim 1, further comprising the step of displaying on the second touch-screen monitor only a tub complete button, a damaged product button, a tub hospital button, a logout button, a title and the first set of instructions in at least one of a first and/or a second information window.

21. The method of claim 1, further comprising the step of displaying on the second touch-screen monitor only a de-trash level indicator, graphics indicating a first set of actions to be taken with the products, graphics indicating a second set of actions to be taken with the products, graphics indicating a third set of actions to be taken with the products, a red indicator light, a yellow indicator light, a green indicator light, a lane complete button, a product indicator text, a tub dirty button, a tub damaged button, an exceptions button and the first set of instructions.

22. The method of claim 1, further comprising the step of displaying on the second touch-screen monitor only a title readout, a pallet information window, a message window, a source pallet complete button, a view pallet information button, a change license plate button, a mismatch item button, an enter item details button, a logout button, a send button and the first set of instructions in at least the message window.

23. The method of claim 1, further comprising the step of displaying on the second touch-screen monitor only a title readout, a tub information window, a message area window, a source tub complete button, an inducted tub complete button, a source tub information button, a dirty tub button, a change license plate button, a mismatch item button, an enter item details button, an induct empty tub button, a logout button and the first set of instructions in at least the message area window.

24. The method of claim 1, further comprising the step of displaying on the second touch-screen monitor only a title readout, a case information area, an instruction area, a message window, a logout button, a lane complete button, an item ok button, a damaged item button, a dirty tub button, a damaged tub button, a tub hospital button, a refresh button, a mismatch item button, a carrier information button and the first set of instructions.

25. The method as set forth in claim 1, further comprising the steps of:
- receiving a training signal at the central computer indicating that a training mode has been entered into by at least one of the workstations;
- transmitting a second set of instructions from the central computer to the at least one workstation for display on the respective touch-screen monitor;
- receiving at the central computer inputs from the user at the at, least one workstation indicating various actions that have been taken with the products;
- comparing the inputs received from the user with predetermined comparison data stored in the database at the central computer;
- determining whether the correct actions were taken with respect to the products based on a comparison of the inputs with the predetermined comparison data stored in the database;
- transmitting a results signal to the at least one workstation indicating whether the actions taken were correct; and
- receiving a completed signal at the central computer, confirming that the correct actions were taken with the products.

26. The method as set forth in claim 25, wherein the products are conveyed away from the at least one workstation only after the completed signal has been received.

27. The method as set forth in claim 26, wherein a supervisor enters the release signal after confirming that the correct actions have been taken with the products.

* * * * *